(12) United States Patent
Adachi et al.

(10) Patent No.: US 6,907,384 B2
(45) Date of Patent: Jun. 14, 2005

(54) METHOD AND SYSTEM FOR MANAGING CONSTRUCTION MACHINE, AND ARITHMETIC PROCESSING APPARATUS

(75) Inventors: Hiroyuki Adachi, Tsuchiura (JP); Toichi Hirata, Ushiku (JP); Genroku Sugiyama, Ibaraki-ken (JP); Hiroshi Watanabe, Ushiku (JP); Koichi Shibata, Tsuchiura (JP); Hideki Komatsu, Ibaraki-ken (JP); Shuichi Miura, Koshigaya (JP); Koji Mitsuya, Kashiwa (JP); Yoshiaki Saito, Adachi-ku (JP); Atsushi Sato, Soka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 65 days.

(21) Appl. No.: 10/240,202

(22) PCT Filed: Mar. 30, 2001

(86) PCT No.: PCT/JP01/02741

§ 371 (c)(1),
(2), (4) Date: Sep. 30, 2002

(87) PCT Pub. No.: WO01/73215

PCT Pub. Date: Oct. 4, 2001

(65) Prior Publication Data

US 2003/0115020 A1 Jun. 19, 2003

(30) Foreign Application Priority Data

| Mar. 31, 2000 | (JP) | ......................... 2000-97996 |
| Mar. 31, 2000 | (JP) | ......................... 2000-98032 |
| Oct. 4, 2000 | (JP) | ....................... 2000-304938 |

(51) Int. Cl.[7] ............................................. G04F 10/00
(52) U.S. Cl. .................... 702/184; 702/185; 702/34; 701/50
(58) Field of Search ................. 701/29–35, 50; 702/184, 187, 182, 177; 340/309.7, 457.4

(56) References Cited

U.S. PATENT DOCUMENTS

| 5,737,215 | A | | 4/1998 | Schricker et al. |
| 5,953,707 | A | * | 9/1999 | Huang et al. .................. 705/10 |
| 6,141,629 | A | * | 10/2000 | Yamamoto et al. ......... 702/187 |
| 6,199,018 | B1 | * | 3/2001 | Quist et al. .................... 702/34 |
| 6,219,597 | B1 | | 4/2001 | Longere |
| 6,339,737 | B1 | | 1/2002 | Yoshimura et al. |
| 6,832,175 | B2 | * | 12/2004 | Adachi et al. ............... 702/177 |

FOREIGN PATENT DOCUMENTS

| JP | 1-288991 | 11/1989 |
| JP | 3-173321 | 1/1991 |
| JP | 11-36381 | 2/1999 |
| JP | 2000-27236 | 1/2000 |
| JP | 2000-027236 | 1/2000 |

OTHER PUBLICATIONS

Iglesias, Jose, "Maintenance Planning Made Easy", Engineering & Automation, Siemens AG, XVIII, No. 5, 1996, pp. 28–29.

* cited by examiner

Primary Examiner—Kamini Shah
(74) Attorney, Agent, or Firm—Mattingly, Stanger, Malur & Brundidge, P.C.

(57) ABSTRACT

A method and system for managing a construction machine whereby working time for each of different parts of a hydraulic excavator is measured. Measured data is stored in a memory of a controller and then transferred to a base station computer via satellite communication to be stored in a database. At each repair/replacement of a part in each hydraulic excavator, the base station computer calculates, based on the operation data, a replacement time interval of the part on the basis of the working time per section to which the part belongs, and then stores and accumulates it. The base station computer also reads the stored data for each hydraulic excavator, determines, for each part, a replacement rate of the part having a substantially equal replacement time interval, and calculates a target replacement time interval of the part in accordance with the replacement time interval corresponding to a maximum replacement rate.

19 Claims, 48 Drawing Sheets

FIG.9

OPERATION DATABASE PER MACHINE
MODEL AND NUMBER

| | MODEL A NO. N | | |
|---|---|---|---|
| 1 | JAN. 1, 2000 | $T_{NE}(1)$ $T_D(1)$ | ... |
| ⋮ | ⋮ | | |
| K | MARCH 16, 2000 | $T_{NE}(K)$ $T_D(K)$ | ... |
| | ⋮ | | |

MODEL A NO. N+1
MODEL A NO. N+2
...

ACTUAL MAINTENANCE DATABASE PER
MACHINE MODEL AND NUMBER

| | MODEL A NO. N |
|---|---|
| | ENGINE OIL FILTER REPLACEMENT TIME INTERVAL (CUMULATIVE VALUE) |
| 1 | $T_{EF}(1)$ ... e.g., 3400 hr |
| ⋮ | ⋮ |
| L | $T_{EF}(L)$ ... e.g., 12500 hr |
| | FRONT BUSHING REPLACEMENT TIME INTERVAL (CUMULATIVE VALUE) |
| 1 | $T_{FB}(1)$ ... e.g., 5100 hr |
| ⋮ | ⋮ |
| M | $T_{FB}(M)$ ... e.g., 14900 hr |
| | ⋮ |

MODEL A NO. N+1
MODEL A NO. N+2
...

TARGET MAINTENANCE DATABASE PER MACHINE MODEL

| MODEL A |
|---|
| ENGINE OIL FILTER TARGET REPLACEMENT TIME INTERVAL $T_{M-EF}$ ... e.g., 4000 hr |
| FRONT BUSHING TARGET REPLACEMENT TIME INTERVAL $T_{M-FB}$ ... e.g., 5000 hr |
| ⋮ |

MODEL B
MODEL C
...

| DATE | OIL SUPPLY | HOUR METER INDICATING START OF WORKING | WORKING TIME (TIME OF DAY) 0 2 4 6 8 10 12 14 16 18 20 22 24 | WORKING TIME (HR) | AMOUNT OF FUEL REMAINING(%) | EXCAVA-TION | SWING | TRAVEL |
|---|---|---|---|---|---|---|---|---|
| 11/26 | | 1238 | | 7.0 | 30 | 5.5 | 0.5 | 1.0 |
| 11/27 | | 1245 | | 7.6 | 40 | 5.9 | 0.8 | 0.9 |
| 11/28 | | 1253 | | 7.8 | 35 | 6.2 | 0.4 | 1.2 |
| 11/29 | | 1260 | | 7.0 | 45 | 6.0 | 0.4 | 0.9 |
| 11/30 | ▨ | 1268 | | 7.7 | 80 | 6.3 | 0.1 | 1.0 |
| 12/1 | | | OIL SUPPLY AMOUNT (LITER) 200 | 8.0 | 70 | 6.5 | 0.4 | 1.1 |
| 12/2 | | | | | 70 | | | |
| 12/3 | | 1314 | | 7.0 | 65 | 5.8 | 0.4 | 0.8 |
| 12/4 | | 1322 | | 7.2 | 40 | . . | . . | . . |
| 12/5 | | 1329 | | 8.6 | 45 | . . | . . | . . |
| 12/6 | | 1329 | | 8.9 | 89 | . . | . . | . . |
| 12/7 | | 1335 | | 7.6 | 76 | . . | . . | . . |
| 12/8 | | 1344 | | 6.5 | 65 | . . | . . | . . |
| 12/9 | | 1352 | | 6.5 | 65 | . . | . . | . . |
| 12/10 | | 1360 | | 7.4 | 50 | . . | . . | . . |
| 12/11 | | 1367 | | 7.7 | 45 | . . | . . | . . |
| 12/12 | | 1375 | | 7.5 | 90 | . . | . . | . . |
| 12/13 | | 1375 | | 8.0 | 80 | . . | . . | . . |
| 12/14 | | 1383 | | 7.5 | 77 | . . | . . | . . |
| 12/15 | | 1391 | | 8.0 | 70 | . . | . . | . . |
| 12/16 | | 1399 | | 7.5 | 65 | . . | . . | . . |
| 12/17 | | 1407 | | 7.7 | 60 | . . | . . | . . |
| 12/18 | | 1415 | | 8.3 | 55 | . . | . . | . . |
| 12/19 | | 1422 | | 8.0 | 50 | . . | . . | . . |
| 12/20 | | 1422 | | 8.0 | 45 | . . | . . | . . |
| 12/21 | | 1430 | | 7.4 | 40 | . . | . . | . . |
| 12/22 | | 1437 | | 7.4 | 40 | . . | . . | . . |
| 12/23 | | | | 7.4 | 37 | . . | . . | . . |
| 12/24 | | | | | 35 | . . | . . | . . |
| 12/25 | | | | 7.8 | 30 | . . | . . | . . |
| 12/26 | | | | 7.4 | | . . | . . | . . |
| | | | TOTAL | 213.1 | | | | |

OIL SUPPLY AMOUNT  4710  (LITER)

AMOUNT OF FUEL CONSUMED  22.1  (LITER/HR)

MACHINE MODEL ○○○○○  MACHINE NO. × × × ×

NOV. 26 TO DEC. 26, 2000

FIG.24

OPERATION DATABASE

| | MODEL A NO. N | |
|---|---|---|
| DAILY REPORT DATA | JAN. 1, 2000     $T_{NE}(1)$   $T_D(1)$ ··· | |
| | ⋮ | |
| OPERATION FREQUENCY DISTRIBUTION DATA | K  MARCH 16, 2000   $T_{NE}(K)$   $T_D(K)$ ··· | |
| | PUMP LOAD FREQUENCY DISTRIBUTION | |
| | OPERATION OF FROM 0 hr TO 100 hr | |
| | FROM 0 MPa TO 5 MPa | 6 h |
| | FROM 5 MPa TO 10 MPa | 8 h |
| | ⋮ | ⋮ |
| | FROM 25 MPa TO 30 MPa | 10 hr |
| | NOT LESS THAN 30 MPa | 2 hr |
| | FROM 100 hr TO 200 hr | |
| | ⋮ | |
| | FROM 200 hr TO 300 hr | |
| | ⋮ | |
| | ⋮ | |
| | FROM 1500 hr TO 1600 hr | |
| | ⋮ | |
| | FLUID TEMPERATURE FREQUENCY DISTRIBUTION | |
| | FROM 0 hr TO 100 hr | |
| | ⋮ | |
| | ⋮ | |
| | FROM 1500 hr TO 1600 hr | |
| | ⋮ | |

MODEL A NO. N+1

MODEL A NO. N+2

| OCCURRENCE DATE | TIME OF DAY | TYPE | |
|---|---|---|---|
| 2000 1.1 | 13:00 | ENGINE OIL WARNING | ON OFF |
| 2000 1.2 | 15:00 | WATER TEMPERATURE WARNING | ON OFF |
| ⋮ | | ⋮ | |

FIG.37

ACTUAL MAINTENANCE DATABASE PER
MACHINE MODEL AND NUMBER

| | MODEL A NO. N | |
|---|---|---|
| | ENGINE OIL FILTER REPLACEMENT TIME INTERVAL (CUMULATIVE VALUE) | |
| 1 | $T_{EF}(1)$ | e.g., 3400 hr |
| ⋮ | ⋮ | |
| L | $T_{EF}(L)$ | e.g., 12500 hr |
| | FRONT BUSHING REPLACEMENT TIME INTERVAL (CUMULATIVE VALUE) | |
| 1 | $T_{FB}(1)$ | e.g., 5100 hr |
| ⋮ | ⋮ | |
| M | $T_{FB}(M)$ | e.g., 14900 hr |
| | ⋮ | |
| | ENGINE REPAIR TIME INTERVAL (CUMULATIVE VALUE) | |
| 1 | $T_{ENR}(1)$ | e.g., 4100 hr |
| ⋮ | ⋮ | |
| K | $T_{ENR}(K)$ | e.g., 18000 hr |
| | HYDRAULIC PUMP REPAIR TIME INTERVAL (CUMULATIVE VALUE) | |
| 1 | $T_{HP}(1)$ | e.g., 2500 hr |
| ⋮ | ⋮ | |
| N | $T_{HP}(N)$ | e.g., 16200 hr |
| | ⋮ | |

MODEL A NO. N+1

MODEL A NO. N+2

TARGET MAINTENANCE DATABASE PER
MACHINE MODEL

| MODEL A | MODEL B |
|---|---|
| ENGINE OIL FILTER TARGET REPLACEMENT TIME INTERVAL $T_{M-EF}$ ... e.g., 4000 hr | |
| FRONT BUSHING REPLACEMENT TARGET TIME INTERVAL $T_{M-FB}$ ... e.g., 5000 hr | MODEL C |
| ⋮ | ... |
| ENGINE TARGET REPAIR TIME INTERVAL $T_{M-EN}$ ... e.g., 6000 hr | |
| HYDRAULIC PUMP TARGET REPAIR TIME INTERVAL $T_{M-HP}$ ... e.g., 5000 hr | |
| ⋮ | |

METHOD AND SYSTEM FOR MANAGING CONSTRUCTION MACHINE, AND ARITHMETIC PROCESSING APPARATUS

TECHNICAL FIELD

The present invention relates to a method and system for managing a construction machine, and a processing apparatus. More particularly, the present invention relates to a method and system for managing a construction machine, such as a hydraulic excavator, which has a plurality of sections different in working time from each other, e.g., a front operating mechanism section, a swing section and a travel section, as well as to a processing apparatus.

BACKGROUND ART

To determine the scheduled repair/replacement timing of a part in a construction machine such as a hydraulic excavator, it is required to know the target repair/replacement time interval of the part and the past working time of the part. Heretofore, the target repair/replacement time interval of each part has been decided based on design data and experiences with a safety factor taken into consideration. Accordingly, the target repair/replacement time interval has been set to a slightly shorter interval. Also, the working time of each part has been calculated on the basis of the engine running time. As a result, the scheduled repair/replacement timing of parts has been calculated on the basis of the engine running time.

In a maintenance monitoring apparatus disclosed in JP,A 1-288991, for example, a time during which an engine is running (engine running time) is measured using a timer based on an output from a sensor for detecting the hydraulic pressure of an engine oil or an output from a sensor for detecting power generation of an alternator, and the engine running time measured using the timer is subtracted from the target replacement time of the relevant part, which is stored in a memory. Then, the resulted time difference is displayed on a display means. By checking the displayed time difference, each part including, e.g., oil and an oil filter, can be replaced without missing the proper timing of replacement of the part.

DISCLOSURE OF THE INVENTION

In the above-described prior art, it has been general that the target repair/replacement time interval of each part is decided based on design data and experiences with a safety factor taken into consideration, and hence the target repair/replacement time interval is set to a slightly shorter interval. For that reason, the scheduled repair/replacement timing of the part, which is decided from such a target repair/replacement time interval, cannot be said as being proper one. This has resulted in that parts are often repaired or replaced in spite of being still satisfactorily usable, and substantial waste in use of parts is unavoidable.

Also, in a construction machine such as a hydraulic excavator, parts to be subjected to maintenance include not only an engine oil and an engine oil filter, but also parts of a front as a working mechanism, including a bucket prong, a front pin (e.g., a joint pin between a boom and an arm), a bushing around the front pin, the arm and a bucket themselves serving as front parts, parts of a swing device, including a swing transmission oil, a swing transmission seal and a swing wheel, as well as parts of a travel device, including a track transmission oil, a track transmission seal, a track shoe, a track roller and a track motor. Of those parts, the engine oil and the engine oil filter are parts working during the engine operation. The front bucket prong, the front pin (e.g., the joint pin between the boom and the arm), and the bushing around the front pin, the arm and the bucket are parts working during the front operation (excavation). The swing transmission oil, the swing transmission seal and the swing wheel are parts working during the swing operation. The track transmission oil, the track transmission seal, the track shoe, the track roller and the track motor are parts working during the travel operation.

The engine, the front, the swing body and the travel body are sections different in working time from each other, and each have a specific working (operating) time. More specifically, the engine starts running upon turning-on of a key switch, whereas the front, the swing body and the travel body start working upon the operator operating them while the engine is running. Accordingly, the engine running time, the front operating time, the swing time and the travel time have different values from each other.

In spite of such situations regarding the working time for each section, the part working time has been uniformly calculated on the basis of the engine running time. Therefore, the working time of each of parts associated with the front, the swing body and the travel body, which has been calculated on the basis of the engine running time, differs from the actual working time, and the scheduled repair/replacement timing calculated from the measured working time cannot be said as being appropriate one. This has resulted in a problem that the part is repaired or replaced in spite of the part being still usable, or it is damaged prior to reaching the scheduled repair/replacement timing.

The engine, a main pump, a pilot pump, an alternator, etc. also have suffered from a similar problem, i.e., one that the part is repaired in spite of the part being still usable, or it is damaged prior to reaching the scheduled repair timing.

A first object of the present invention is to provide a method and system for managing a construction machine, and a processing apparatus, with which appropriate target repair/replacement time intervals of parts can be set.

A second object of the present invention is to provide a method and system for managing a construction machine, and a processing apparatus, with which the appropriate scheduled repair/replacement timing of parts can be decided.

(1) To achieve the above first and second objects, the present invention provides a method for managing a construction machine, comprising the steps of statistically processing an actual repair/replacement time interval for each of parts of a plurality of construction machines, comparing the statistically processed data with operation information of a particular construction machine, and deciding a scheduled repair/replacement timing of a corresponding part of the particular construction machine.

Since the actual repair/replacement time interval is statistically processed and used as comparison data, appropriate target repair/replacement time intervals of parts can be set and the appropriate scheduled repair/replacement timing of parts can be decided.

(2) Also, to achieve the above first object, the present invention provides a method for managing a construction machine, the method comprising a first step of measuring a working time for each of sections in each of a plurality of construction machines, and storing and accumulating the measured working time as operation data for each construction machine in a database; a second step of determining, based on repair/replacement data for each part of the construction machine and the operation data, an actual repair/replacement time interval of each part on the basis of the working time per section to which the relevant part belongs; and a third step of statistically processing the actual repair/replacement time interval and setting a target repair/replacement time interval of the relevant part using the statistically processed data.

Thus, by storing and accumulating the working time for each section as operation data, determining an actual repair/replacement time interval of each part on the basis of the working time per section to which the relevant part belongs, and statistically processing the actual repair/replacement time interval to set a target repair/replacement time interval, the target repair/replacement time interval reflects the working time up to actual repair/replacement of the part, and hence appropriate target repair/replacement time intervals of parts can be set.

(3) Further, to achieve the second object, in the managing method of above (2) according to the present invention, the method further comprises a fourth step of determining, based on the operation data accumulated in the first step, a working time of a corresponding part on the basis of the working time per section of a particular construction machine, comparing the determined working time with the target repair/replacement time interval, and deciding a scheduled repair/replacement timing of the corresponding part of the particular construction machine.

Thus, by employing the appropriate target repair/replacement time interval set in above (2), determining a working time of a corresponding part on the basis of the working time per section, and deciding the scheduled repair/replacement timing of the part from comparison of the appropriate target repair/replacement time interval and the determined working time, the appropriate scheduled repair/replacement timing of parts can be decided even in a construction machine having a plurality of sections that differ in working time from each other.

(4) In above (2), preferably, the third step includes steps of determining a relationship between the actual repair/replacement time interval of a part determined in the second step and the number of times of repairs/replacements of the part, determining a repair/replacement time interval corresponding to a maximum number of times of repairs/replacements from the relationship, and deciding the target repair/replacement time interval of the part based on the determined repair/replacement time interval.

With those features, the appropriate target repair/replacement time interval reflecting the working time up to actual repair/replacement of the part can be set.

(5) Further, to achieve the second object, in the managing method of above (4) according to the present invention, the method further comprises a fourth step of determining, based on the operation data accumulated in the first procedure, a working time of a corresponding part on the basis of the working time per section of the particular construction machine, and comparing the determined working time with the target repair/replacement time interval, thereby calculating a remaining time up to next repair/replacement of the relevant part.

With those features, the appropriate scheduled repair/replacement timing of parts can be decided.

(6) In above (2), preferably, the first step includes steps of measuring and collecting a load for each section in addition to the working time for each section, and storing and accumulating the measured working time and load for each section as the operation data for each construction machine in the database; and the third step includes a fourth step of statistically processing the actual repair/replacement time interval of the part and the load both determined in the second step, and a fifth step of determining the target repair/replacement time interval, as a value modified depending on loads, based on the operation data of the particular construction machine and the statistically processed data.

With those features, the target repair/replacement time interval reflects the working time and load up to actual repair/replacement of the part, and therefore the more appropriate target repair/replacement time interval can be set.

(7) In above (6), preferably, the fourth step includes steps of calculating, for each actual repair/replacement time interval of the part, a load factor of the relevant part and determining correlation between the load factor and the repair/replacement time interval; and the fifth step includes steps of determining a working time of a corresponding part on the basis of the working time per section of the particular construction machine, calculating a load factor during the determined working time, and referring the calculated load factor to the correlation to determine a corresponding repair/replacement time interval as the target repair/replacement time interval.

With those features, the target repair/replacement time interval can be determined as a value modified depending on loads.

(8) Moreover, to achieve the above second object, in the managing method of above (7) according to the present invention, the method further comprises a sixth step of determining, based on the operation data accumulated in the first step, a working time of a corresponding part on the basis of the working time per section of the particular construction machine, and comparing the determined working time with the target repair/replacement time interval, thereby calculating a remaining time up to next repair/-replacement of the relevant part.

With those features, the more appropriate scheduled repair/replacement timing of parts can be decided using the more appropriate target repair/replacement time interval modified depending on loads.

(9) In above (6), preferably, the fourth step includes steps of modifying the actual repair/replacement time interval of the part depending on loads, collecting the repair/replacement time interval modified depending on loads, and setting a load-dependent modification index value for the target repair/replacement time interval; and the fifth step includes the steps of calculating a working time of a corresponding part on the basis of the working time per section of the particular construction machine, modifying the calculated working time depending on loads, and comparing the working time modified depending on loads with the load-dependent modification index value, thereby determining the target repair/replacement time interval.

With those features, it is also possible to determine the target repair/replacement time interval as a value modified depending on loads.

(10) In above (9), preferably, the fourth step includes steps of determining an average value of the collected data of the repair/replacement time interval modified depending on loads, and setting the average value as the load-dependent modification index value.

With those features, the load-dependent modification index value for the target repair/replacement time interval can be set as a value corresponding to an average load.

(11) Still further, to achieve the second object, in the managing method of above (9) according to the present invention, the method further comprises a sixth step of comparing the working time of the corresponding part of the particular construction machine determined in the fifth step with the target repair/replacement time interval modified depending on loads, thereby calculating a remaining time up to next repair/replacement of the relevant part.

With those features, the more appropriate scheduled repair/replacement timing of parts can be decided using the more appropriate target repair/replacement time interval modified depending on loads.

(12) Still further, to achieve the second object, in the managing method of above (2) according to the present invention, the method further comprises the first step includes steps of measuring and collecting a load for each section in addition to the working time for each section, and storing and accumulating the measured working time and load for each section as the operation data for each construction machine in the database; and the method further comprises a fourth step of determining, based on the operation data accumulated in the first procedure, a working time of a corresponding part on the basis of the working time per section of a particular construction machine, determining a load factor during the determined working time, modifying the determined working time in accordance with the load factor, and comparing the modified working time with a preset target repair/replacement time interval, thereby calculating a remaining time up to next repair/replacement of the relevant part.

By modifying the working time of the part depending on loads in such a manner, it is also possible to decide the appropriate scheduled repair/replacement timing.

(13) In above (1) to (12), preferably, the construction machine is a hydraulic excavator, and the sections include a front, a swing body, a travel body, an engine, and a hydraulic pump of the hydraulic excavator.

With those features, it is possible to set the appropriate target repair/replacement time interval and hence the appropriate scheduled repair/replacement timing for parts associated with the front, the swing body, the travel body, the engine, and the hydraulic pump of the hydraulic excavator.

(14) Also, to achieve the above first and second objects, the present invention provides a system for managing a construction machine, the system comprising means for statistically processing an actual repair/replacement time interval for each of parts of a plurality of construction machines, and means for comparing the statistically processed data with operation information of a particular construction machine, and deciding a scheduled repair/replacement timing of a corresponding part of the particular construction machine.

(15) Further, to achieve the first object, the present invention provides a system for managing a construction machine, the system comprising operation data measuring and collecting means for measuring and collecting a working time for each of sections in each of a plurality of construction machines; and a base station computer installed in a base station and having a database for storing and accumulating, as operation data, the working time measured and collected for each section, the base station computer comprising first means for determining, based on repair/replacement data for each part of the construction machine and the operation data, an actual repair/replacement time interval of each part on the basis of the working time per section to which the relevant part belongs; and second means for statistically processing the actual repair/replacement time interval and setting a target repair/replacement time interval of the relevant part using the statistically processed data.

(16) Still further, to achieve the second object, in the managing system of above (15) according to the present invention, the base station computer further comprises third means for determining, based on the accumulated operation data, a working time of a corresponding part on the basis of the working time per section of a particular construction machine, comparing the determined working time with the target repair/replacement time interval, and deciding a scheduled repair/replacement timing of the corresponding part of the particular construction machine.

(17) In above (15), preferably, the second means determines a relationship between the actual repair/replacement time interval of a part determined by the first means and the number of times of repairs/replacements of the part, determines a repair/replacement time interval corresponding to a maximum number of times of repairs/replacements from the relationship, and decides the target repair/replacement time interval of the part based on the determined repair/replacement time interval.

(18) Still further, to achieve the second object, in the managing system of above (17) according to the present invention, the base station computer further comprises third means for determining, based on the accumulated operation data, a working time of a corresponding part on the basis of the working time per section of the particular construction machine, and comparing the calculated working time with the target repair/replacement time interval, thereby calculating a remaining time up to next repair/replacement of the relevant part.

(19) In above (15), preferably, the operation data measuring and collecting means measures and collects a load for each section in addition to the working time for each section; the base station computer stores and accumulates the measured working time and load for each section as the operation data in the database; and the second means includes third means for statistically processing the actual repair/replacement time interval of the part and the load both determined by the first means, and fourth means for determining the target repair/replacement time interval, as a value modified depending on loads, based on the operation data of the particular construction machine and the statistically processed data.

(20) In above (19), preferably, the third means calculates, for each actual repair/replacement time interval of the part, a load factor of the relevant part and determines correlation between the load factor and the repair/replacement time interval; and the fourth means determines a working time of a corresponding part on the basis of the working time per section of the particular construction machine, calculates a load factor during the determined working time, and refers to the correlation using the calculated load factor to determine a corresponding repair/replacement time interval which is set as the target repair/replacement time interval.

(21) Still further, to achieve the second object, in the managing system of above (20) according to the present invention, the base station computer further comprises fifth means for determining, based on the accumulated operation data, a working time of a corresponding part on the basis of the working time per section of the particular construction machine, and comparing the determined working time with the target repair/replacement time interval, thereby calculating a remaining time up to next repair/replacement of the relevant part.

(22) In above (19), preferably, the third means modifies the actual repair/replacement time interval of the part depending on loads, collects the repair/replacement time interval modified depending on loads, and sets a load-dependent modification index value for the target repair/replacement time interval; and the fourth means calculates a working time of a corresponding part on the basis of the working time per section of the particular construction machine, modifies the calculated working time depending on loads, and compares the working time modified depending on loads with the load-dependent modification index value, thereby determining the target repair/replacement time interval.

(23) In above (22), preferably, the third means determines an average value of the collected data of the repair/replacement time interval modified depending on loads, and setting the average value as the load-dependent modification index value for the target repair/replacement time interval.

(24) Still further, to achieve the second object, in the managing system of above (22) according to the present invention, the base station computer further comprises fifth means for comparing the working time of the corresponding part of the particular construction machine determined by the fourth means with the target repair/replacement time interval modified depending on loads, thereby calculating a remaining time up to next repair/replacement of the relevant part.

(25) Still further, to achieve the second object, in the managing system of above (15) according to the present invention, the operation data measuring and collecting means measures and collects a load for each section in addition to the working time for each section; the base station computer stores and accumulates the measured working time and load for each section as the operation data in the database; and the base station computer further comprises third means for determining, based on the accumulated operation data, a working time of a corresponding part on the basis of the working time per section of a particular construction machine, determining a load factor during the determined working time, modifying the determined working time in accordance with the load factor, and comparing the modified working time with a preset target repair/replacement time interval, thereby calculating a remaining time up to next repair/replacement of the relevant part.

(26) In above (14) to (25), preferably, the construction machine is a hydraulic excavator, and the sections include a front, a swing body, a travel body, an engine, and a hydraulic pump of the hydraulic excavator.

(27) Also, to achieve the first and second objects, the present invention provides a processing apparatus which statistically processes an actual repair/replacement time interval for each of parts of a plurality of construction machines, compares the statistically processed data with operation information of a particular construction machine, and decides the scheduled repair/replacement timing of a corresponding part of the particular construction machine.

(28) Further, to achieve the first object, the present invention provides a processing apparatus which stores and accumulates, as operation data, a working time for each of sections in each of a plurality of construction machines, determines, based on repair/replacement data for each part of the construction machine and the operation data, an actual repair/replacement time interval of each part on the basis of the working time per section to which the relevant part belongs, statistically processes the actual repair/replacement time interval, and sets a target repair/replacement time interval of the relevant part using the statistically processed data.

(29) Still further, to achieve the second object, the processing apparatus of above (28) according to the present invention further determines the operation data of a particular construction machine from the accumulated operation data, compares the determined operation data with the target repair/replacement time interval, and calculates a scheduled repair/replacement timing of a corresponding part of the particular construction machine.

(30) In above (28), preferably, the apparatus further stores and accumulates, as the operation data, a load for each section in addition to the working time for each section, statistically processes the actual repair/replacement time interval of the part and the load, and determines the target repair/replacement time interval, as a value modified depending on loads, based on the operation data of the particular construction machine and the statistically processed data.

BRIEF DESCRIPTION OF THE DRAWINGS

FIG. 9 shows how operation data, actual maintenance data, and target maintenance data are stored as a database in the base station center server.

FIG. 14 is a table showing one example of a daily report transmitted to an in-house computer and a user side computer.

FIG. 24 shows how the frequency distribution data is stored as a database in the base station center server.

FIG. 26 shows one example of a diagnostic report transmitted to the in-house computer and the user side computer.

FIG. 37 shows how actual maintenance data is stored as a database in the base station center server.

FIG. 38 shows how target maintenance data is stored as a database in the base station center server.

BEST MODE FOR CARRYING OUT THE INVENTION

Embodiments of the present invention will be described below with reference to the drawings.

To begin with, a first embodiment of the present invention will be described with reference to FIGS. 1 to 26.

Figure 1:
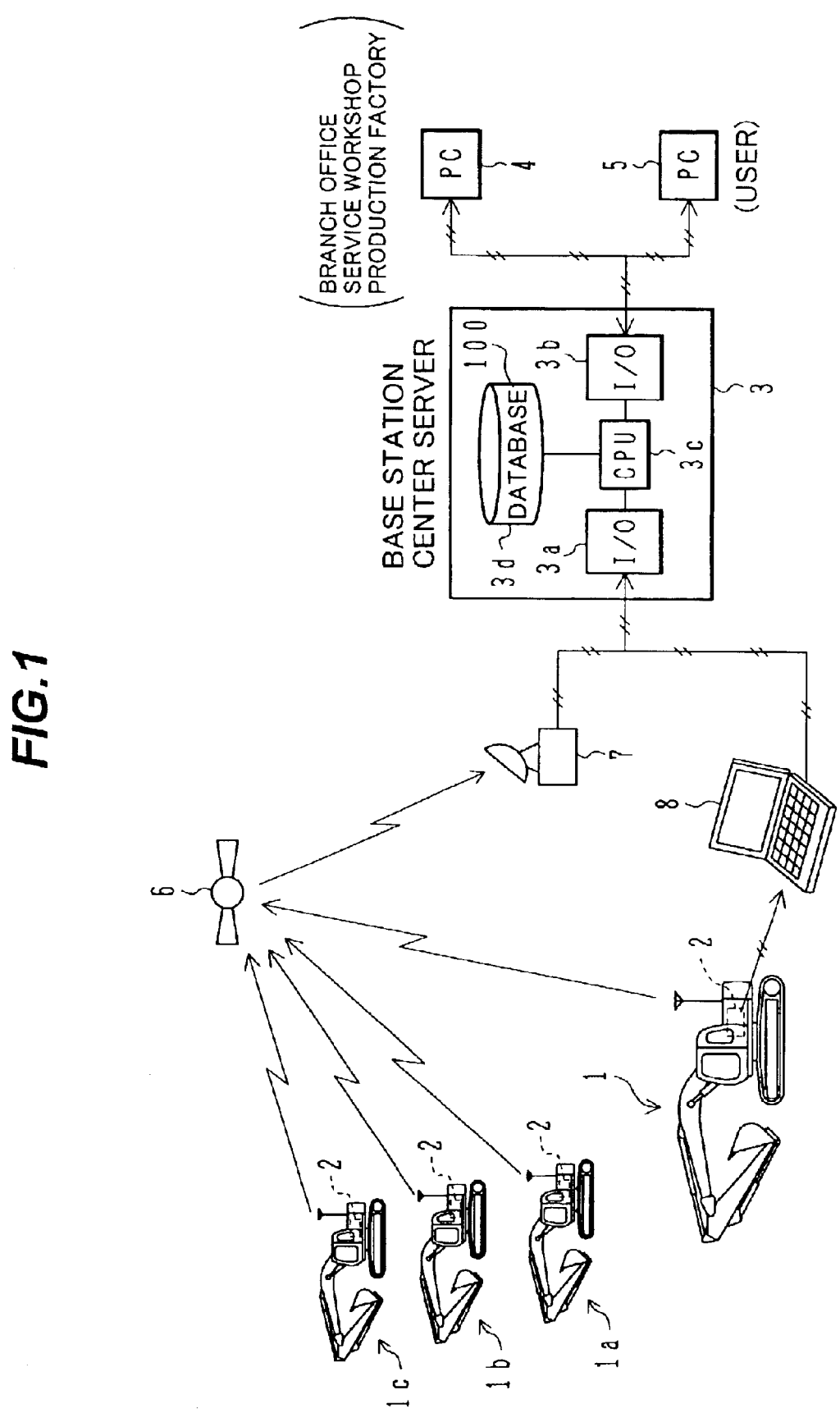
FIG. 1 shows an overall outline of a management system for a construction machine according to a first embodiment of the present invention.

FIG. 1 shows an overall outline of a management system for a construction machine according to the first embodiment of the present invention. The management system includes a system for setting a target maintenance time.

Referring to FIG. 1, the management system of this embodiment comprises machine side controllers 2 mounted on hydraulic excavators 1, 1a, 1b, 1c, . . . (hereinafter represented by numeral 1) working in fields; a base station center server 3 installed in a main office, a branch office, a production factory or the like; an in-house computer 4 installed in the branch office, a service workshop, the production factory or the like; and a user side computer 5. The base station center server 3 may be installed, in addition to the above-mentioned places, in any other desired place, for example, in a rental company possessing plural units of hydraulic excavators.

The controller 2 in each hydraulic excavator 1 collects operation information of the hydraulic excavator 1. The collected operation information is sent to a ground station 7 along with machine body information (machine model and number) via satellite communication using a communication satellite 6, and then transmitted from the ground station 7 to the base station center server 3. The machine body/operation information may be taken into the base station center server 3 through a personal computer 8 instead of satellite communication. In such a case, a serviceman downloads the operation information collected by the controller 2 into the personal computer 8 along with the machine body information (machine model and number). The downloaded information is taken into the base station center server 3 from the personal computer 8 using a floppy disk or via a communication line such as a public telephone line or the Internet. When using the personal computer 8, in addition to the machine body/operation information of the hydraulic excavator 1, check information obtained by the routine inspection and repair information can also be collected through manual inputting by the serviceman. Such manually inputted information is similarly taken into the base station center server 3.

Figure 2:
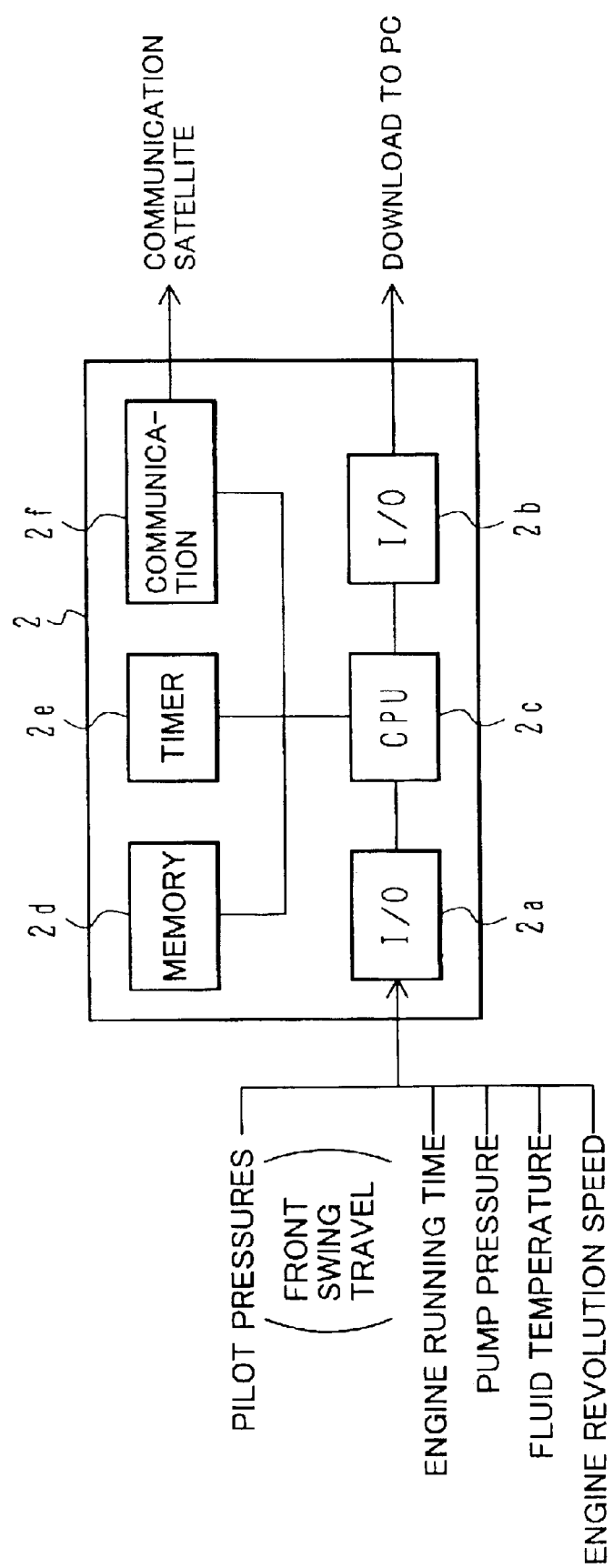
FIG. 2 shows details of the configuration of a machine side controller.

FIG. 2 shows details of the configuration of the machine side controller 2. In FIG. 2, the controller 2 comprises input/output interfaces 2a, 2b, a CPU (Central Processing Unit) 2c, a memory 2d, a timer 2e, and a communication control unit 2f.

The controller 2 receives, from a sensor group (described later) through the input/output interface 2a, detected signals of pilot pressures associated with the front, swing and travel; a detected signal of the running time (hereinafter referred to as the "engine running time") of an engine 32 (see FIG. 3); a detected signal of the pump pressure in a hydraulic system; a detected signal of the fluid temperature in the hydraulic system; and a detected signal of the engine revolution speed. The CPU 2c processes those data of the received information into operation information in the predetermined form by using the timer (including the clocking function) 2e, and then stores the operation information in the memory 2d. The communication control unit 2f routinely transmits the operation information to the base station center server 3 through satellite communication. Also, the operation information is downloaded into the personal computer 8 through the input/output interfaces 2b.

Additionally, the machine side controller 2 includes a ROM for storing control programs, with which the CPU 2c executes the above-described processing, and a RAM for temporarily storing data during the processing.

Figure 3:
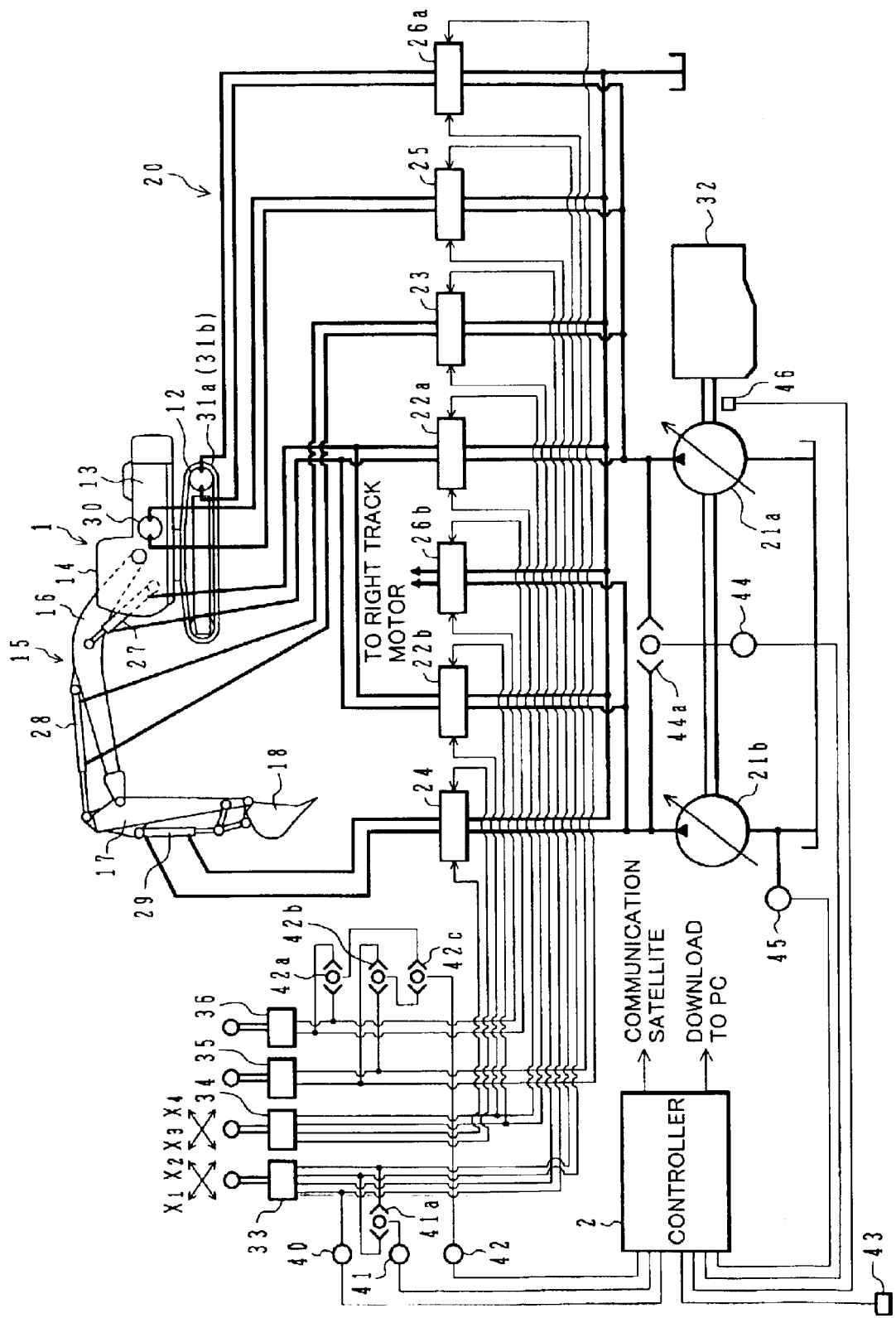
FIG. 3 shows details of a hydraulic excavator and a sensor group.

FIG. 3 shows details of the hydraulic excavator 1 and the sensor group. In FIG. 3, the hydraulic excavator 1 comprises a travel body 12; a swing body 13 rotatably mounted on the travel body 12; a cab 14 provided in a front left portion of the swing body 13; and an excavation device, i.e., a front 15, mounted to a front central portion of the swing body 13 in a vertically rotatable manner. The front 15 is made up of a boom 16 rotatably provided on the swing body 13; an arm 17 rotatably provided at a fore end of the boom 16; and a bucket 18 rotatably provided at a fore end of the arm 17.

Also, a hydraulic system 20 is mounted on the hydraulic excavator 1. The hydraulic system 20 comprises hydraulic pumps 21a, 21b; boom control valves 22a, 22b, an arm control valve 23, a bucket control valve 24, a swing control valve 25, and track control valves 26a, 26b; and a boom cylinder 27, an arm cylinder 28, a bucket cylinder 29, a swing motor 30, and track motors 31a, 31b. The hydraulic pumps 21a, 21b are driven for rotation by a diesel engine (hereinafter referred to simply as an "engine") 32 to deliver a hydraulic fluid. The control valves 22a, 22b to 26a, 26b control flows (flow rates and flow directions) of the hydraulic fluid supplied from the hydraulic pumps 21a, 21b to the actuators 27 to 31a and 31b. The actuators 27 to 31a and 31b drive the boom 16, the arm 17. the bucket 18, the swing body 13, and the travel body 12. The hydraulic pumps 21a, 21b, the control valves 22a, 22b to 26a, 26b, and the engine 32 are installed in an accommodation room formed in a rear portion of the swing body 13.

Control lever devices 33, 34, 35 and 36 are provided in association with the control valves 22a, 22b to 26a, 26b. When a control lever of the control lever device 33 is operated in one X1 of two cruciformly crossing directions, an arm-crowding pilot pressure or an arm-dumping pilot pressure is generated and applied to the arm control valve 23. When the control lever of the control lever device 33 is operated in the other X2 of the two cruciformly crossing directions, a rightward swing pilot pressure or a leftward swing pilot pressure is generated and applied to the swing control valve 25. When a control lever of the control lever device 34 is operated in one X3 of two cruciformly crossing directions, a boom-raising pilot pressure or a boom-lowering pilot pressure is generated and applied to the boom control valves 22a, 22b. When the control lever of the control lever device 34 is operated in the other X4 of the two cruciformly crossing directions, a bucket-crowding pilot pressure or a bucket-dumping pilot pressure is generated and applied to the bucket control valve 24. Further, when control levers of the control lever devices 35, 36 are operated, a left-track pilot pressure and a right-track pilot pressure are generated and applied to the track control valves 26a, 26b, respectively.

The control lever devices 33 to 36 are disposed in the cab 14 together with the controller 2.

Sensors 40 to 46 are provided in the hydraulic system 20 having the above-described construction. The sensor 40 is a pressure sensor for detecting the arm-crowding pilot pressure as an operation signal for the front 15. The sensor 41 is a pressure sensor for detecting the swing pilot pressure taken out through a shuttle valve 41a, and the sensor 42 is a pressure sensor for detecting the travel pilot pressure taken out through shuttle valves 42a, 42b and 42c. Also, the sensor 43 is a sensor for detecting the on/off state of a key switch of the engine 32, the sensor 44 is a pressure sensor for detecting the delivery pressure of the hydraulic pumps 21a, 21b, i.e., the pump pressure, taken out through a shuttle valve 44a, and the sensor 45 is a fluid temperature sensor for detecting the temperature of the working fluid (fluid temperature) in the hydraulic system 1. Further, the revolution speed of the engine 32 is detected by a revolution speed sensor 46. Signals from those sensors 40 to 46 are sent to the controller 2.

Returning to FIG. 1, the base station center server 3 comprises input/output interfaces 3a, 3b, a CPU 3c, and a storage device 3d in which a database 100 is formed. The input/output interface 3a receives the machine body/operation information and the check information from the machine side controller 2, and the input/output interface 3b receives part replacement information from the in-house computer 4. The CPU 3c stores and accumulates those data of the received information in the storage device 3d in the form of the database 100. Also, the CPU 3c processes the information stored in the database 100 to make a daily report, a maintenance report, a diagnostic report, etc., and then transmits those reports to the in-house computer 4 and the user side computer 5 via the input/output interface 3b.

Additionally, the base station center server 3 includes a ROM for storing control programs, with which the CPU 3c executes the above-described processing, and a RAM for temporarily storing data during the processing.

Figure 4:
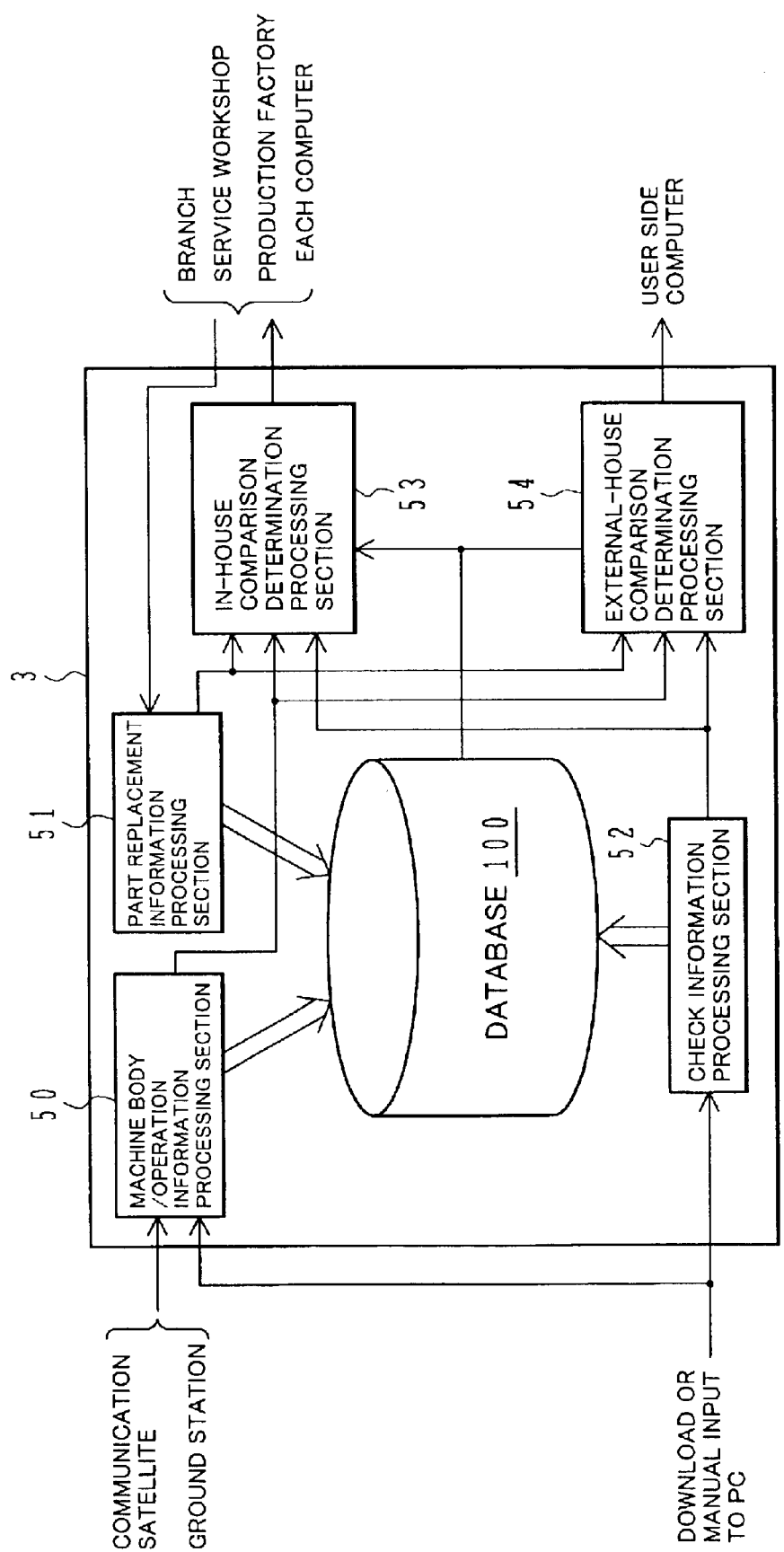
FIG. 4 is a functional block diagram showing an outline of processing functions of a CPU in a base station center server.

FIG. 4 is a functional block diagram showing an outline of processing functions of the CPU 3c. The CPU 3c has various processing functions executed in a machine body/operation information processing section 50, a part replacement information processing section 51, a check information processing section 52, an in-house comparison determination processing section 53, and an external-house comparison determination processing section 54. The machine body/operation information processing section 50 executes predetermined processing based on the operation information inputted from the machine side controller 2. The part replacement information processing section 51 executes predetermined processing based on part replacement information inputted from the in-house computer 4 (as described later). The check information processing section 52 stores and accumulates the check information, inputted from the personal computer 8, in the database 100, and also processes the check information to make a diagnostic report. The in-house comparison determination processing section 53 and the external-house comparison determination processing section 54 select required data among from not only the information prepared by the machine body/operation information processing section 50, the part replacement information processing section 51 and the check information processing section 52, but also the information stored and accumulated in the database 100, and then transmit the selected data to the in-house computer 4 and the user side computer 5.

The processing functions of the machine side controller 2 and the processing functions of the machine body/operation information processing section 50 and the part replacement information processing section 51 in the base station center server 3 will be described below with reference to flowcharts.

The processing functions of the machine side controller 2 are primarily divided into the function of collecting the working time for each section of the hydraulic excavator, the function of collecting frequency distribution data such as a load frequency distribution, and the function of collecting warning data. Correspondingly, the machine body/operation information processing section 50 of the base station center server 3 has the function of processing the working time, the function of processing the frequency distribution data, and the function of processing the warning data. Also, the part replacement information processing section 51 has the function of processing the part replacement information.

A description is first made of the function of collecting the working time for each section of the hydraulic excavator, which is executed in the machine side controller 2.

Figure 5:
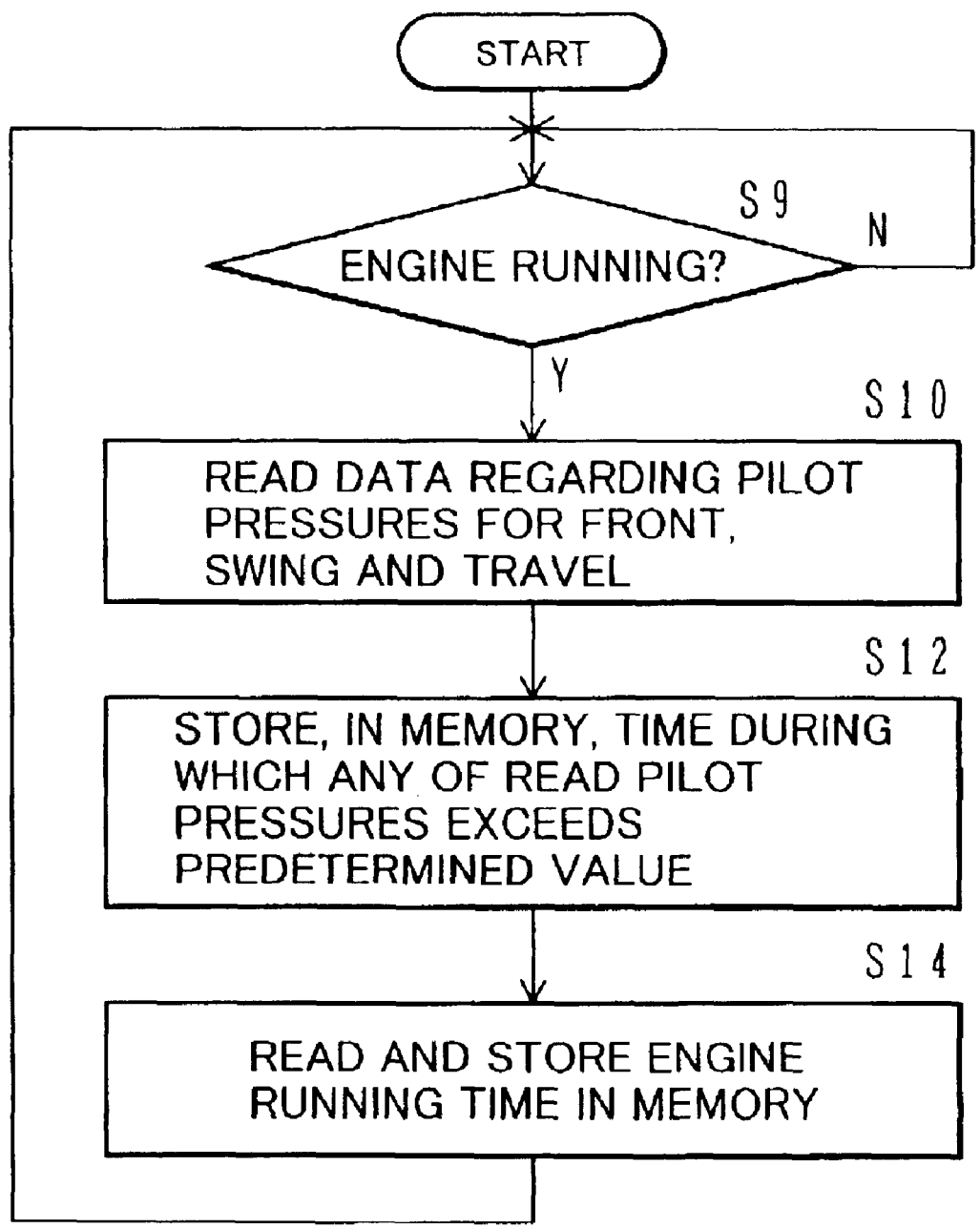
FIG. 5 is a flowchart showing the function of collecting a working time for each section of the hydraulic excavator, which is executed in a CPU of the machine side controller.
Figure 6:
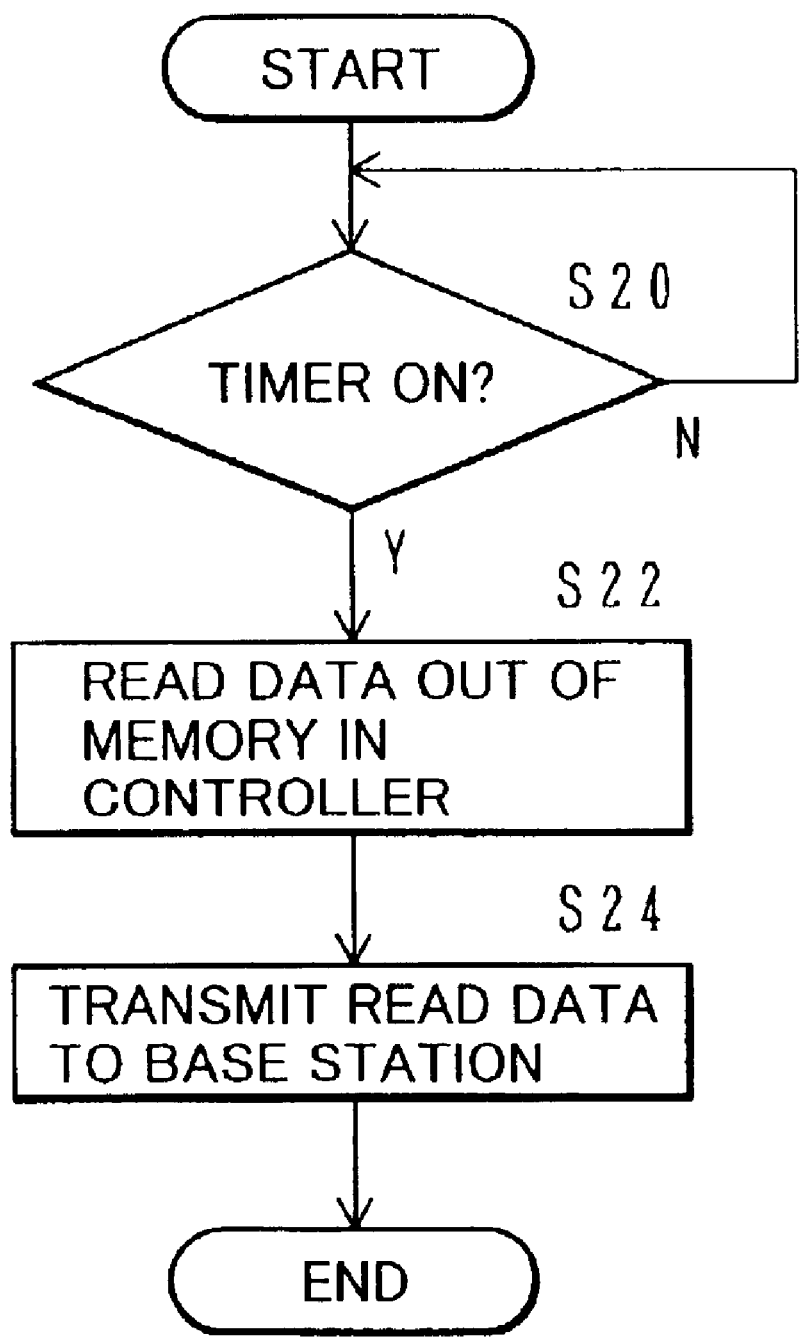
FIG. 6 is a flowchart showing the processing function of a communication control unit in the machine side controller executed when the collected working time data is transmitted.

FIG. 5 is a flowchart showing the function of collecting the working time for each section of the hydraulic excavator, which is executed in the CPU 2c of the controller 2, and FIG. 6 is a flowchart showing the processing function of the communication control unit 2f in the controller 2 executed when the collected working time data for each section is transmitted.

In FIG. 5, the CPU 2c first determines whether the engine revolution speed signal from the sensor 46 is a value not lower than a predetermined revolution speed, and hence whether the engine is running (step S9). If it is determined that the engine is not running, the step S9 is repeated. If it is determined that the engine is running, the CPU 2c proceeds to next step S10 and reads data regarding the detected signals of the pilot pressures associated with the front, swing and travel from the sensors 40, 41 and 42 (step S10). Then, for each of the read pilot pressures associated with the front, swing and travel, the CPU 2c calculates, using time information from the timer 2e, a time during which the pilot pressure exceeds a predetermined pressure, and stores and accumulates the calculated result in the memory 2d in correspondence to the date and the time of day (step S12). Herein, the predetermined pressure represents a pilot pressure, which can be regarded as indicating that corresponding one of the front, swing and travel operations has been performed. Also, while it is determined in the step S9 that the engine is running, the CPU 2c calculates the engine running time using the time information from the timer 2e, and stores and accumulates the calculated result in the memory 2d in correspondence to the date and the time of day (step S14). The CPU 2c executes the above-described processing at a predetermined cycle during a period of time in which power supplied to the controller 2 is kept turned on.

The steps S12, S14 may be modified such that each value of the calculated working time may be added to the corresponding time that has been calculated in the past and stored in the memory 2d, and may be stored as a cumulative working time.

In FIG. 6, the communication control unit 2f monitors whether the timer 2e is turned on (step S20). When the timer 2e is turned on, the communication control unit 2f reads the working time for each of the front, swing and travel, the engine running time (including the date and the time of day), and the machine body information, which are stored and accumulated in the memory 2d (step S22). The read data is then transmitted to the base station center server 3 (step S24). The timer 2e is set to turn on at the fixed time of day, for example, at a.m. 0. By so setting the timer, when it becomes a.m. 0, the working time data for one preceding day is transmitted to the base station center server 3.

The CPU 2c and the communication control unit 2f repeat the above-described processing everyday. The data stored in the CPU 2c is erased when a predetermined number of days, e.g., 365 days (one year), have lapsed after the transmission to the base station center server 3.

Figure 7:
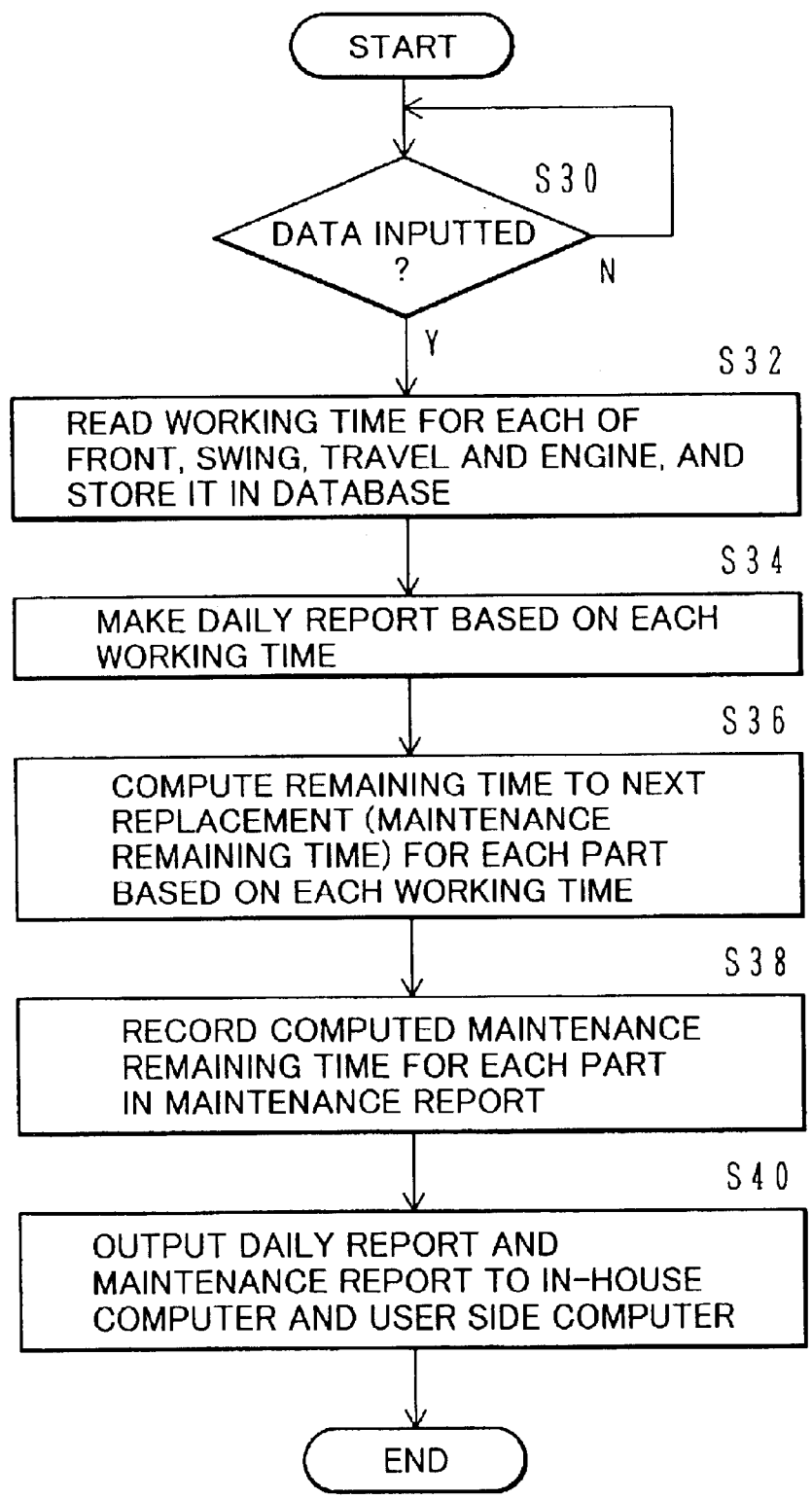
FIG. 7 is a flowchart showing the processing function of machine body/operation information processing sections of the base station center server executed when the working time data is transmitted from the machine side controller.

FIG. 7 is a flowchart showing the processing function of the machine body/operation information processing section 50 in the center server 3 executed when the machine body/operation information has been transmitted from the machine side controller 2.

In FIG. 7, the machine body/operation information processing section 50 monitors whether the machine body/operation information is inputted from the machine side controller 2 (step S30). When the machine body/operation information is inputted, the processing section 50 reads the inputted information, and then stores and accumulates it as operation data (described later) in the database 100 (step S32). The machine body information contains, as described above, the machine model and number. Subsequently, the processing section 50 reads the operation data for a predetermined number of days, e.g., one month, out of the database 100 and makes a daily report regarding the working time (step S34). Also, the processing section 50 reads, out of the database 100, the operation data, actual maintenance data (described later) and target maintenance data (described later), computes the remaining time up to next replacement (hereinafter referred to as the "maintenance remaining time") for each part on the basis of the working time per section to which the relevant part belongs (step S36), and then records the computed results in the maintenance report (step S38). Thereafter, the daily report and the maintenance report thus prepared are transmitted to the in-house computer 4 and the user side computer 5 (step S40).

Figure 8:
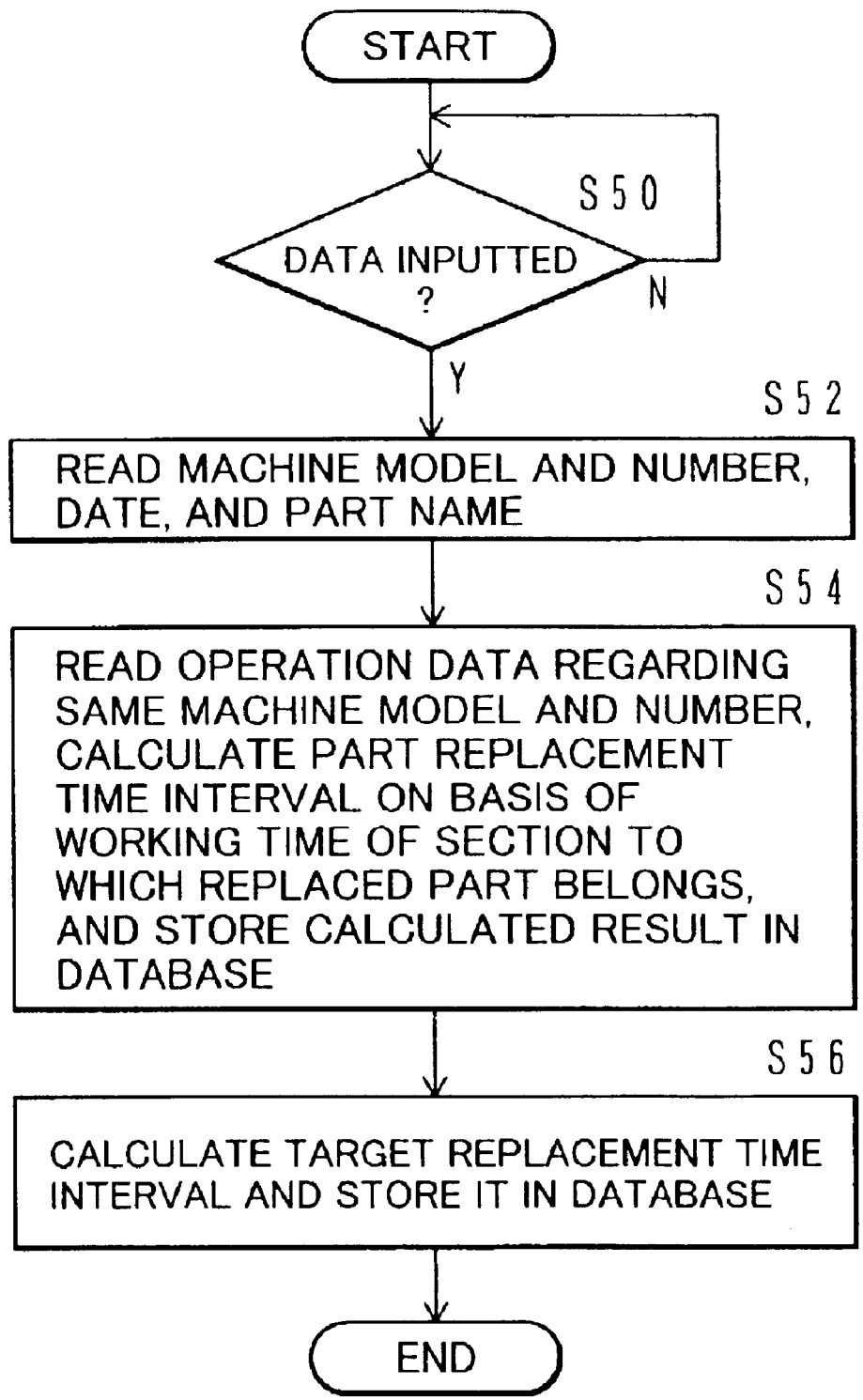
FIG. 8 is a flowchart showing the function of processing part replacement information executed in a information/part replacement information processing section of the base station center server.

FIG. 8 is a flowchart showing the function of processing the part replacement information executed in the part replacement information processing section 51 of the center server 3.

In FIG. 8, the part replacement information processing section 51 monitors whether the part replacement information is inputted from the in-house computer 4 by, e.g., the serviceman (step S50). When the part replacement information is inputted, the processing section 51 reads the inputted information (step S52). Herein, the part replacement information contains the machine model and number of a hydraulic excavator whose part has been replaced, the replacement date, and the name of the replaced part.

Then, the processing section 51 accesses the database 100, reads the operation data regarding the same machine number, and calculates a replacement time interval of each replaced part on the basis of the working time of the section to which the replaced part belongs, followed by storing and accumulating the calculated result in the database 100 as actual maintenance data per machine model (step S54). Herein, the part replacement time interval means a time interval from the time at which one part was assembled in the machine body, to the time at which it was replaced by a new one because of a failure or expiration of the life. As mentioned above, the part replacement time interval is calculated on the basis of the working time of the section to which the replaced part belongs. Taking the bucket prong as an example, the section to which the bucket prong belongs is the front. Then, if the front operating time (excavation time) measured from assembly of one bucket prong in the machine body to replacement by another because of breakage is 1500 hours, the replacement time interval of the bucket prong is calculated as 1500 hours.

Further, the processing section 51 reads the actual maintenance data regarding the inputted machine model and part, calculates the target replacement time interval, and then stores the calculated result in the database 100 (step S56) (as described later).

Incidentally, the part replacement information inputted in the step S50 does not contain the part replacement information that is obtained when estimating the replacement timing based on the target replacement time interval set in the step S56 and replacing the part in accordance with the estimated replacement timing. In other words, with the processing functions described above, the target replacement time interval is calculated using the part replacement information that is obtained from the cases of actually replacing parts because of a failure or expiration of the life. That point is similarly applied to the second to fifth embodiments described below.

FIG. 9 shows how the operation data, the actual maintenance data, and the target maintenance data are stored in the database 100.

In FIG. 9, the database 100 contains various sections, i.e., a database section (hereinafter referred to as an "operation database") in which the operation data per machine model and number is stored and accumulated, a database section (hereinafter referred to as an "actual maintenance database") in which the actual maintenance data per machine model and number is stored and accumulated, and a database section (hereinafter referred to as a "target maintenance database") in which the target maintenance data per machine model is stored and accumulated. Those databases store data as follows.

In the operation database per machine model and number, the engine running time, the front operating time (hereinafter referred to also as the "excavation time"), the swing time, and the travel time are stored per machine model and number as cumulative values in correspondence to the date. In an illustrated example, $T_{NE}(1)$ and $T_D(1)$ represent respective cumulative values of the engine running time and the front operating time for a No. N machine of model A as of Jan. 1, 2000. $T_{NE}(K)$ and $T_D(K)$ represent respective cumulative values of the engine running time and the front operating time for the No. N machine of model A as of Mar. 16, 2000. Similarly, cumulative values $T_S(1)$ to $T_S(K)$ of the swing time and cumulative values $T_T(1)$ to $T_T(K)$ of the travel time for the No. N machine of model A are stored in correspondence to the date. Similar data is also stored for a No. N+1 machine, a No. N+2 machine, . . . of model A.

Figure 22:
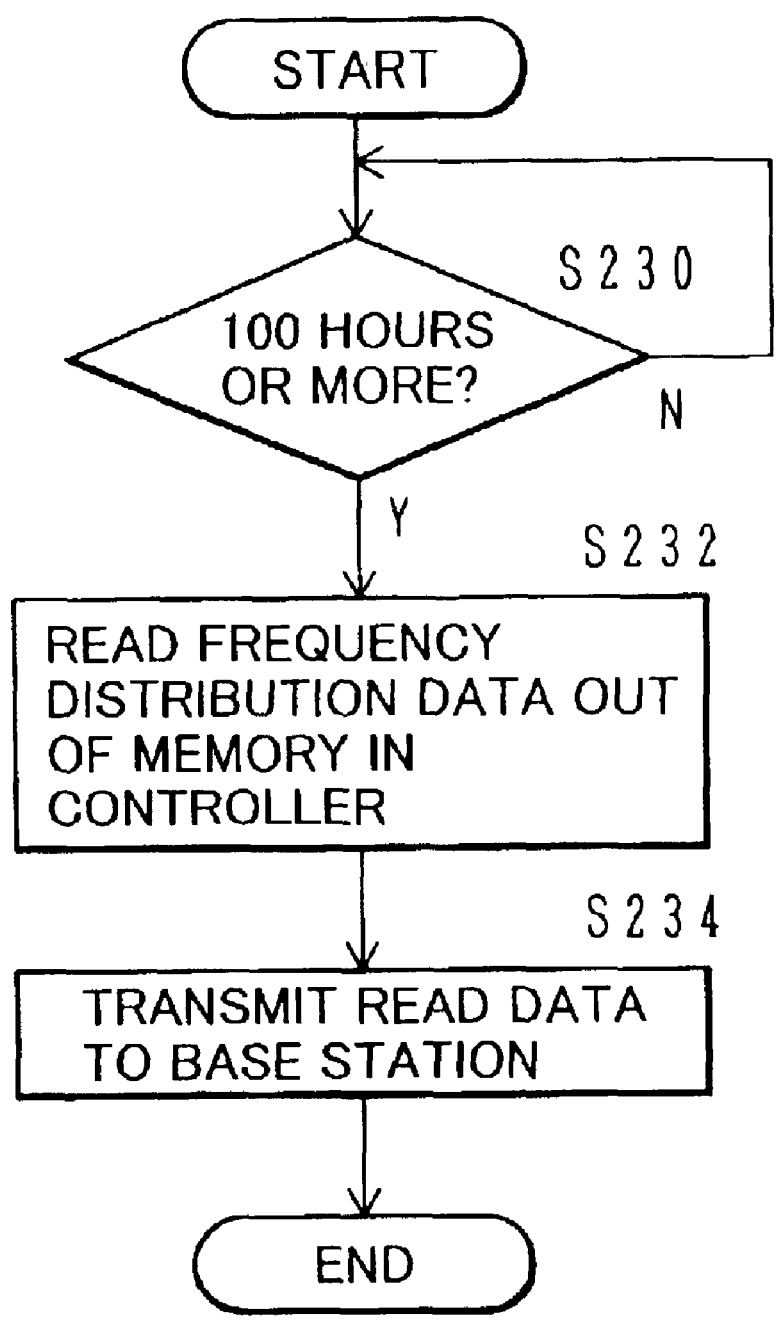
FIG. 22 is a flowchart showing the processing function of a communication control unit in the machine side controller executed when the collected frequency distribution data is transmitted.

Note that the operation database shown in FIG. 9 indicates only a part of the operation data (corresponding to daily report data), and the frequency distribution data is also additionally stored in the operation database (as described later with reference to FIG. 22).

In the actual maintenance database per machine model and number, the replacement time intervals of parts, which have been replaced in the past, are each stored per machine model and number as a cumulative value on the basis of the working time of the section to which the relevant part belongs. In an illustrated example, $T_{EF}(1)$ and $T_{EF}(L)$ represent respective cumulative values of the replacement time intervals after the first and L-th replacement of the engine oil filters of the No. N machine of model A (e.g., 3400 hr and 12500 hr on the basis of the engine running time). $T_{FB}(1)$ and $T_{FB}(M)$ represent respective cumulative values of the replacement time intervals after the first and M-th replacement of the front bushings of the No. N machine (e.g., 5100 hr and 14900 hr on the basis of the front operating time). Similar data is also stored for a No. N+1 machine, a No. N+2 machine, . . . of model A.

In the target maintenance database per machine model, the target replacement time interval for each of parts used in each machine model is stored per machine model as a value on the basis of the working time of the section to which the relevant part belongs. In an illustrated example, $T_{M-EF}$ represents the target replacement time interval of the engine oil filter used in the machine model A (e.g., 4000 hr on the basis of the engine running time). $T_{M-FB}$ represents the target replacement time interval of the front bushing used in the machine model A (e.g., 5000 hr on the basis of the front operating time). Similar data is also stored for all other machine models B, C, . . . Those target replacement time intervals are obtained as values calculated in the step S56 of the flowchart shown in FIG. 8 (as described below).

Figure 10:
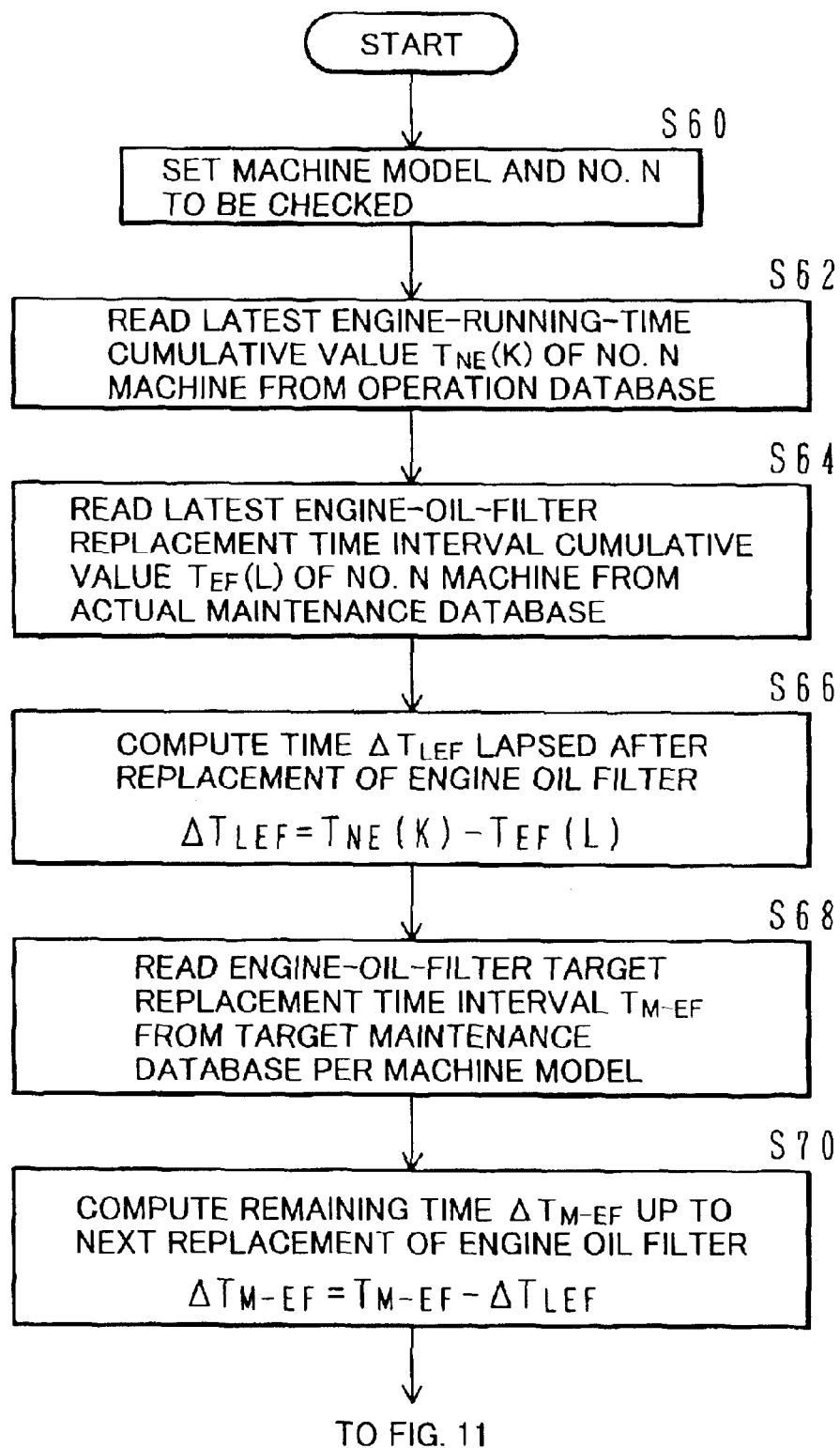
FIG. 10 is a flowchart showing a manner of calculating the maintenance remaining time.
Figure 11:
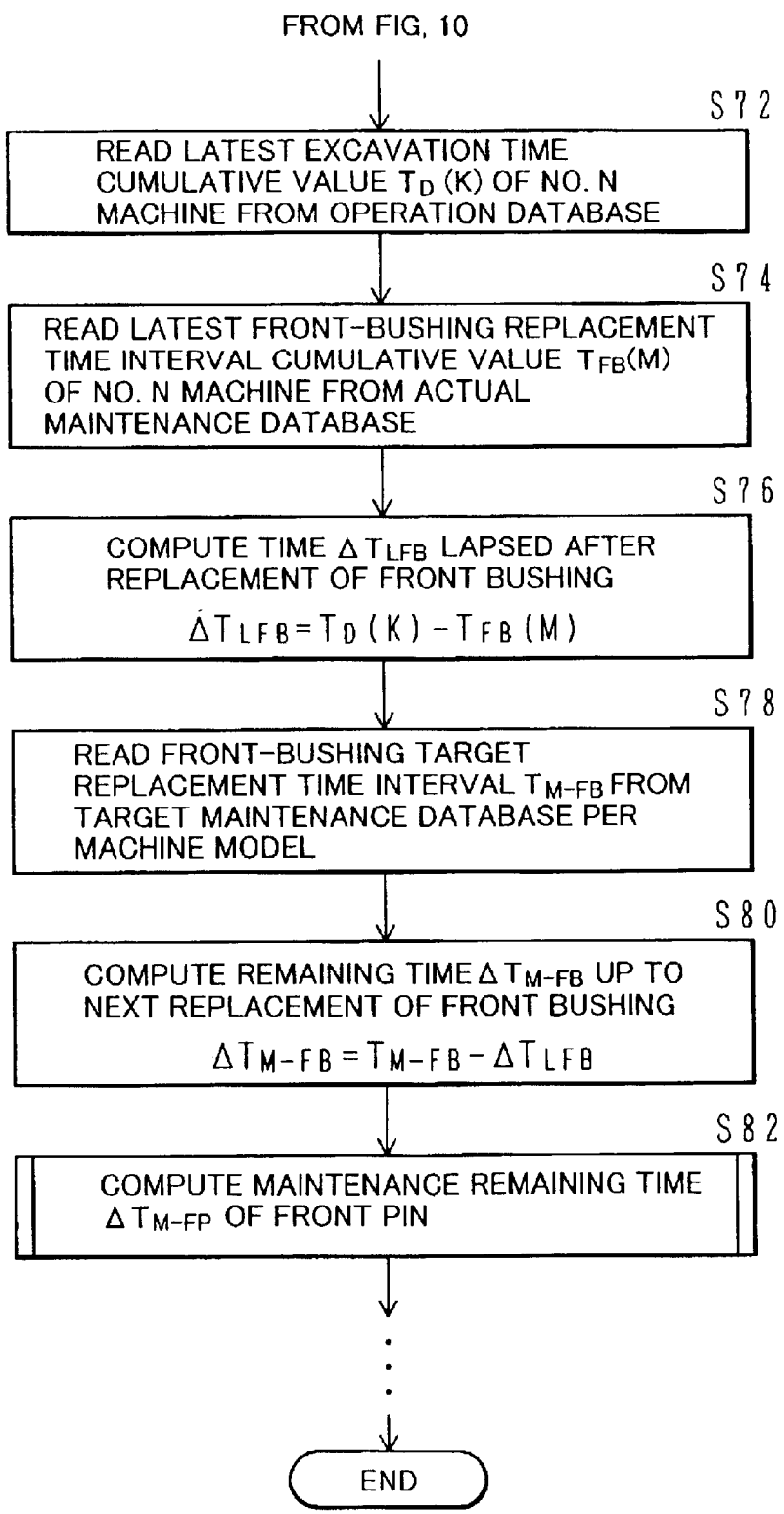
FIG. 11 is a flowchart showing a manner of calculating the maintenance remaining time.

Next, using the data stored in the operation database, the actual maintenance database and the target maintenance database described above, the machine body/operation information processing section 50 computes, in the step S36 of FIG. 7, the maintenance remaining time for each part on the basis of the working time per section, to which the relevant part belongs, in accordance with procedures shown in flowcharts of FIGS. 10 and 11.

In this embodiment, the term "working time per section to which the relevant part belongs" represents the operating time of the front 15 (excavation time) when the front 15 is the section to which the relevant part belongs, as with the bucket prong, the front pin (e.g., the joint pin between the boom and the arm), the bushing around the front pin, the arm, the bucket, etc., the swing time when the swing body 13 is the section to which the relevant part belongs, as with the swing transmission oil, the swing transmission seal, the swing wheel, etc., and the travel time when the travel body 12 is the section to which the relevant part belongs, as with the track transmission oil, the track transmission seal, the track shoe, the track roller, the track motor, etc. The above term also represents the engine running time when the engine 32 is the section to which the relevant part belongs, as with the engine oil, the engine oil filter, etc. Further, when a hydraulic source of the hydraulic system is the section to which the relevant part belongs, as with the working fluid, a working fluid filter, a pump bearing, etc., the engine running time is regarded as the working time of the section to which those parts belong. Note that the operating time of the hydraulic source (i.e., the working time of each of the parts such as the working fluid, the working fluid filter and the pump bearing) may be obtained by detecting the working time during which the delivery pressure of the hydraulic pumps 21$a$, 21$b$ is not lower than a predetermined level, or by subtracting a period of time, during which no load is applied, from the engine running time.

Referring to FIGS. 10 and 11, the machine body/operation information processing section 50 first sets the machine model and number (e.g., N) of the hydraulic excavator to be checked (step S60). Then, the processing section 50 reads the latest engine-running-time cumulative value $T_{NE}(K)$ of the No. N machine of the set model from the operation database (step S62). Also, it reads the latest engine-oil-filter replacement time interval cumulative value $T_{EF}(L)$ of the No. N machine of the set model from the actual maintenance database (step S64). Thereafter, a time $\Delta T_{LEF}$ lapsed after the last replacement of the engine oil filter is computed from the following formula (step S66):

$$\Delta T_{LEF} = T_{NE}(K) - T_{EF}(L)$$

The lapsed time $\Delta T_{LEF}$ corresponds to the working time of the engine oil filter up to now, which is currently in use.

Further, the processing section 50 reads the engine-oil-filter target replacement time interval $T_{M-EF}$ from the target maintenance database per machine model (step S68). Then, the remaining time $\Delta T_{M-EF}$ up to next replacement of the engine oil filter is computed from the following formula (step S70):

$$\Delta T_{M-EF} = T_{M-EF} - \Delta T_{LEF}$$

As a result, the remaining time up to next replacement of the engine oil filter in the No. N machine of the set model is computed as $\Delta T_{M-EF}$.

Next, the processing section 50 reads the latest front-operating-time (excavation time) cumulative value $T_D(K)$ of the No. N machine of the set model from the operation database (step S72 in FIG. 11). Also, it reads the latest front-bushing replacement time interval cumulative value $T_{FB}(M)$ of the No. N machine of the set model from the actual maintenance database (step S74). Then, a time $\Delta T_{LFB}$ lapsed after the last replacement of the front bushing is computed from the following formula (step S76):

$$\Delta T_{LFB} = T_D(K) - T_{FB}(M)$$

The lapsed time $\Delta T_{LFB}$ corresponds to the working time of the front bushing up to how, which is currently in use.

Further, the processing section 50 reads the front-bushing target replacement time interval $T_{M-FE}$ from the target maintenance database per machine model (step S78). Thereafter, the remaining time $\Delta T_{M-FB}$ up to next replacement of the front bushing is computed from the following formula (step S80):

$$\Delta T_{M-FB} = T_{M-FB} - \Delta T_{LFB}$$

As a result, the remaining time up to next maintenance of the front bushing in the No. N machine of the set model is computed as $\Delta T_{M-FB}$.

The maintenance remaining time is similarly calculated for other parts, e.g., the front pin (step S82).

Figure 12:
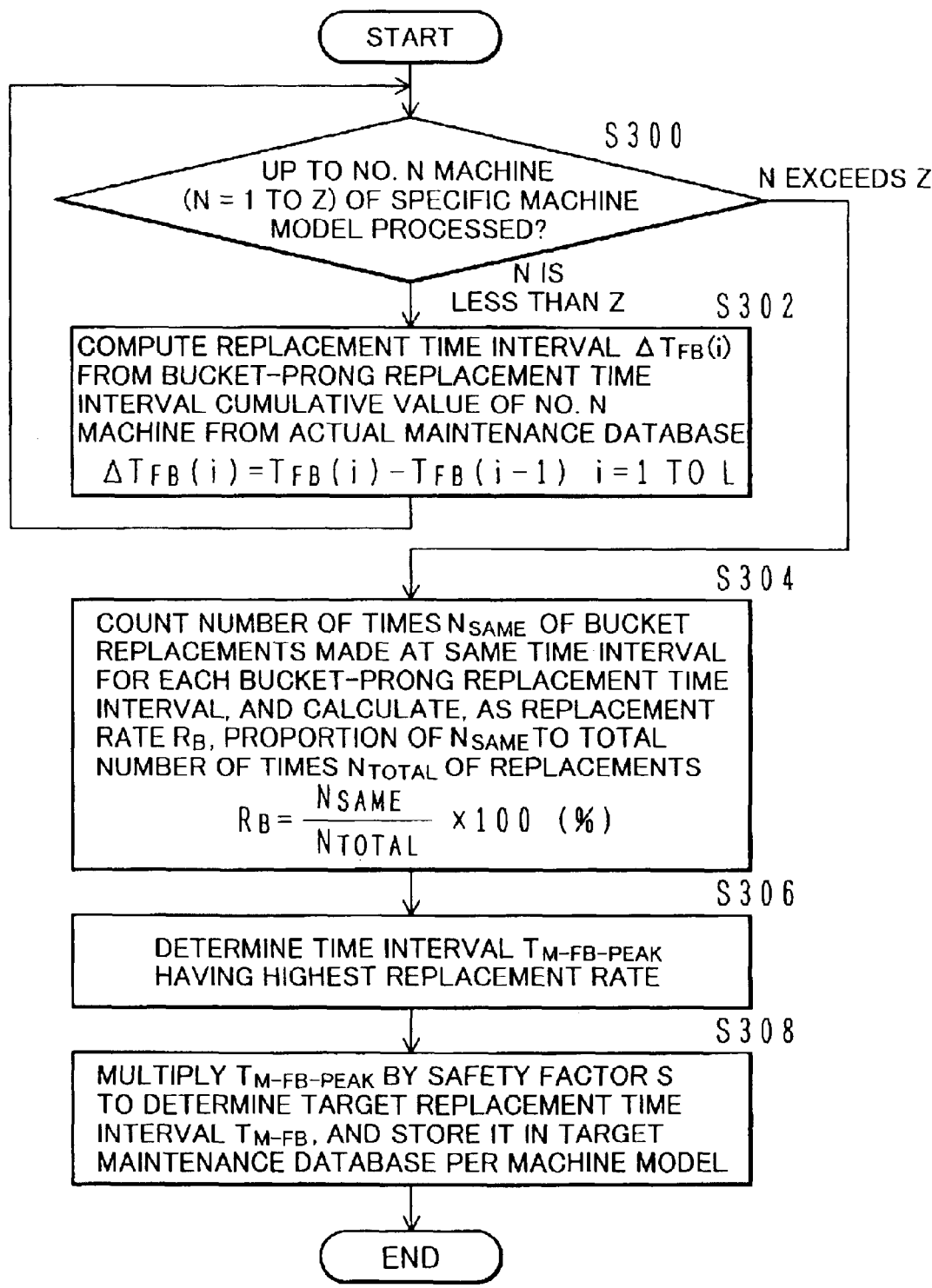
FIG. 12 is a flowchart showing details of the processing function, shown in FIG. 8, of computing the target replacement time interval for each part, which is executed in the part replacement information processing section.

Also, using the data stored in the actual maintenance database, the part replacement information processing section 51 computes, in the step S56 of FIG. 8, the target replacement time interval for each part in accordance with procedures shown in a flowchart of FIG. 12. The flowchart of FIG. 12 is intended to set the target replacement time interval of the bucket prong.

First, to process all data regarding the machine numbers 1 to Z of a particular machine model, the processing section 51 determines whether the machine number N is equal to or smaller than Z (step S300). If N is not larger than Z, the processing section 51 accesses a storage area storing the bucket-prong replacement time interval cumulative values of the No. N machine in the actual maintenance database shown in FIG. 9, and computes a replacement time interval $\Delta T_{FB}(i)$ from those bucket-prong replacement time interval cumulative values using the following formula (step S302):

$$\Delta T_{FB}(i) = T_{FB}(i) - T_{FB}(i-1)$$

i=1 to L (L is the number of times of replacements of the bucket prong in the No. N machine)

Herein, the bucket-prong replacement time interval $\Delta T_{FB}(i)$ means, as mentioned above, a time interval (life) from the time at which one bucket prong was assembled in the machine body, to the time at which it was replaced by a new one because of a failure or expiration of the life. That time interval is given as a value on the basis of the operating time of the front (excavation time), to which the bucket prong belongs. By executing the above-described processing for all of the machine numbers 1 to Z, data of the bucket-prong replacement time interval $\Delta T_{FB}$ is collected for all hydraulic excavators of the particular model.

After completion of the process for collecting data of the bucket-prong replacement time interval $\Delta T_{FB}$ for all hydraulic excavators, the processing section 51 executes processing to obtain correlation between bucket-prong replacement time intervals and bucket-prong replacement rates (step S304). The term "bucket-prong replacement rate" means a proportion (%) of the number of times $N_{SAME}$ of bucket prong replacements, which have the equal replacement time interval (i.e., the working time of the bucket prong up to replacement), with respect to the total number of times $N_{TOTAL}$ of bucket prong replacements. In other words, assuming the bucket-prong replacement rate to be $R_B$, it is expressed by:

$$R_B = (N_{SAME}/N_{TOTAL}) \times 100 \, (\%)$$

Herein, whether the bucket-prong replacement time intervals are equal to each other is determined, for example, by dividing the front operating time in units of 50 hours into, e.g., ranges of from 0 to 50 hours, from 50 to 100 hours, . . . , from 950 to 1000 hours, and so on, and checking whether each bucket-prong replacement time interval falls within the same range at time intervals of 50 hours.

Figure 13:
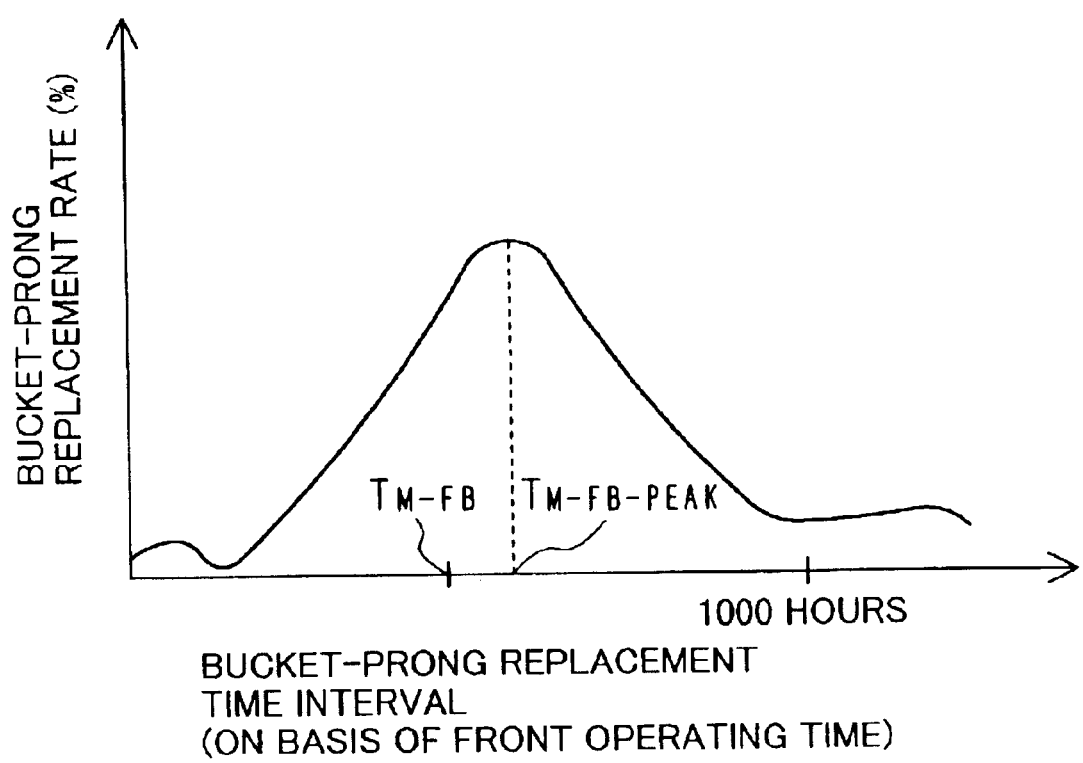
FIG. 13 is a graph showing one example of correlation between bucket-prong replacement time intervals and replacement rates.

FIG. 13 shows one example of thus-obtained correlation between bucket-prong replacement time intervals and bucket replacement rates.

After obtaining the correlation between bucket-prong replacement time intervals and bucket replacement rates as described above, the time interval having a maximum replacement rate (i.e., the largest number of replacements) is determined (step S306). In the example in which the replacement rate is calculated using a time width in units of 50 hours, a central value of the 50-hour time interval, in which the maximum replacement rate is present, is set as the replacement time interval of the bucket prong. The thus-obtained replacement time interval is indicated by $T_{M\text{-}FB\text{-}PEAK}$ in FIG. 13.

Then, after multiplying the replacement time interval $T_{M\text{-}FB\text{-}PEAK}$ by a safety factor S, a resulted value is set as the bucket-prong target replacement time interval $T_{M\text{-}FB}$ and stored in the target maintenance database per machine model (step S308). The safety factor S is, for example, S=about 0.7. In this way, the target replacement time interval of the bucket prong is set.

While the above description is made of the case of setting the target replacement time interval of the bucket prong, the target replacement time interval of any other part can also be calculated and set in a similar manner.

Figure 15:
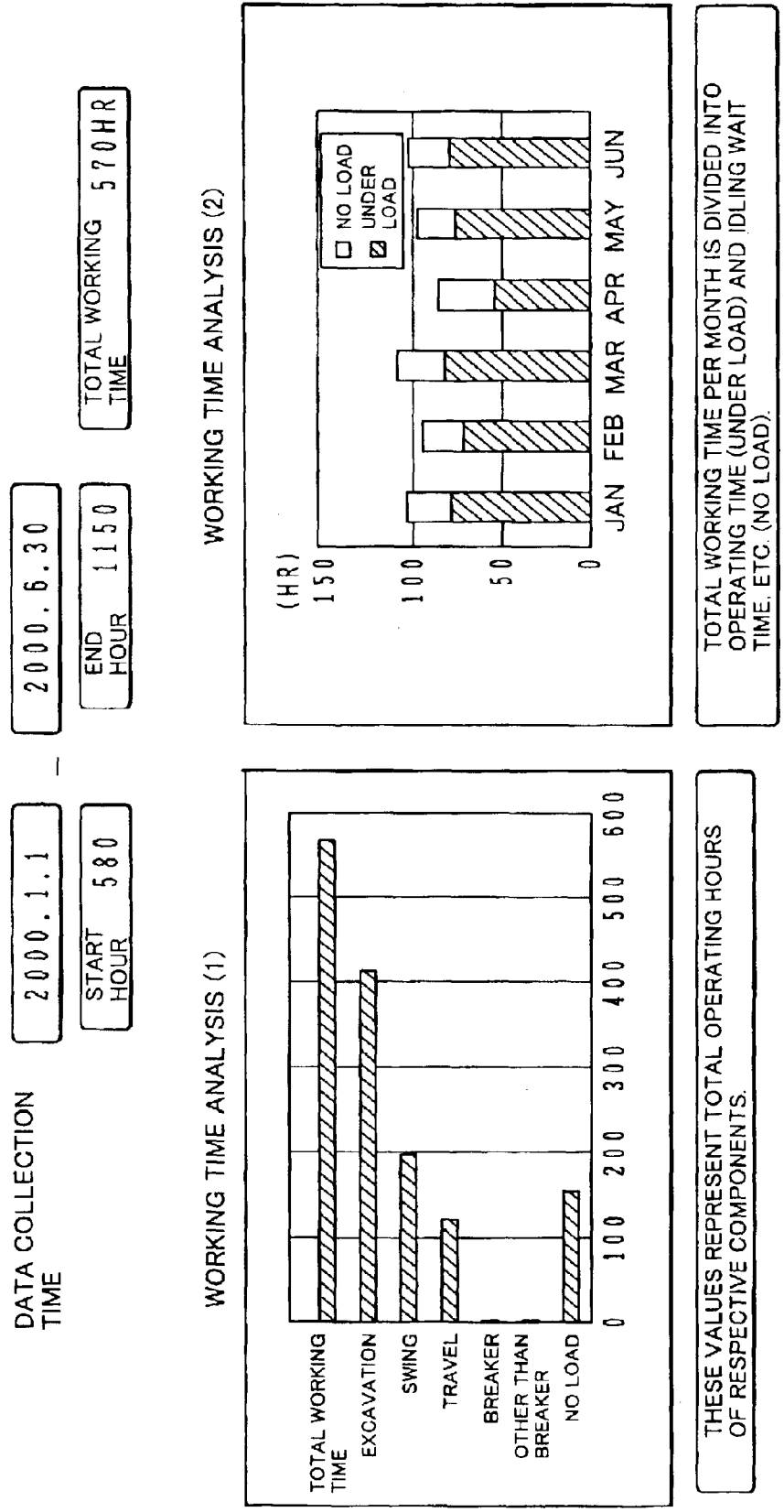
FIG. 15 is a table showing one example of a daily report transmitted to the in-house computer and the user side computer.

FIGS. 14 and 15 each show one example of the daily report transmitted to the in-house computer 4 and the user side computer 5. FIG. 14 shows each item of working time data for one month in the form of a graph and numerical values in correspondence to the date. Based on FIG. 14, the user can confirm changes of situations in use of the owned hydraulic excavator for the past one month. The left side of FIG. 15 graphically shows the working time for each section and the engine running time under no load for the past half year, and the right side of FIG. 15 graphically shows transition of a ratio between the engine running time under load and the engine running time under no load for the past half year. Based on FIG. 15, the user can confirm changes of situations and efficiency in use of the owned hydraulic excavator for the past half year.

Figure 16:
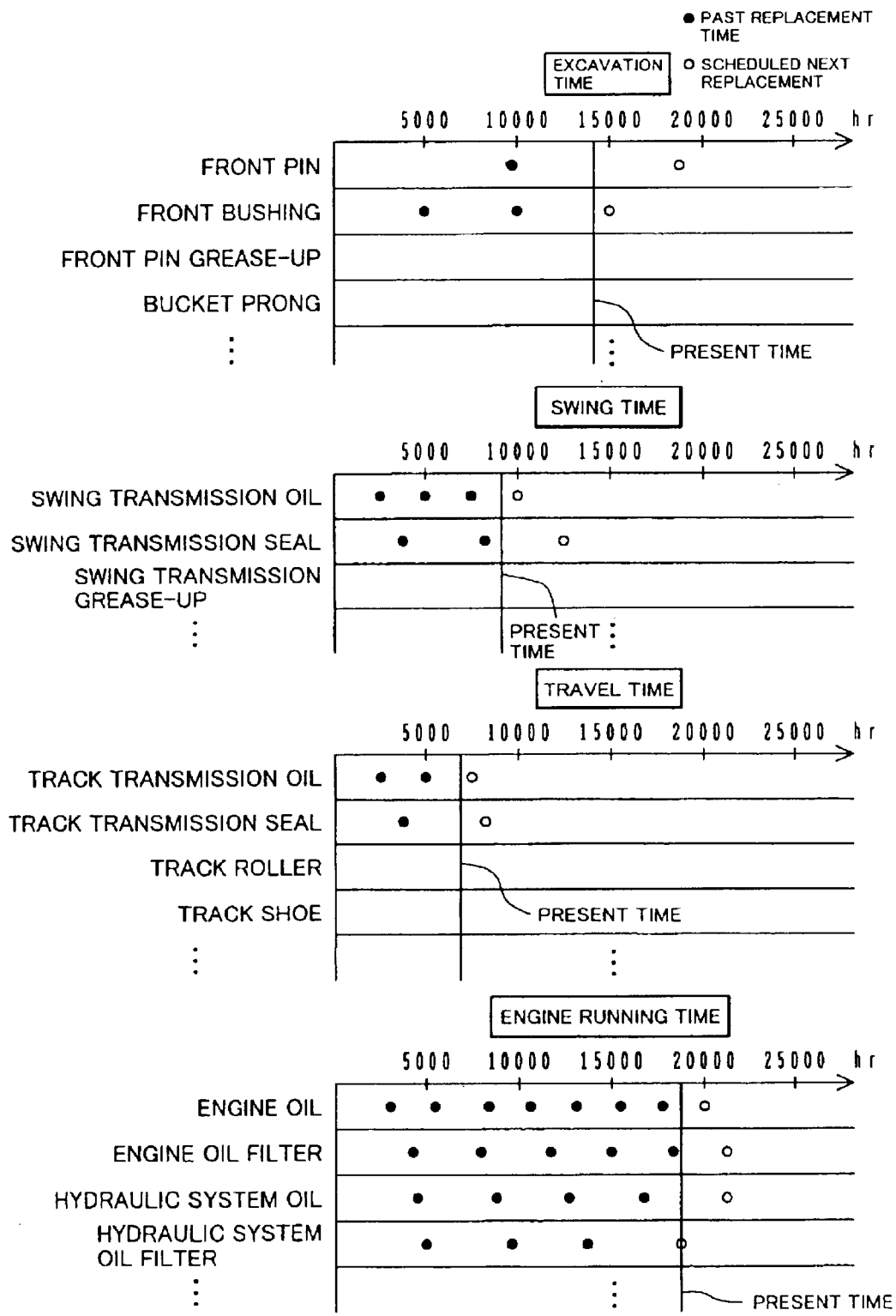
FIG. 16 shows one example of a maintenance report transmitted to the in-house computer and the user side computer.

FIG. 16 shows one example of the maintenance report transmitted to the in-house computer 4 and the user side computer 5. A chart in the first stage counting from the top represents maintenance information of the parts indicated on the basis of the front operating time (excavation time), and a chart in the second stage represents maintenance information of the parts indicated on the basis of the swing time. A chart in the third stage represents maintenance information of the parts indicated on the basis of the travel time, and a chart in the fourth stage represents maintenance information of the parts indicated on the basis of the engine running time. In each of the charts, a mark= indicates the past replacement time, and a mark O indicates the next scheduled replacement time. Also, a straight line drawn between the mark= and the mark O indicates the present time. A distance between the straight line and the mark O represents the maintenance remaining time. As a matter of course, the remaining time may be indicated as a numerical value. Also, while the remaining time represents a value on the basis of the working time per section, the remaining time may be indicated as the date by determining an average value of each working time per day and calculating the number of days corresponding to the remaining time. Alternatively, the day of scheduled replacement may be indicated by adding the calculated number of days to the present date.

Figure 17:
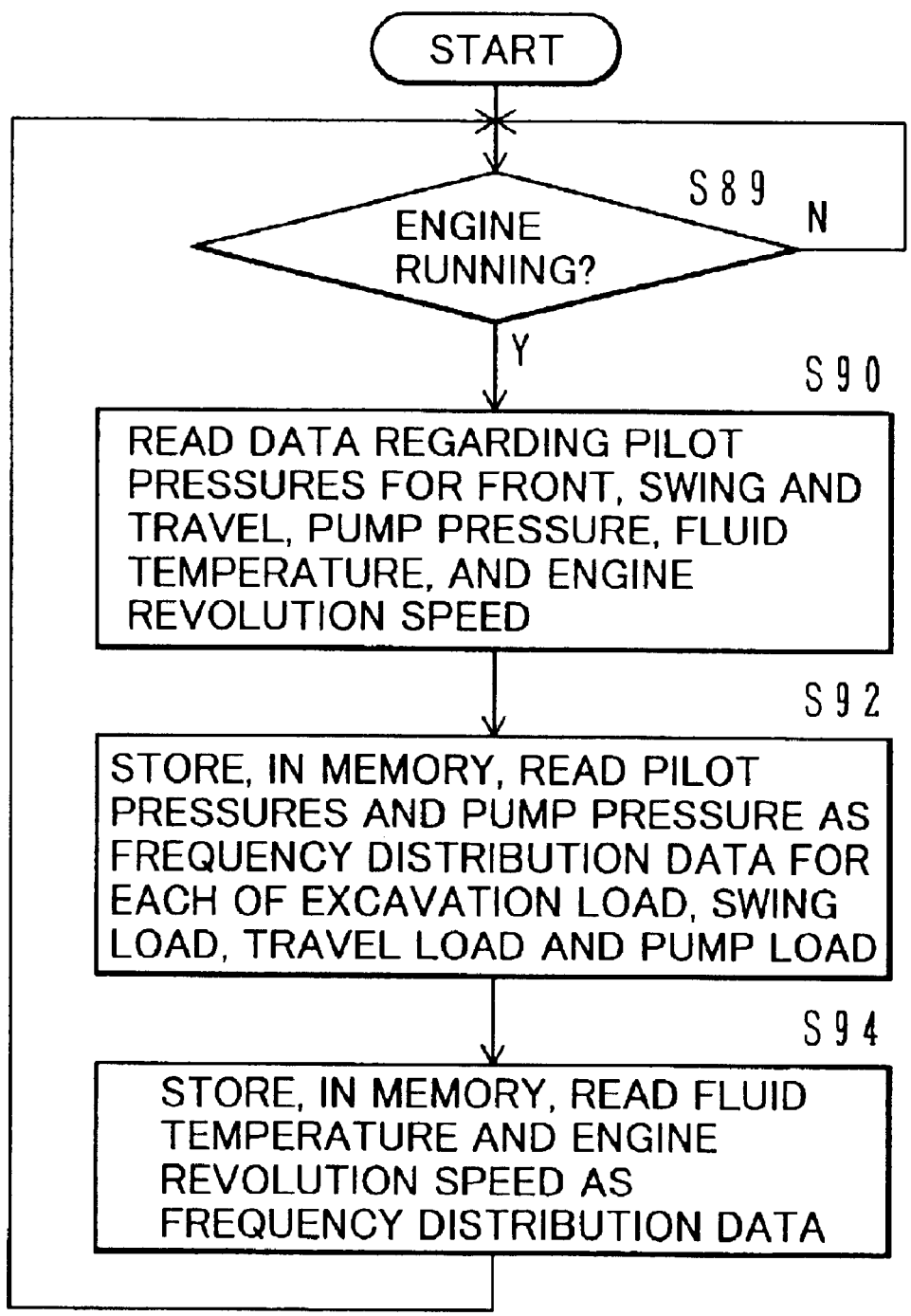
FIG. 17 is a flowchart showing the function of collecting frequency distribution data executed in the machine side controller.

The function of collecting the frequency distribution data in the machine side controller 2 will be described below with reference to FIG. 17. FIG. 17 is a flowchart showing the processing function of the CPU 2c in the controller 2.

In FIG. 17, the CPU 2c first determines whether the engine revolution speed signal from the sensor 46 is a value not lower than a predetermined revolution speed, and hence whether the engine is running (step S89) If it is determined that the engine is not running, the step S89 is repeated. If it is determined that the engine is running, the CPU 2c proceeds to next step S90 and reads data regarding the detected signals of the pilot pressures associated with the front, swing and travel from the sensors 40, 41 and 42, the detected signal of the pump pressure from the sensor 44, the detected signal of the fluid temperature from the sensor 45, and the detected signal of the engine revolution speed from the sensor 46 (step S90). Then, of the read data, the respective pilot pressures associated with the front, swing and travel, as well as the pump pressure are stored in the memory 2d as the frequency distribution data of excavation loads, swing loads, travel loads, and pump loads (step S92). Further, the read fluid temperature and engine revolution speed are also stored in the memory 3d as the frequency distribution data (step S94).

While the engine is running, the steps S90 to S94 are repeated.

Herein, the frequency distribution data means data representing a distribution of respective detected values per predetermined time, e.g., 100 hours, with the pump pressure or the engine revolution speed being a parameter. The predetermined time (100 hours) is a value on the basis of the engine running time. Incidentally, the predetermined time may be a value on the basis of the working time for each section.

Figure 18:
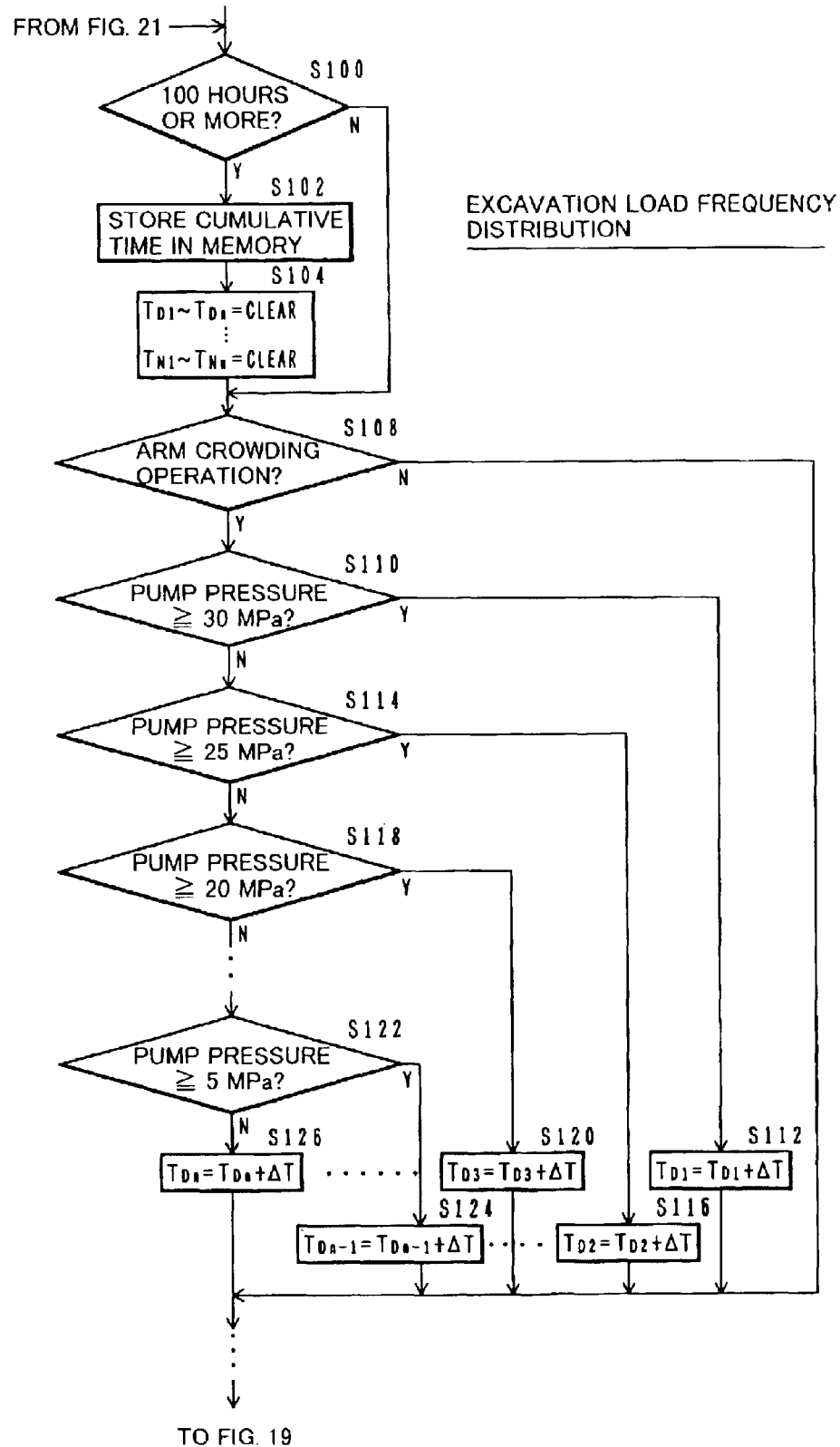
FIG. 18 is a flowchart showing details of processing procedures for creating frequency distribution data of excavation loads.

FIG. 18 is a flowchart showing details of processing procedures for creating the frequency distribution data of excavation loads.

First, the CPU determines whether the engine running time after entering this process has exceeded 100 hours (step S100). If it does not exceeded 100 hours, the CPU determines based on the signal from the sensor 40 whether the machine is during the arm crowding operation (excavation) (step S108). If the machine is during the arm crowding operation (excavation), the CPU determines based on the signal from the sensor 44 whether the pump pressure is not lower than, e.g., 30 MPa (step S110). If the pump pressure is not lower than 30 MPa, a unit time (processing cycle time) ΔT is added to a cumulative time $T_{D1}$ for a pressure range of not lower than 30 MPa and the resulted sum is set to a new cumulative time $T_{D1}$ (step S112). If the pump pressure is lower than 30 MPa, the CPU determines whether the pump pressure is not lower than 25 MPa (step S114). If the pump pressure is not lower than 25 MPa, the unit time (processing cycle time) ΔT is added to a cumulative time $T_{D2}$ for a pressure range of 25 to 30 MPa and the resulted sum is set to a new cumulative time $T_{D2}$ (step S116). Similarly, for each of other pressure ranges of 20 to 25 MPa, . . . , 5 to 10 MPa and 0 to 5 MPa, if the pump pressure falls in any of those pressure ranges, the unit time ΔT is added to a corresponding cumulative time $T_{D3}, \ldots, T_{Dn-1}, T_{Dn}$ and the resulted sum is set to a new cumulative time $T_{D3}, \ldots, T_{Dn-1}, T_{Dn}$ (steps S118 to S126).

Processing procedures for creating the frequency distribution data of swing loads and travel loads are the same as those shown in FIG. 18 except that, instead of determining in the step S108 of FIG. 18 based on the signal from the sensor 40 whether the machine is during the arm crowding operation (excavation), the CPU determines using the sensor 41 whether the machine is during the swing operation, or determines using the sensor 42 whether the machine is during the travel operation.

Figure 19:
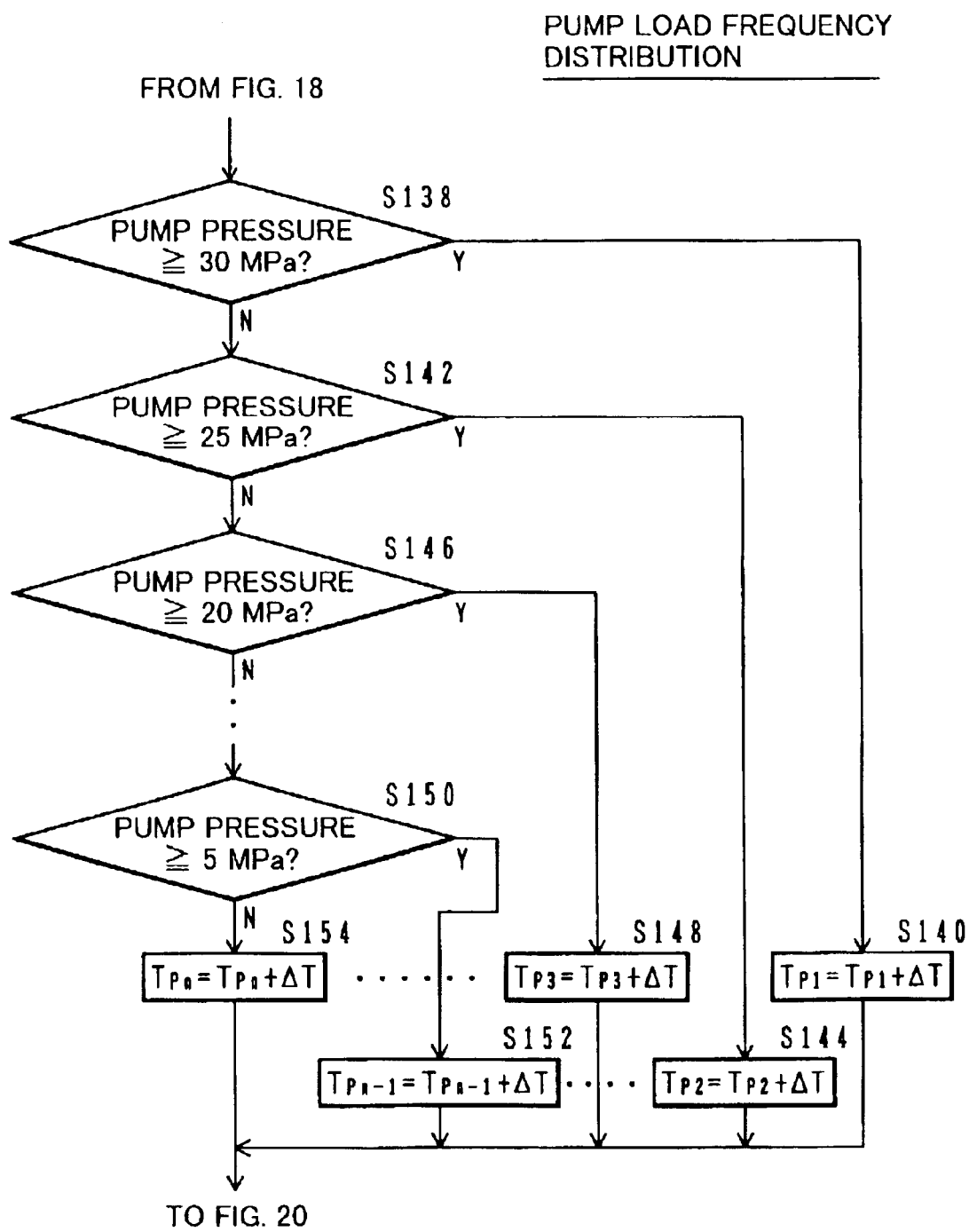
FIG. 19 is a flowchart showing details of processing procedures for creating frequency distribution data of pump loads of a hydraulic pump.

Subsequently, the CPU proceeds to processing procedures, shown in FIG. 19, for creating the frequency distribution data of pump loads of the hydraulic pumps 21a, 21b.

First, the CPU determines based on the signal from the sensor 44 whether the pump pressure is not lower than, e.g., 30 MPa (step S138). If the pump pressure is not lower than 30 MPa, the unit time (processing cycle time) $\Delta T$ is added to a cumulative time $T_{P1}$ for a pressure range of not lower than 30 MPa and the resulted sum is set to a new cumulative time $T_{P1}$ (step S140). If the pump pressure is lower than 30 MPa, the CPU determines whether the pump pressure is not lower than 25 MPa (step S142). If the pump pressure is not lower than 25 MPa, the unit time (processing cycle time) $\Delta T$ is added to a cumulative time $T_{P2}$ for a pressure range of 25 to 30 MPa and the resulted sum is set to a new cumulative time $T_{P2}$ (step S144). Similarly, for each of other pressure ranges of 20 to 25 MPa, . . . , 5 to 10 MPa and 0 to 5 MPa, if the pump pressure falls in any of those pressure ranges, the unit time $\Delta T$ is added to a corresponding cumulative time $T_{P3}, \ldots, T_{Pn-1}, T_{Pn}$ and the resulted sum is set to a new cumulative time $T_{P3}, \ldots, T_{Pn-1}, T_{Pn}$ (steps S146 to S154).

Figure 20:
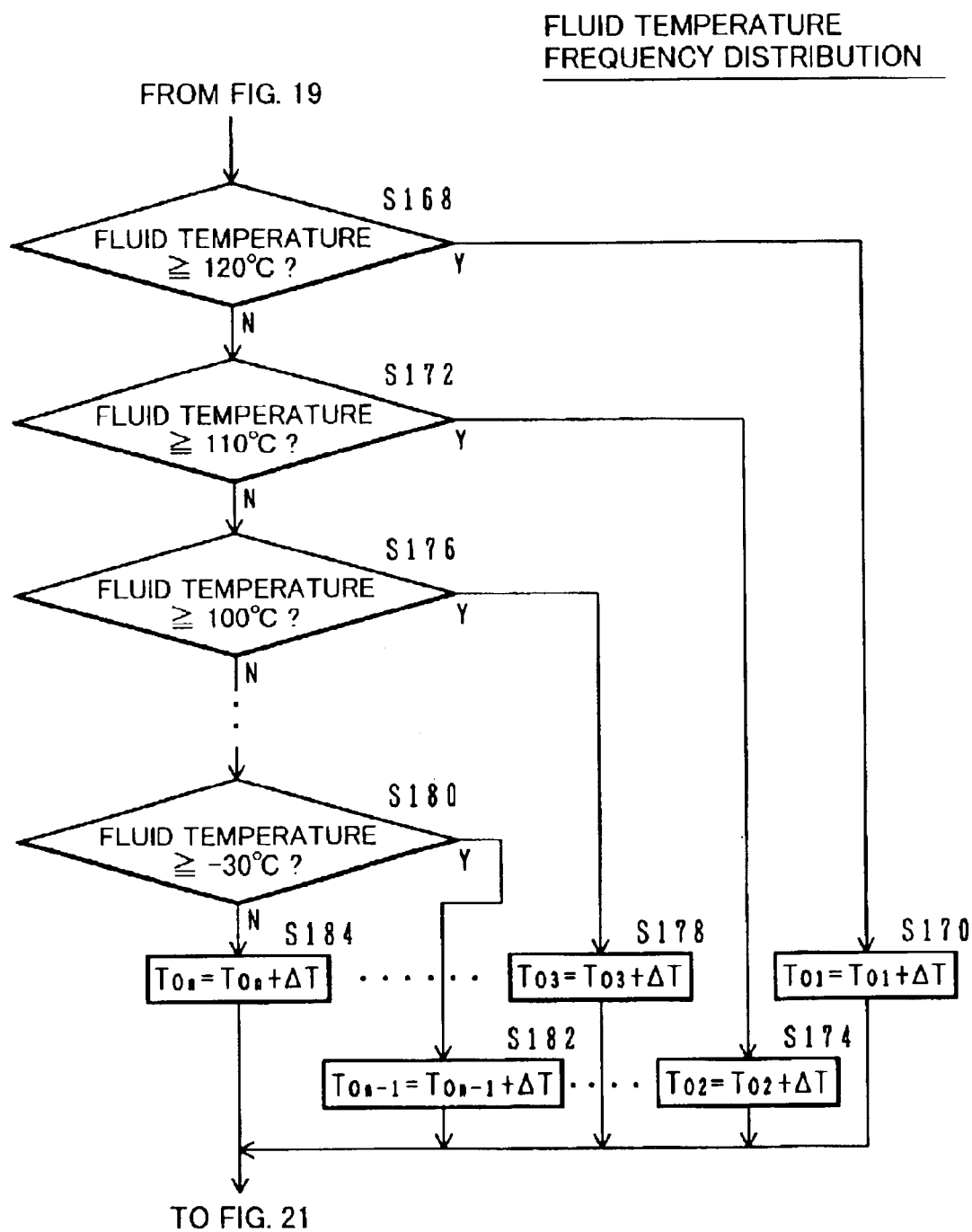
FIG. 20 is a flowchart showing details of processing procedures for creating frequency distribution data of fluid temperatures.

Subsequently, the CPU proceeds to processing procedures, shown in FIG. 20, for creating the frequency distribution data of fluid temperatures.

First, the CPU determines based on the signal from the sensor 45 whether the fluid temperature is not lower than, e.g., 120° C. (step S168). If the fluid temperature is not lower than 120° C., the unit time (processing cycle time) $\Delta T$ is added to a cumulative time $T_{O1}$ for a temperature range of not lower than 120° C. and the resulted sum is set to a new cumulative time $T_{O1}$ (step S170). If the fluid temperature is lower than 120° C., the CPU determines whether the fluid temperature is not lower than 110° C. (step S172). If the fluid temperature is not lower than 110° C., the unit time (processing cycle time) $\Delta T$ is added to a cumulative time $T_{O2}$ for a temperature range of 110 to 120° C. and the resulted sum is set to a new cumulative time $T_{O2}$ (step S714). Similarly, for each of other temperature ranges of 100 to 110° C., −30 to −20° C. and lower than −30° C., if the fluid temperature falls in any of those temperature ranges, the unit time $\Delta T$ is added to a corresponding cumulative time $T_{O3}, \ldots, T_{On-1}, T_{On}$ and the resulted sum is set to a new cumulative time $T_{O3}, \ldots, T_{On-1}, T_{On}$ (steps S176 to S184).

Subsequently, the CPU proceeds to processing procedures, shown in FIG. 21, for creating the frequency distribution data of engine revolution speeds.

First, the CPU determines based on the signal from the sensor 46 whether the engine revolution speed is not lower than, e.g., 2200 rpm (step S208). If the engine revolution speed is not lower than 2200 rpm, the unit time (processing cycle time) $\Delta T$ is added to a cumulative time $T_{N1}$ for an engine-revolution-speed range of not lower than 2200 rpm and the resulted sum is set to a new cumulative time $T_{N1}$ (step S210). If the engine revolution speed is lower than 2200 rpm, the CPU determines whether the engine revolution speed is not lower than 2100 rpm (step S212). If the engine revolution speed is not lower than 2100 rpm, the unit time (processing cycle time) $\Delta T$ is added to a cumulative time $T_{N2}$ for an engine-revolution-speed range of 2100 to 2200 rpm and the resulted sum is set to a new cumulative time $T_{N2}$ (step S214). Similarly, for each of other engine-revolution-speed ranges of 2000 to 2100 rpm, . . . , 600 to 700 rpm and lower than 600 rpm, if the engine revolution speed falls in any of those pressure ranges, the unit time $\Delta T$ is added to a corresponding cumulative time $T_{N3}, \ldots, T_{Nn-1}, T_{Nn}$ and the resulted sum is set to a new cumulative time $TN_3, \ldots, T_{Nn-1}, T_{Nn}$ (steps S216 to S224).

Figure 21:
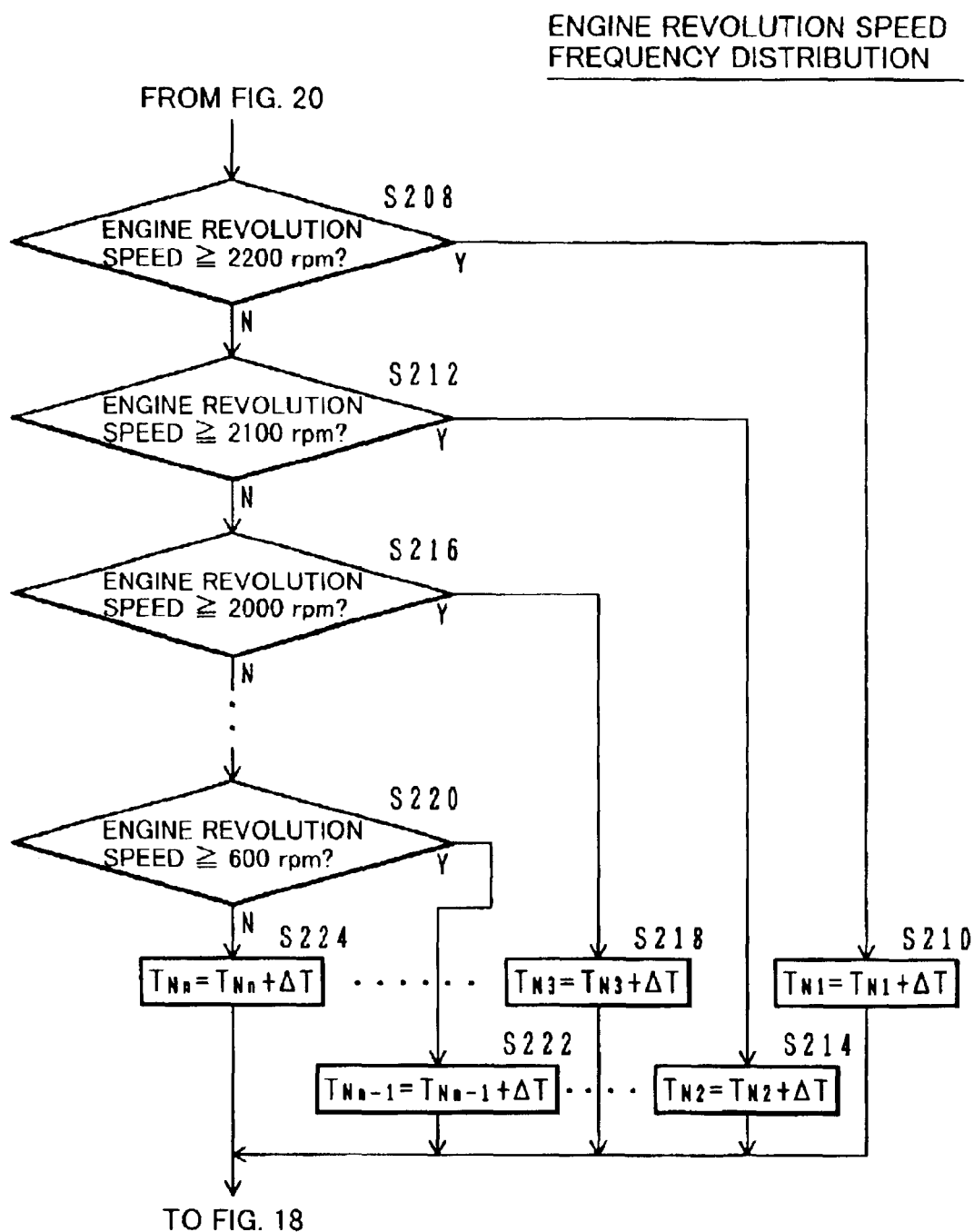
FIG. 21 is a flowchart showing details of processing procedures for creating frequency distribution data of engine revolution speeds.

After completion of the processing shown in FIG. 21, the CPU returns to the step S100 of FIG. 18 and repeats the above-described processing shown in FIGS. 18 to 21 until the engine running time exceeds 100 hours.

When the engine running time exceeds 100 hours after entering the processing shown in FIGS. 18 to 21, all data of each cumulative time $T_{D1}$ to $T_{Dn}$, $T_{S1}$ to $T_{Sn}$, $T_{T1}$ to $T_{Tn}$, $T_{P1}$ to $T_{Pn}$, $T_{O1}$ to $T_{On}$, and $T_{N1}$ to $T_{Nn}$ are stored in the memory 2d (step S102). Then, each cumulative time is initialized as given below; $T_{D1}$ to $T_{Dn}=0$, $T_{S1}$ to $T_{Sn}=0$, $T_{T1}$ to $T_{Tn}=0$, $T_{P1}$ to $T_{Pn}=0$, $T_{O1}$ to $T_{On}=0$, and $T_{N1}$ to $T_{Nn}=0$ (step S104). Thereafter, similar procedures to those described above are repeated.

The frequency distribution data thus collected is transmitted to the base station center server 3 by the communication control unit 2f in the controller 2. The processing functions of the communication control unit 2f on that occasion are shown in FIG. 22.

First, in synchronism with the processing of the step S100 shown in FIG. 18, the communication control unit 2f monitors whether the engine running time exceeds 100 hours (step S230). If it exceeds 100 hours, the communication control unit 2f reads the frequency distribution data and the machine body information which are both stored and accumulated in the memory 2d (step S232). The read data is then transmitted to the base station center server 3 (step S234). In this way, whenever the frequency distribution data is accumulated in amount corresponding to 100 hours of the engine running time, the accumulated data is transmitted to the base station center server 3.

The CPU 2c and the communication control unit 2f repeat the above-described processing in units of 100 hours on the basis of the engine running time. The data stored in the CPU 2c is erased when a predetermined number of days, e.g., 365 days (one year), have lapsed after the transmission to the base station center server 3.

Figure 23:
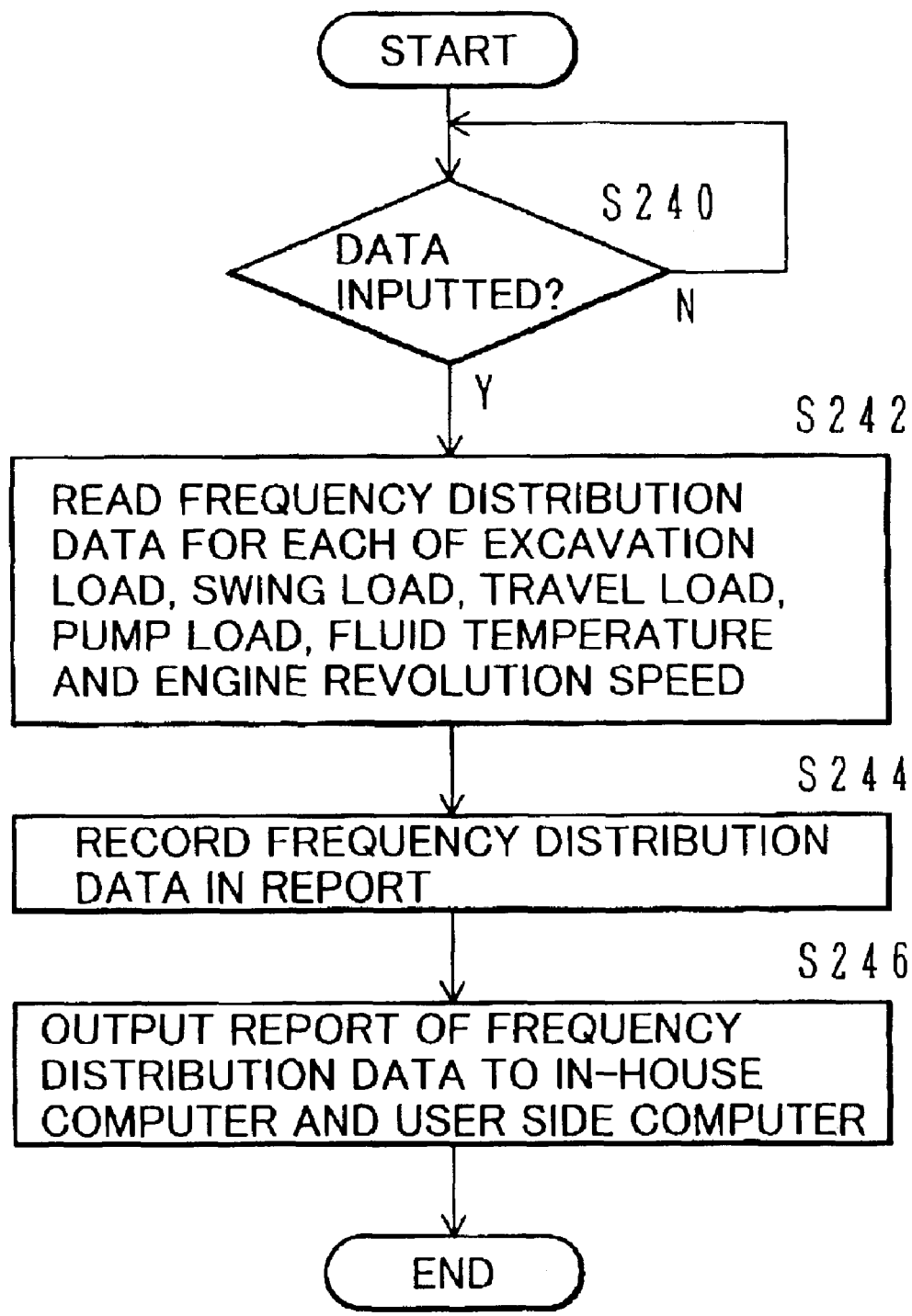
FIG. 23 is a flowchart showing the processing function of the machine body/operation information processing sections in the base station center server executed when the frequency distribution data has been transmitted from the machine side controller.

FIG. 23 is a flowchart showing the processing function of the machine body/operation information processing section 50 in the center server 3 executed when the frequency distribution data has been transmitted from the machine side controller 2.

In FIG. 23, the machine body/operation information processing section 50 monitors whether the frequency distribution data of any of excavation loads, swing loads, travel loads, pump loads, fluid temperatures and engine revolution speeds is inputted from the machine side controller 2 (step S240). When the data is inputted, the processing section 50 reads the inputted data, and then stores it as operation data (described later) in the database 100 (step S242). Subsequently, all the frequency distribution data of excavation loads, swing loads, travel loads, pump loads, fluid temperatures and engine revolution speeds are recorded as a report in the form of respective graphs (step S244). The report is then transmitted to the in-house computer 4 and the user side controller 5 (step S246).

FIG. 24 shows how the frequency distribution data is stored in the database 100.

In FIG. 24, the database 100 contains the operation database section per machine model and number, as described above, in which the daily working time data per machine model and number is stored and accumulated as daily report data. Also, values of the frequency distribution data of excavation loads, swing loads, travel loads, pump loads, fluid temperatures and engine revolution speeds are stored and accumulated in the operation database per machine model and number in units of 100 hours on the basis of the engine running time. FIG. 24 shows an example of frequency distributions of pump loads and fluid temperatures of the No. N machine of model A.

In the pump load frequency distribution, for example, the working time corresponding to first 100 hours is stored in an area of from 0 hr to 100 hr divided into pump pressure ranges per 5 MPa, e.g., from 0 MPa to 5 MPa: 6 hr, from 5 MPa to 10 MPa: 8 hr, ..., from 25 MPa to 30 MPa: 10 hr, and not less than 30 MPa: 2 hr. Also, for each subsequent unit of 100 hours, the working time is similarly stored in each of areas of from 100 hr to 200 hr, from 200 hr to 300 hr, and from 1500 hr to 1600 hr.

The frequency distributions of excavation loads, swing loads and travel loads, the frequency distribution of fluid temperatures, and the frequency distribution of engine revolution speeds are also stored in a similar manner. Note that, in the frequency distributions of excavation loads, swing loads and travel loads, the loads are represented on the basis of pump loads. More specifically, respective values of the working time associated with excavation, swing and travel are collected for each of pressure ranges on the basis of pump pressure, e.g., from 0 MPa to 5 MPa, from 5 MPa to 10 MPa, ..., from 25 MPa to 30 MPa, and not less than 30 MPa. Then, the collected values are provided as the frequency distributions of excavation loads, swing loads and travel loads.

Figure 25:
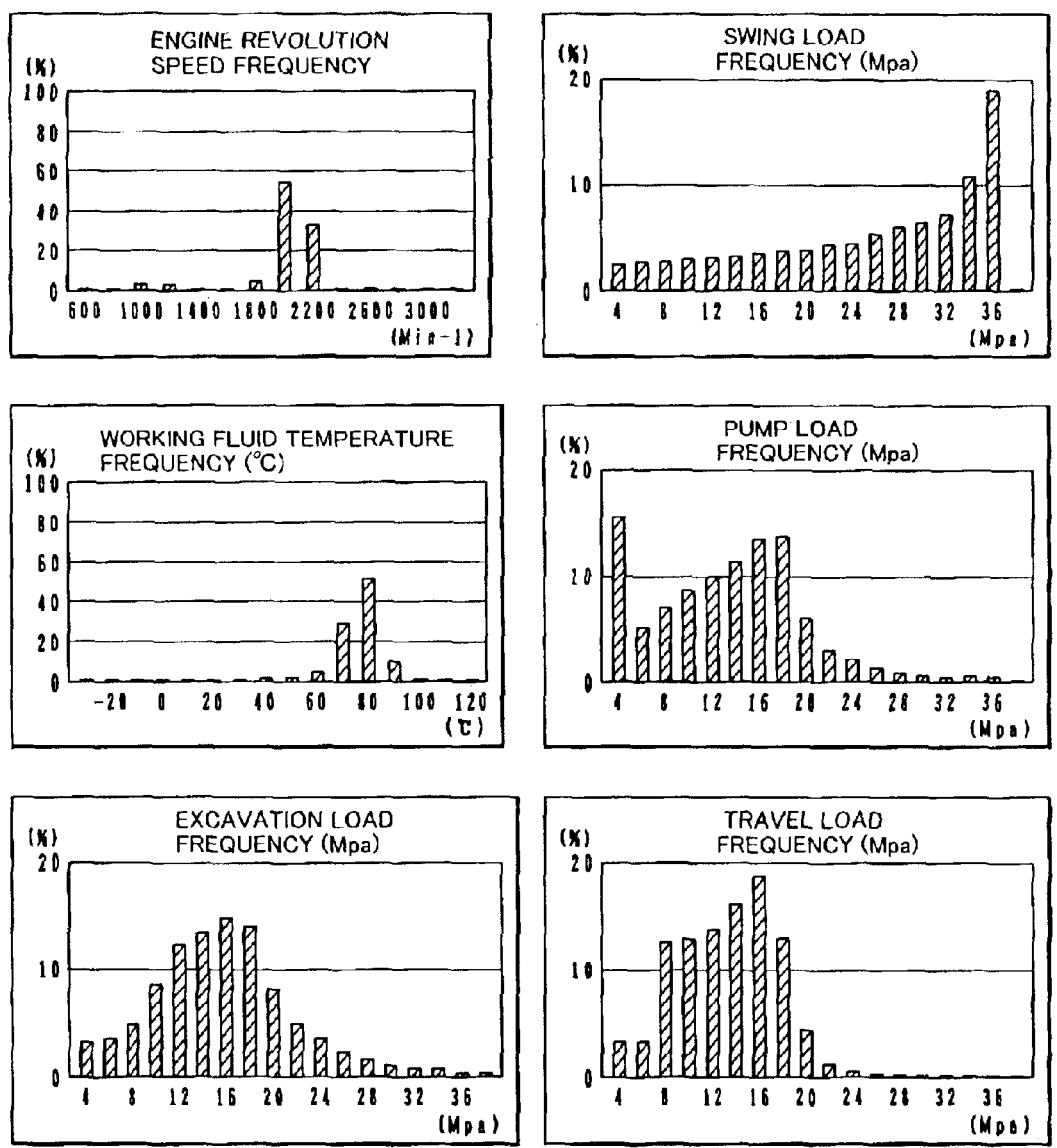
FIG. 25 shows one example of a frequency distribution data report transmitted to the in-house computer and the user side computer.

FIG. 25 shows one example of a frequency distribution data report transmitted to the in-house computer 4 and the user side computer 5. In the illustrated example, each load frequency distribution is represented as a proportion with respect to the corresponding working time within 100 hours of the engine running time. More specifically, in the frequency distribution of excavation loads, for example, the excavation time (e.g., 60 hours) within 100 hours of the engine running time is assumed to be 100%, and the cumulative time for each of the pressure ranges on the basis of the pump pressure is indicated as a percentage (%) with respect to 60 hours. The frequency distributions of swing loads, travel loads and pump loads are also represented in a similar manner. In the frequency distributions of fluid temperatures and engine revolution speeds, 100 hours of the engine running time is assumed to be 100%, and the cumulative time for each unit range is indicated as a percentage with respect to 100 hours. By looking at those reports, the user is able to confirm situations in use of the hydraulic excavator per section depending on loads.

The function of collecting warning data, executed in the machine side controller 2, will be described. The controller 2 has the failure diagnosing function, and each time warning is issued based on the failure diagnosing function, the controller 2 transmits the warning to the base station center server 3 from the communication control unit 2ƒ. The base station center server 3 stores the warning information in the database, makes a report, and transmits it to the in-house computer 4 and the user side computer 5.

FIG. 26 shows one example of such a report. In the illustrated example, details of the warnings are represented in the form of a table in correspondence to the date.

With this embodiment constructed as described above, the sensors 40 to 46 and the controller 2 are provided as operation data measuring and collecting means in each of the plurality of hydraulic excavators 1. In each hydraulic excavator, the sensors 40 to 46 and the controller 2 measure and collect the working time for each of a plurality of sections (i.e., the engine 32, the front 15, the swing body 13 and the travel body 12) that differ in working time from each other. The collected working time for each section is transferred to the base station computer 3 and then stored and accumulated therein as operation data. In the base station computer 3, based on the repair/replacement data of parts of the hydraulic excavator and the corresponding operation data, the actual replacement time interval for each part is calculated on the basis of the working time of the section to which the relevant part belongs, and then stored and accumulated as the actual maintenance data per part. Subsequently, the actual maintenance data is read out per hydraulic excavator, and the actual replacement time interval is statistically processed for each part. The target replacement time interval of the relevant part is then calculated using the statistically processed data. The target replacement time interval thus obtained reflects the working time up to the actual repair/replacement of the part, and the appropriate target replacement time interval can be set.

Then, the working time for each part is calculated on the basis of the working time of the section, to which the relevant part belongs, from the operation data of a particular hydraulic excavator, and the maintenance remaining time is calculated for each part using the above-mentioned appropriate replacement time interval. Even in a hydraulic excavator having a plurality of sections (i.e., the engine 32, the front 15, the swing body 13 and the travel body 12) that differ in working time from each other, therefore, the appropriate scheduled replacement timing of the part can be determined. Accordingly, the part can be avoided from being replaced in spite of being still usable, can be economically used at minimum waste, and can be surely replaced by a new part before the occurrence of a failure. Further, since the appropriate scheduled replacement timing of each part can be determined, it is possible to predict the timing of ordering new parts and the timing of sending the serviceman with certainty, and to facilitate the maintenance management on the maker side.

Also, since the scheduled replacement timing of respective parts in a plurality of hydraulic excavators can be managed together in the base station computer 3, the management of parts maintenance can be collectively performed on the maker side.

Further, since the maintenance information can be provided as a maintenance report to the user side as well, the user is also able to estimate the replacement timing of parts of the owned hydraulic excavator and hence to take proper actions for maintenance.

In addition, since the daily report of the operation information, the diagnostic report indicating the results of maintenance and check, and the warning report are provided to the user side as appropriate, the user is able to confirm situations in operation of the owned hydraulic excavator everyday and hence to perform management of the hydraulic excavator more easily.

A second embodiment of the present invention will be described with reference to FIGS. 27 to 31. This embodiment is intended to determine the scheduled replacement timing in consideration of loads of parts as well.

The overall construction of a management system for a construction machine according to this embodiment is the same as that in the first embodiment, and the system configuration is similar to that in the first embodiment shown in FIGS. 1 to 3. Also, the machine side controller 2 and the base station center server 3 have the same processing functions as those described above with reference to FIGS. 4 to 26 except for the following point. The different point in the processing functions from those in the first embodiment will be described below.

Figure 27:
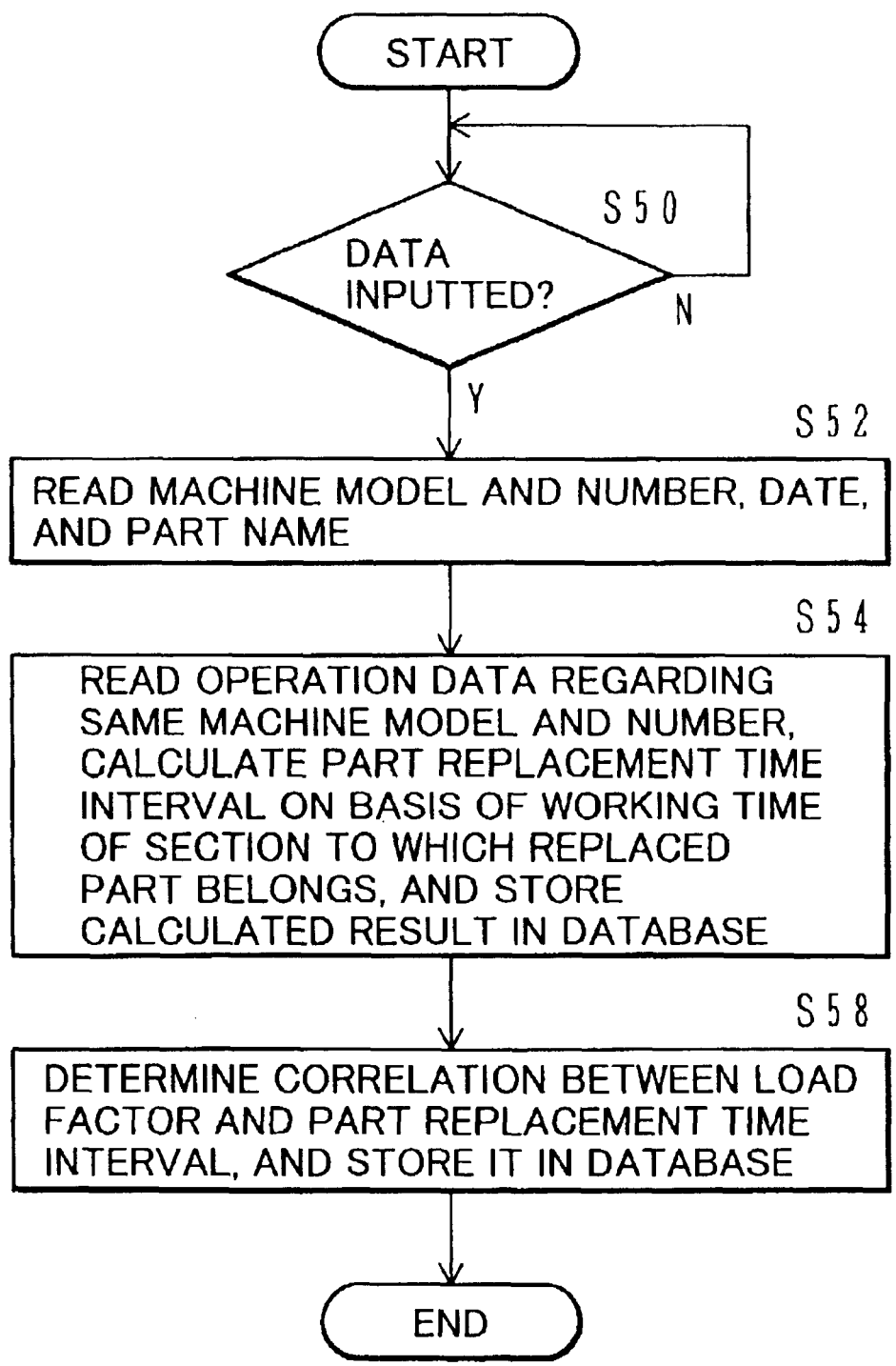
FIG. 27 is a flowchart showing the function of processing part replacement information executed in a part replacement information processing section of a center server according to a second embodiment of the present invention.

FIG. 27 is a flowchart showing the function of processing the part replacement information executed in the part replacement information processing section 51 of the center server 3 according to this embodiment.

In FIG. 27, processing (step S50) of monitoring whether the part replacement information is inputted, processing (step S52) of reading the part replacement information (machine model and number, date, and part name), and processing (step S54) of calculating a part replacement time interval and then storing and accumulating the calculated result as the actual maintenance data are the same as those in the first embodiment shown in FIG. 8. Then, in this embodiment, after reading the frequency distribution data obtained from the operation data regarding the inputted machine model and part, shown in FIG. 24, and the actual maintenance data regarding the inputted machine model and part, shown in FIG. 9, the processing section 51 determines correlation between load factors and part replacement time intervals, and stores the correlation in the target maintenance database shown in FIG. 9 (step S58). In other words, the correlation between load factors and part replacement time intervals is set as the target maintenance information instead of the target replacement time interval.

Herein, the part replacement time interval means, as stated above, a time interval from the time at which one part was assembled in the machine body, to the time at which it was replaced by a new one because of a failure or expiration of the life. The part replacement time interval is given as a value calculated on the basis of the working time of the section to which the replaced part belongs. Also, the load factor is given as a value indicating the magnitude of load acting upon the relevant part during the replacement time interval thereof, and is calculated using the frequency distribution data shown in FIG. 24.

Parts and loads correspond to each other as follows.

When the front 15 is the section to which the relevant part belongs, as with the bucket prong, the front pin (e.g., the joint pin between the boom and the arm), the bushing around the front pin, the arm, the bucket, etc., loads of those parts are represented by the excavation load. When the swing body 13 is the section to which the relevant part belongs, as with the swing transmission oil, the swing transmission seal, the swing wheel, etc., loads of those parts are represented by the swing load. When the travel body 12 is the section to which the relevant part belongs, as with the track transmission oil, the track transmission seal, the track shoe, the track roller, the track motor, etc., loads of those parts are represented by the travel load. Those loads are detected, as mentioned above, in terms of pump pressure. When the engine 32 is the section to which the relevant part belongs, as with the engine oil, the engine oil filter, etc., loads of those parts are represented by the fluid temperature and the engine revolution speed. Further, when the hydraulic source of the hydraulic system is the section to which the relevant part belongs, as with the working fluid, the working fluid filter, the pump bearing, etc., loads of those parts are represented by the pump load and the engine revolution speed.

Figure 28:
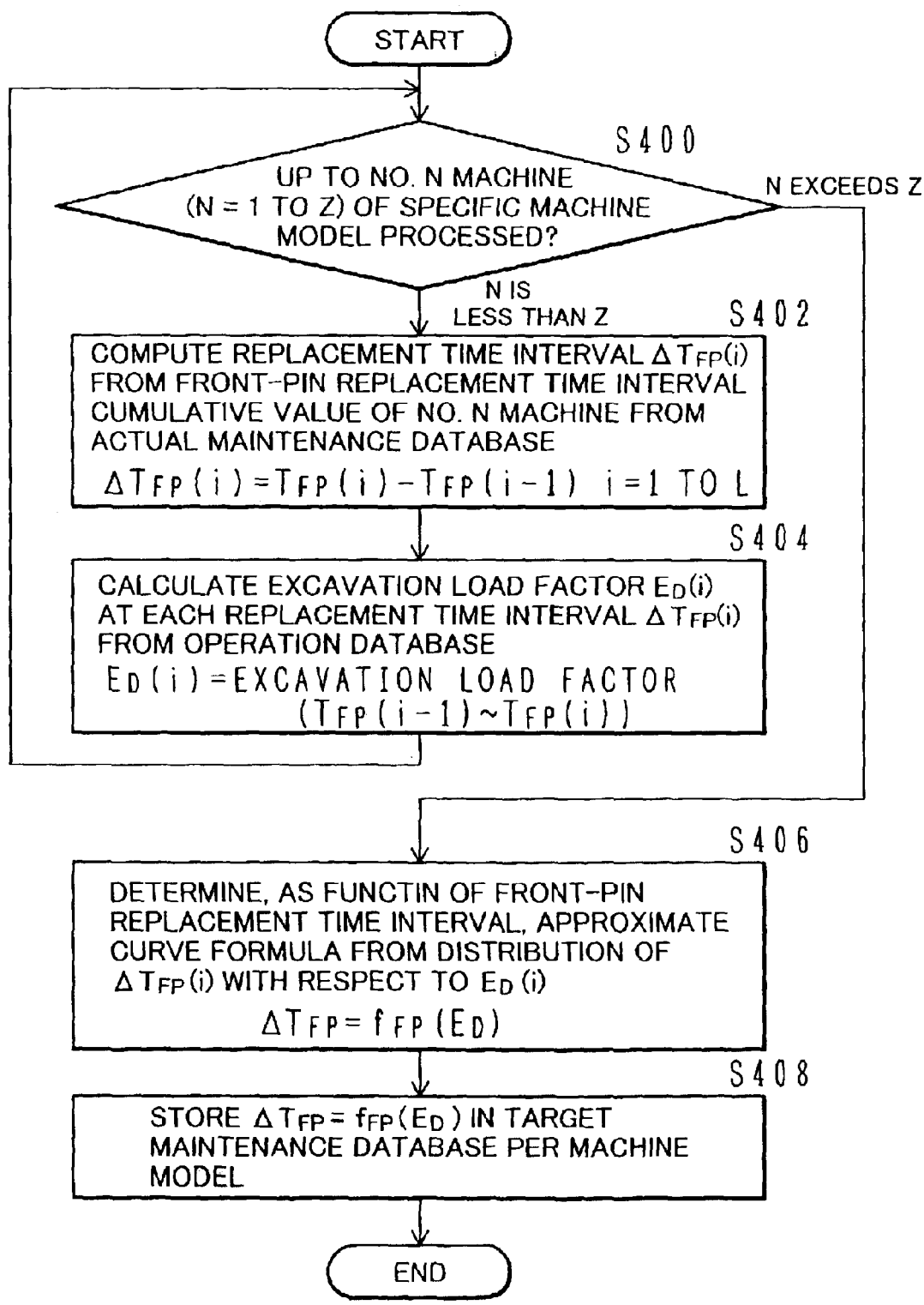
FIG. 28 is a flowchart showing details of the processing function, shown in FIG. 27, of computing the target replacement time interval for each part, which is executed in the part replacement information processing section.

FIG. 28 is a flowchart showing details of the processing, in the step S58, of setting the correlation between load factors and part replacement time intervals. The flowchart of FIG. 28 is intended to set the correlation between load factors of the front pin (e.g., the joint pin between the boom and the arm) in a particular machine model and part replacement time intervals. The load factor of the front pin is calculated using the frequency distribution data of excavation loads.

First, to process all data regarding the machine numbers 1 to Z of a particular machine model, the processing section 51 determines whether the machine number N is equal to or smaller than Z (step S400). If N is not larger than Z, the processing section 51 accesses a storage area storing the front-pin replacement time intervals of the No. N machine in the actual maintenance database shown in FIG. 9, and computes a replacement time interval $\Delta T_{FP}(i)$ from those front-pin replacement time interval cumulative values using the following formula (step S402):

$$\Delta T_{FP}(i) = T_{FP}(i) - T_{FP}(i-1)$$

i=1 to L (L is the number of replacements of the front pin in the No. N machine)

Herein, the front-pin replacement time interval $\Delta T_{FP}(i)$ is given as a value on the basis of the operating time of the front (excavation time). By executing the above-described processing for all of the machine numbers 1 to Z, data of the front-pin replacement time interval $\Delta T_{FP}$ is collected for all hydraulic excavators of the particular model.

After completion of the process for collecting data of the front-pin replacement time interval $\Delta T_{FP}$ for all hydraulic excavators, the processing section 51 reads the frequency distribution data of excavation loads for each of the front-pin replacement time intervals $\Delta T_{FP}(i)$ out of the frequency distribution data regarding the particular machine model, which is stored in the operation database shown in FIG. 24, and then computes an excavation load factor $E_D(i)$ (step S404):

$$E_D(i) = \text{excavation load factor } (T_{FP}(i-1) \text{ to } T_{FP}(i))$$

One method of calculating the load factor is as follows. Assuming, for example, that the latest front-pin replacement time interval cumulative value $T_{FP}(L)$ is $T_{FP}(L)=980$ hr and the second latest front-pin replacement time interval cumulative value $T_{FP}(L)$ is $T_{FP}(L)=630$ hr, the excavation time is cumulated from the frequency distribution data of excavation loads stored in the database. Then, by employing the frequency distribution data of excavation loads from one time range in units of 100 hours (engine running time) in which the cumulative value reaches 630 hr, to another time range in units of 100 hours in which the cumulative value reaches 980 hr, for example, by employing the frequency distribution data of excavation loads ranging from 1000 hr to 1500 hr, a time proportion with respect to that period of time (statistical time), in which the load is not smaller than a predetermined excavation load, e.g., a pump pressure of 20 MPa, is computed and set as the excavation load factor.

Excavation load factor=time during which pump load is not smaller than 20 MPa/statistical time (1500−1000)

Figure 29:
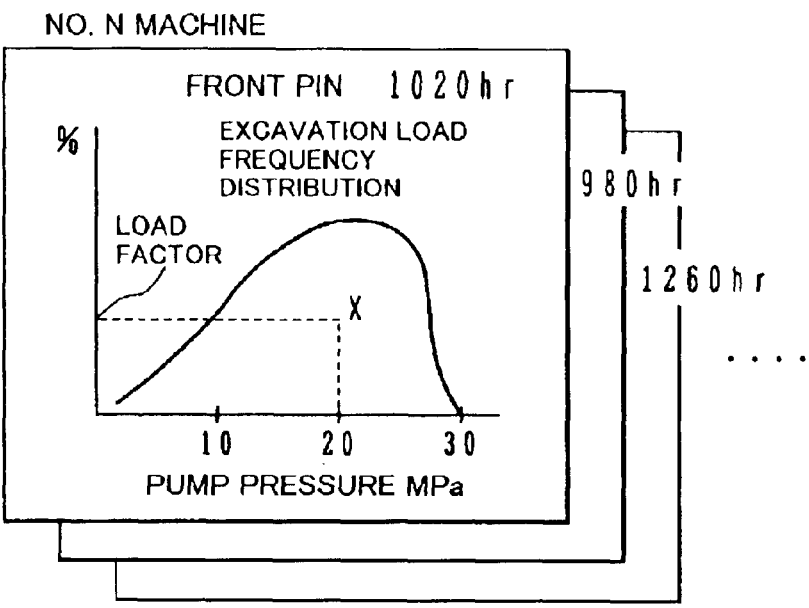
FIG. 29 is a graph showing an excavation load frequency distribution curve when the front pin replacement time interval is 1020 hr.

As another method, the centroid of an integral value of the frequency distribution of excavation loads during each front-pin replacement time interval $\Delta T_{FP}(i)$ may be determined and then set as the excavation load factor. FIG. 29 shows, by way of example, a frequency distribution curve of excavation loads when the front-pin replacement time interval $\Delta T_{FP}$ of the No. N machine is 1020 hr. In FIG. 29, the horizontal axis represents pump pressures as the excavation loads, and the vertical axis represents a time proportion (%) of each pump pressure during the period of 1020 hr. In that case, the centroid (denoted by a mark ×) of an integral value (area) of the frequency distribution curve is determined, and the time proportion at the centroid position is set as the excavation load factor.

After calculating the load factor $E_D(i)$ in each front-pin replacement time interval $\Delta T_{FP}(i)$ as described above, an approximate curve formula (front-pin replacement time function) is determined from the distribution of $\Delta T_{FP}(i)$ with respect to $E_D(i)$ (step S406). In other words, correlation between $E_D(i)$ and $\Delta T_{FP}(i)$ is determined as follows:

$$\Delta T_{FP}=f_{FP}(E_D)$$

Figure 30:
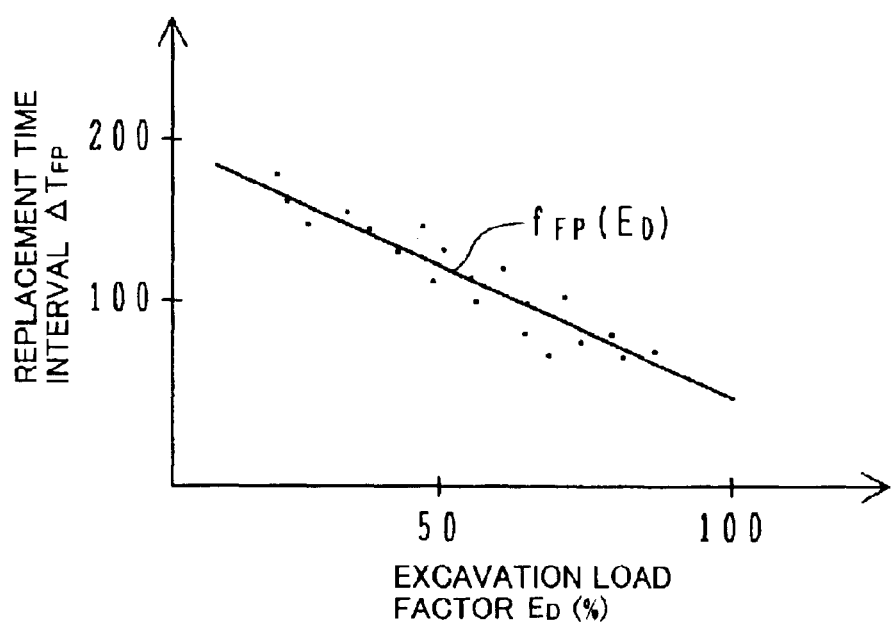
FIG. 30 is a graph showing one example of a front-pin replacement time function (correlation between excavation load factors and front pin replacement time intervals).

FIG. 30 shows one example of the front-pin replacement time interval function. In FIG. 30, a black dot represents each pair of the front-pin replacement time interval and the excavation load factor, and a solid line represents the front-pin replacement time interval function as an approximation of the plotted distribution.

After obtaining the correlation between excavation load factors and replacement time intervals as described above, that correlation is stored as the target maintenance information in the target maintenance database per machine model (step S408).

While the above description is made of the case of setting the correlation between load factors and replacement time intervals for the front pin, similar correlation can also be determined and set for each of other parts in a similar manner.

Figure 31:
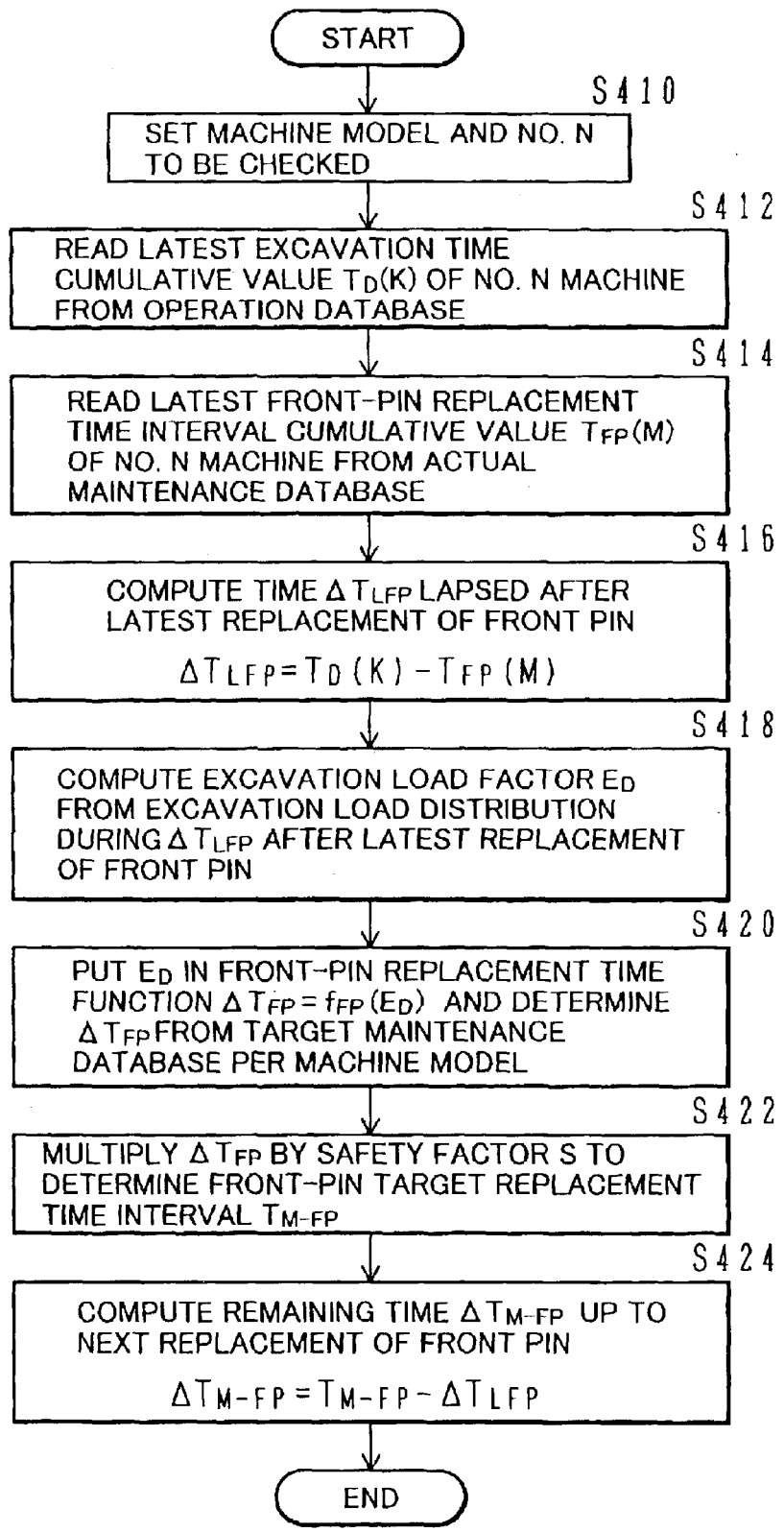
FIG. 31 is a flowchart showing details of the processing function of computing the maintenance remaining time for each part, which is executed in a machine body/operation information processing section of the center server according to the second embodiment of the present invention.

Next, in the machine body/operation information processing section 50 according to this embodiment, the maintenance remaining time is computed for each part in the step S36 of FIG. 7 in accordance with procedures shown in a flowchart of FIG. 31.

Referring to FIG. 31, the machine body/operation information processing section 50 first sets the machine model and number (e.g., N) of the hydraulic excavator to be checked (step S410). Then, the processing section 50 reads the latest excavation-time cumulative value $T_D(K)$ of the No. N machine of the set model from the operation database (step S412). Also, it reads the latest front-pin replacement time interval cumulative value $T_{FP}(M)$ of the No. N machine of the set model from the actual maintenance database (step S414). Thereafter, a time $\Delta T_{LEP}$ lapsed after the latest replacement of the front pin is computed from the following formula (step S416):

$$\Delta T_{LFP}=T_D(K)-T_{FP}(M)$$

The lapsed time $\Delta T_{LFP}$ corresponds to the working time of the front pin up to now, which is currently in use.

Further, the processing section 50 calculates the excavation load factor $E_D$ based on the excavation load distribution obtained after the latest front-pin replacement time (step S418). This calculation is the same as that executed in the step S404 in the flowchart of FIG. 28 for obtaining the load factor except that the time interval is given as the time $\Delta T_{LFP}$ after the latest replacement of the front pin.

Subsequently, the processing section 50 reads the above-mentioned front-pin replacement time interval function $\Delta T_{FP}=f_{FP}(E_D)$ stored in the target maintenance database per machine model, and puts the excavation load factor $E_D$ in that function, thereby obtaining the front-pin replacement time interval $\Delta T_{FP}$ at that excavation load factor (step S420).

Then, a front-pin target replacement time interval $T_{M-FP}$ is determined by multiplying the front-pin replacement time interval $\Delta T_{FP}$ by a safety factor S (step S422). The safety factor S is, for example, S=about 0.7. Thereafter, the remaining time $\Delta T_{M-FP}$ up to next replacement of the front pin is computed from the following formula (step S424):

$$\Delta T_{M-FP}=T_{M-FP}-\Delta T_{LFP}$$

As a result, the remaining time up to next replacement of the front pin in the No. N machine of the set model is computed as $\Delta T_{M-FP}$.

While the above description is made of the case of computing the maintenance remaining time of the front pin, the maintenance remaining time of any other part can also be computed in a similar manner.

With this embodiment thus constructed, the correlation between load factors and replacement time intervals is determined from the actual maintenance data that has been calculated on the basis of the working time per section, to which the relevant part belongs, using the part replacement data and the operation data including loads. The target replacement time interval is then calculated based on the determined correlation. Therefore, the obtained target replacement time interval reflects both the working time up to the actual replacement of the part and the load factor, and the more appropriate target replacement time interval can be set. As a result, it is possible to decide the more appropriate scheduled replacement timing.

A third embodiment of the present invention will be described with reference to FIGS. 32 to 33. This embodiment represents another example for determining the scheduled replacement timing in consideration of loads of parts as well.

The overall construction of a management system for a construction machine according to this embodiment is also the same as that in the first embodiment, and the system configuration is similar to that shown in FIGS. 1 to 3. Further, the machine side controller 2 and the base station center server 3 have the same processing functions as those in the first embodiment described above with reference to FIGS. 4 to 26 except for the following point. The different point in the processing functions from those in the first embodiment will be described below.

Figure 32:
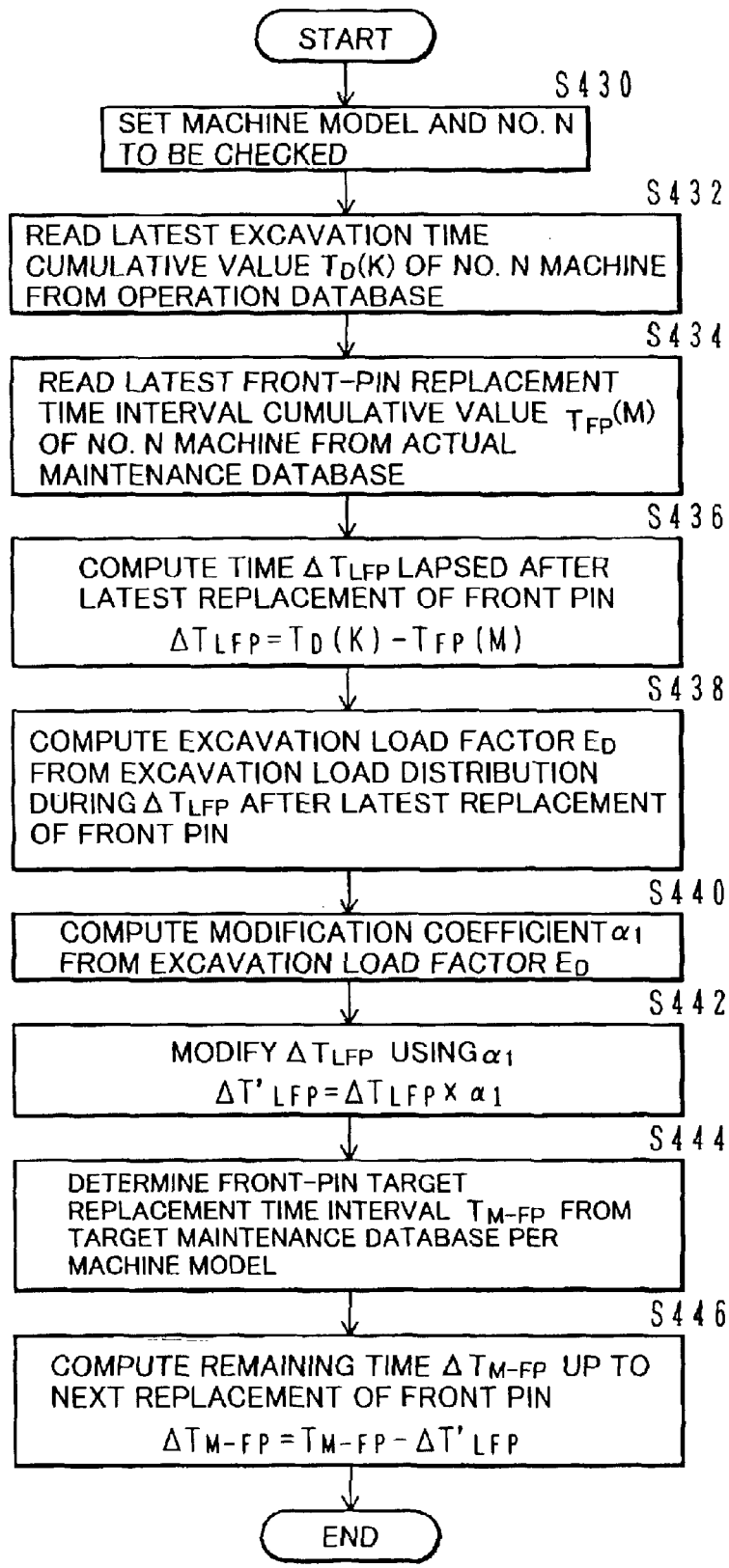
FIG. 32 is a flowchart showing details of the processing function of computing the maintenance remaining time for each part, which is executed in a machine body/operation information processing section of a center server according to a third embodiment of the present invention.

In this embodiment, in the step S36 of FIG. 7 the machine body/operation information processing section 50 of the center server 3 computes the maintenance remaining time for each part on the basis of the working time per section, to which the relevant part belongs, in accordance with procedures shown in a flowchart of FIG. 32. The flowchart of FIG. 32 corresponds to the case in which the part is a front pin.

In FIG. 32, processing from step S430 to step S438 is the same as that from step S410 to step S418 in the flowchart of FIG. 31.

After calculating the excavation load factor $E_D$ in a period subsequent to the latest replacement time of the front pin in the step S438, a modification coefficient $\alpha_1$ is determined from the excavation load factor $E_D$ (step S440). The calculation of this step is performed using the preset relationship, shown in FIG. 33, between the excavation load factor $E_D$ and the modification coefficient $\alpha_1$.

Figure 33:
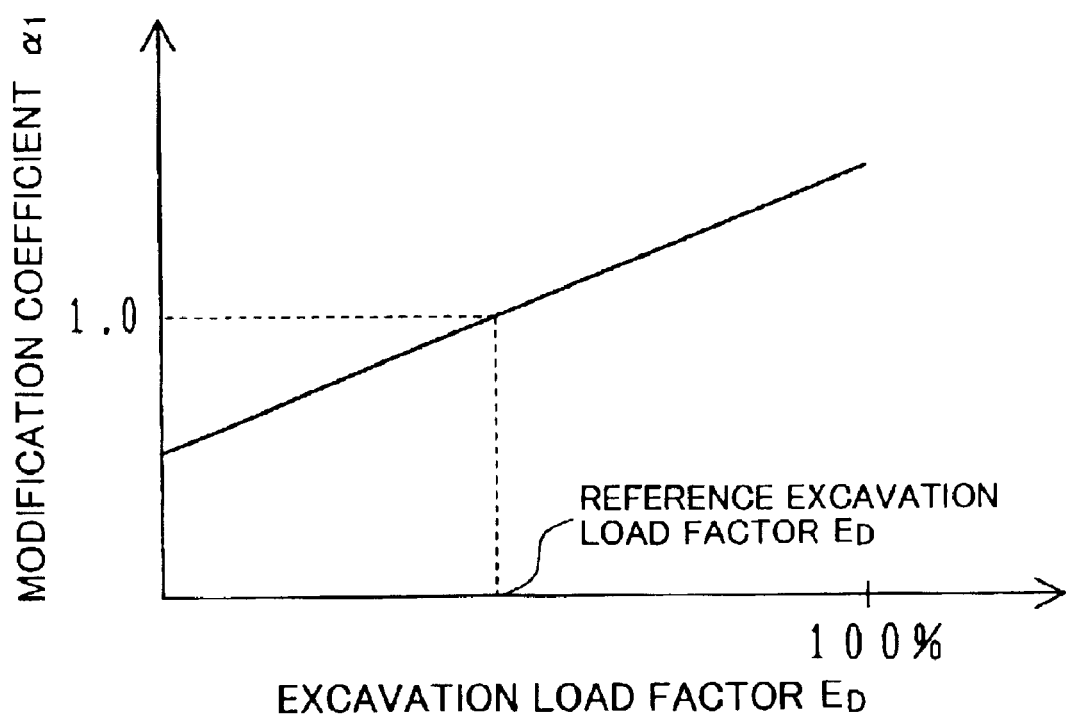
FIG. 33 is a graph showing the setting relationship between an excavation load factor $E_D$ and a modification coefficient $\alpha_1$.

In FIG. 33, the relationship between the excavation load factor $E_D$ and the modification coefficient $\alpha_1$ is set such that $\alpha_1=1$ is obtained when $E_D$ is a reference load, and $\alpha_1$ is gradually increased from 1 as $E_D$ increases from the reference load, while $\alpha_1$ is gradually decreased from 1 as $E_D$ decreases from the reference load.

After obtaining the modification coefficient $\alpha_1$ as described above, the time $\Delta T_{LFP}$ lapsed after the latest replacement of the front pin is modified as follows (step S442), using the modification coefficient $\alpha_1$:

$$\Delta T'_{LFP} = \Delta T_{LFP} \times \alpha_1$$

Also, the target replacement time interval of each part for the reference load is set beforehand in the target maintenance database per machine model shown in FIG. 9, and the front-pin target replacement time interval $T_{M\text{-}FP}$ for the reference excavation load is read from the target maintenance database (step S444). Thereafter, the remaining time $\Delta T_{M\text{-}FP}$ up to next replacement of the front pin is computed from the following formula (step S446):

$$\Delta T_{M\text{-}FP} = T_{M\text{-}FP} - \Delta T'_{LFP}$$

As a result, the remaining time up to next replacement of the front pin in the No. N machine of the set model is computed as $\Delta T_{M\text{-}FP}$.

While the above description is made of the case of computing the maintenance remaining time of the front pin, the maintenance remaining time of any other part can also be computed in a similar manner.

The target replacement time interval of each part for the reference load, which is set beforehand in the target maintenance database per machine model, can be determined with numerical analysis using design data. Alternatively, it may be calculated and set using the operation data and the actual maintenance data, as described later in a fifth embodiment.

With this embodiment thus constructed, since the obtained target replacement time interval reflects both the working time up to the actual replacement of the part and the load factor, the more appropriate target replacement time interval can be set. As a result, it is possible to decide the more appropriate scheduled replacement timing.

A fourth embodiment of the present invention will be described with reference to FIGS. 34 to 41. This embodiment is intended to not only replace parts, but also manage the timing of part repair (overhaul).

The overall construction of a management system for a construction machine according to this embodiment is the same as that in the first embodiment, and the system configuration is similar to that in the first embodiment shown in FIGS. 1 to 3. Also, the machine side controller has the same processing functions as those in the first embodiment, and the base station center server has the same processing functions as those described above with reference to FIGS. 4, 7–16 and 23–26 except for the following point. The different point in the processing functions of the base station center server in this embodiment from those in the first embodiment will be described below.

Figure 34:
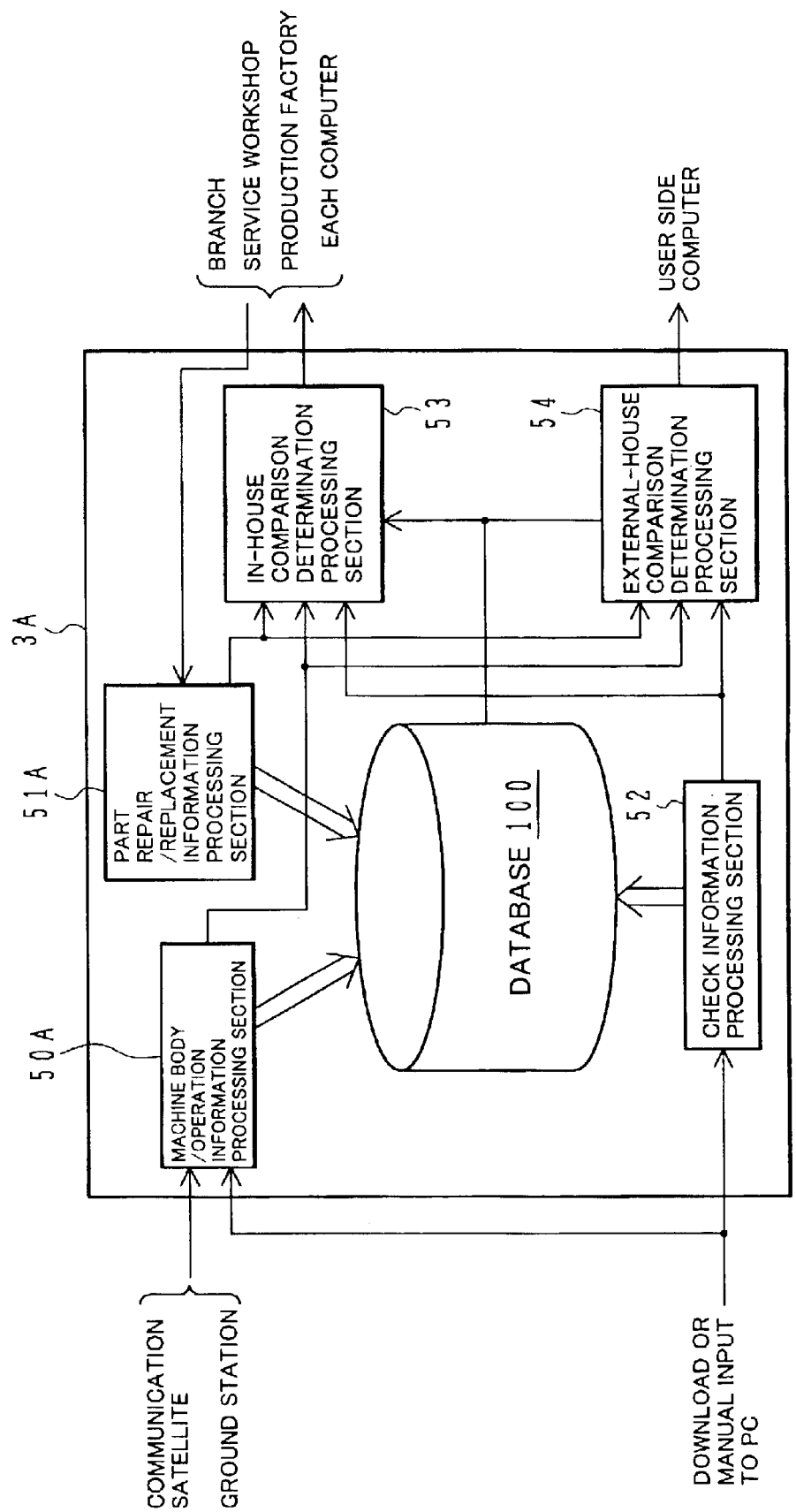
FIG. 34 is a functional block diagram showing an outline of processing functions of a CPU in a base station center server in a management system for a construction machine according to a fourth embodiment of the present invention.

FIG. 34 is a functional block diagram showing an outline of processing functions of the CPU 3c (see FIG. 1) in a base station center server 3A. The CPU 3c includes a machine body/operation information processing section 50A and a part repair/replacement information processing section 51A instead of the machine body/operation information processing section 50 and the part replacement information processing section 51 shown in FIG. 4. The machine body/operation information processing section 50A executes processing shown in FIG. 35 based on operation information inputted from the machine side controller 2. The part repair/replacement information processing section 51A executes processing shown in FIG. 36 based on part repair/replacement information inputted from the in-house computer 4. The other processing sections are the same as those described above in connection with the first embodiment shown in FIG. 4.

Figure 35:
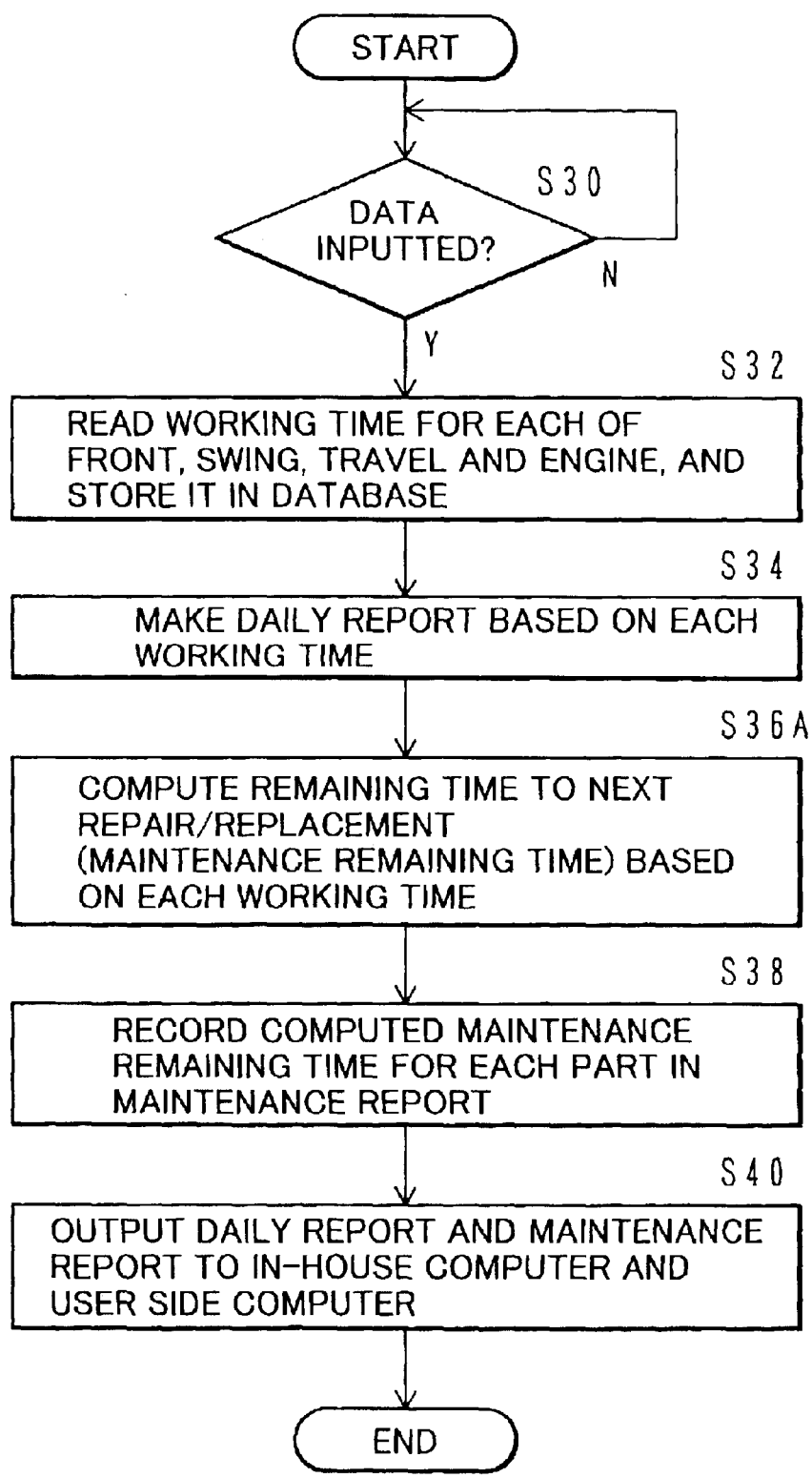
FIG. 35 is a flowchart showing the processing function of a machine body/operation information processing section in the base station center server executed when the working time data has been transmitted from the machine side controller.

In FIG. 35, the machine body/operation information processing section 50A reads in step S36A, out of the database 100, the operation data, actual maintenance data (described later) and target maintenance data (described later), and computes the remaining time up to next repair or replacement (hereinafter referred to as the "maintenance remaining time") for each part on the basis of the working time per section to which the relevant part belongs. The other processing procedures are the same as those in the first embodiment shown in FIG. 7.

Figure 36:
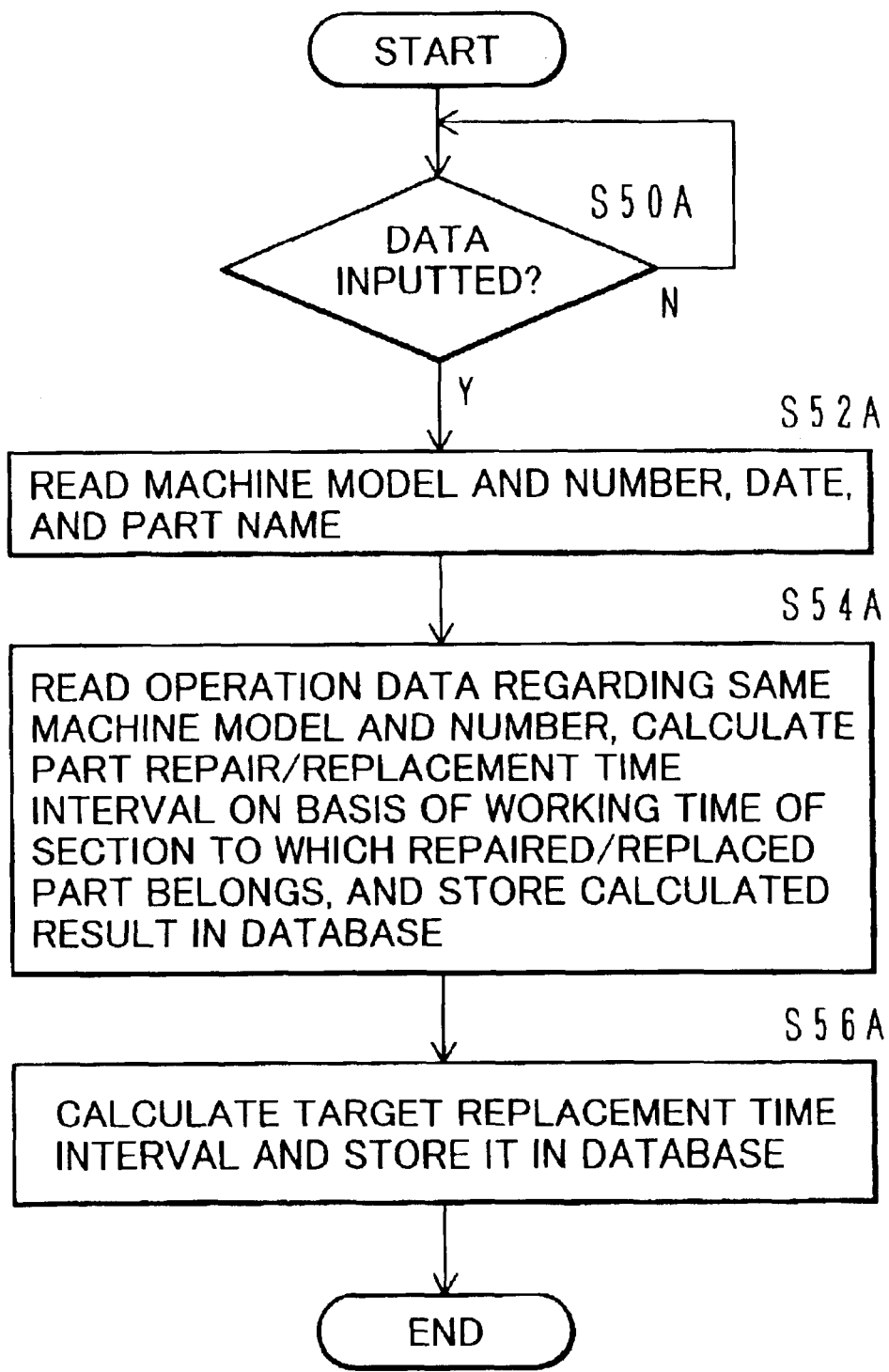
FIG. 36 is a flowchart showing the function of processing part repair/replacement information executed in a part repair/replacement information processing section of the base station center server.

In FIG. 36, the part repair/replacement information processing section 51A monitors whether the part repair/replacement information is inputted from the in-house computer 4 by, e.g., the serviceman (step S50A). When the part repair/replacement information is inputted, the processing section 51A reads the inputted information (step S52A). Herein, the part repair/replacement information contains the machine number of a hydraulic excavator whose part has been repaired or replaced, the repairing or replacement date, and the name of the repaired or replaced part.

Then, the processing section 51A accesses the database 100, reads the operation data regarding the same machine number, and calculates a repair/replacement time interval of each repaired or replaced part on the basis of the working time of the section to which the relevant part belongs, followed by storing and accumulating the calculated result in the database 100 as actual maintenance data (step S54A). Herein, the part repair/replacement time interval means a time interval from the time at which one part was assembled in the machine body, to the time at which it was replaced by a new one or repaired (overhauled) because of a failure or expiration of the life. As mentioned above, the part repair/replacement time interval is calculated on the basis of the working time of the section to which the relevant part belongs. Taking the engine as an example, the section to which the engine belongs is the engine itself. Then, if the engine running time until repair of the engine is 4100 hours, the repair time interval of the engine is calculated as 4100 hours.

Subsequently, the processing section 51A reads the actual maintenance data regarding the inputted machine model and part, calculates the target repair/replacement time interval, and stores it in the database 100 (step S56A) (as described later).

FIGS. 37 and 38 show how the actual maintenance data and the target maintenance data are stored in the database 100.

Referring to FIG. 37, in the actual maintenance database per machine model and number, the repair/replacement time interval of each of parts, which have been repaired or replaced in the past, is stored per machine model and number as a cumulative value on the basis of the working time of the section to which the relevant part belongs. In the illustrated example, replacement time intervals $T_{EF}(i)$ and $T_{FB}(i)$ of the engine oil filter and the front bushing are the same as those in the first embodiment described above with reference to FIG. 9. $T_{ENR}(1)$ and $T_{ENR}(K)$ represent respective cumulative values of the repair time intervals after the first and K-th repair of the engine of the No. N machine of model A (e.g., 4100 hr and 18000 hr on the basis of the engine running time). $T_{HP}(1)$ and $T_{HP}(N)$ represent respective cumulative values of the repair time intervals after the first and N-th replacement of the hydraulic pump of the No. N machine (e.g., 2500 hr and 16200 hr on the basis of the engine running time). Similar data is also stored for a No. N+1 machine, a No. N+2 machine, of model A. Note that the working time of the hydraulic pump may be given as a time during which the pump delivery pressure is not lower than a predetermined level.

Referring to FIG. 38, in the target maintenance database per machine model, the target repair/replacement time interval of each of parts used in each machine model is stored per machine model as a value on the basis of the working time of the section to which the relevant part belongs. In an illustrated example, the target replacement time interval $T_{M-EF}$ of the engine oil filter and the target replacement time interval $T_{M-FB}$ of the front bushing have already been described above in the first embodiment with reference to FIG. 9. Further, $T_{M-EN}$ represents the target repair time interval of the engine used in the machine model A (e.g., 6000 hr on the basis of the engine running time), and $T_{M-HP}$ represents the target repair time interval of the hydraulic pump used in the machine model A (e.g., 5000 hr on the basis of the engine running time). Similar data is also stored for all other machine models B, C, . . . . In this connection, the target value is preferably set for each number of times, such as a target value for the first repair, a target value for the second repair, and so on.

Figure 39:
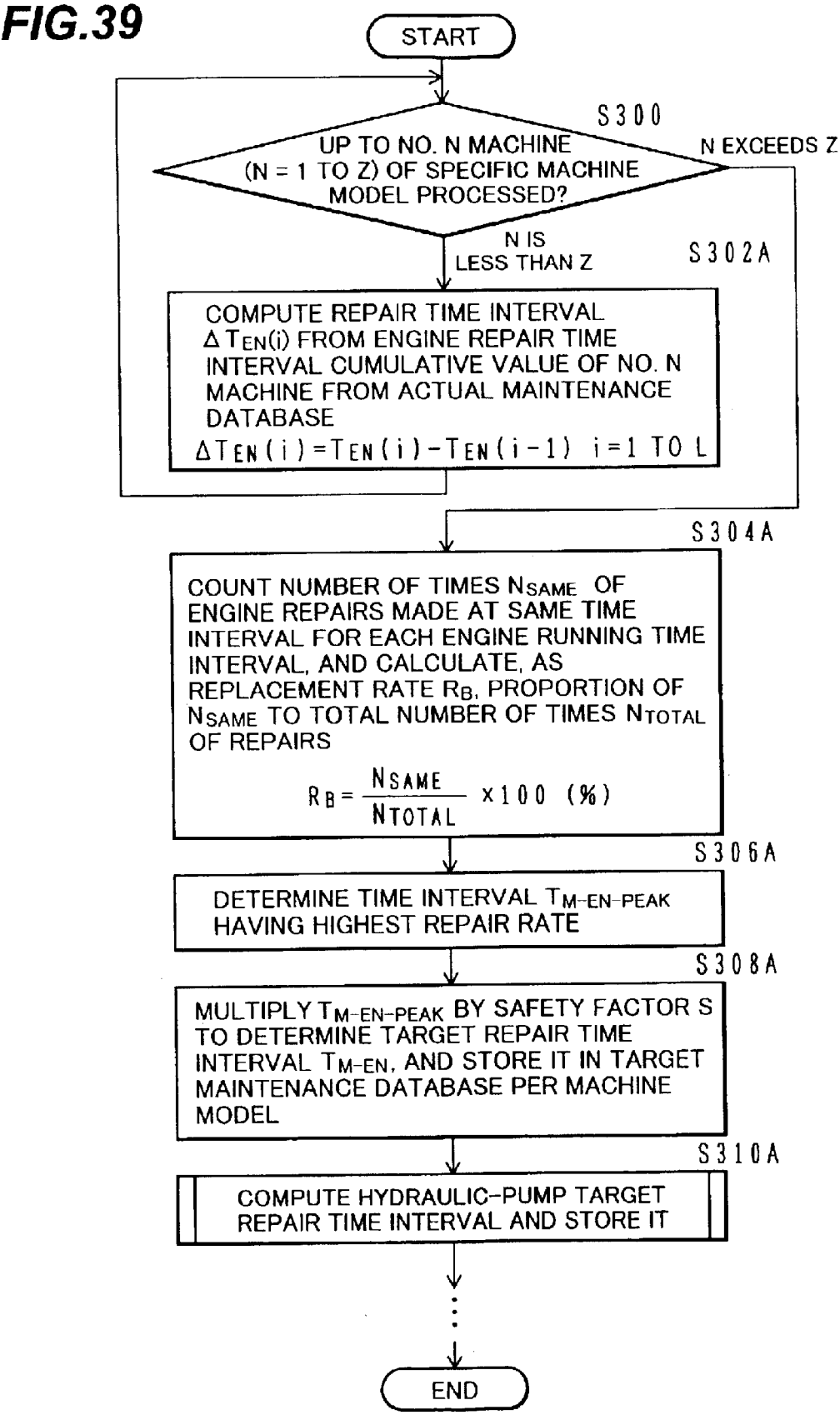
FIG. 39 is a flowchart showing details of the processing function of computing the target replacement time interval for each part, which is executed in a part replacement information processing section.

Using the data stored in the actual maintenance database shown in FIG. 37, the part repair/replacement information processing section 51A computes, in the step S56A of FIG. 36, not only the target replacement time interval for each part as shown in FIG. 12, but also the target repair time interval of each part in accordance with procedures shown in a flowchart of FIG. 39.

First, to process all data regarding the machine numbers 1 to Z of a particular machine model, the processing section 51A determines whether the machine number N is equal to or smaller than Z (step S300). If N is not larger than Z, the processing section 51A accesses a storage area storing the engine repair time interval cumulative values of the No. N machine in the actual maintenance database shown in FIG. 37, and computes a repair time interval $\Delta T_{EN}(i)$ from those engine repair time interval cumulative values using the following formula (step S302A):

$$\Delta T_{EN}(i)=T_{EN}(i)-T_{EN}(i-1)$$

i=1 to L (L is the number of times of repairs of the engine in the No. N machine)

Herein, the engine repair time interval $\Delta T_{EN}(i)$ means, as mentioned above, a time interval from the time at which one engine was assembled in the machine body, to the time at which it was repaired (overhauled) replaced because of a failure. That time interval is given as a value on the basis of the engine running time. By executing the above-described processing for all of the machine numbers 1 to Z, data of the engine repair/replacement time interval $\Delta T_{EN}$ is collected for all hydraulic excavators of the particular model.

After completion of the process for collecting data of the engine repair time interval $\Delta T_{EN}$ for all hydraulic excavators, the processing section 51A executes processing to obtain correlation between engine repair time intervals and engine repair rates (step S304A). The term "engine repair rate" means a proportion (%) of the number of times $N_{SAME}$ of engine repairs, which have the equal repair time interval (i.e., the engine running time up to repair), with respect to the total number of times $N_{TOTAL}$ of engine repairs. In other words, assuming the engine repair rate to be $R_B$, it is expressed by:

$$R_B=(N_{SAME}/N_{TOTAL})\times 100\ (\%)$$

Herein, whether the engine repair time intervals are equal to each other is determined, for example, by dividing the engine running time in units of 50 hours into, e.g., ranges of from 0 to 50 hours, from 50 to 100 hours, . . . , from 950 to 1000 hours, and so on, and checking whether each engine repair time interval falls within the same range at time intervals of 50 hours.

Figure 40:
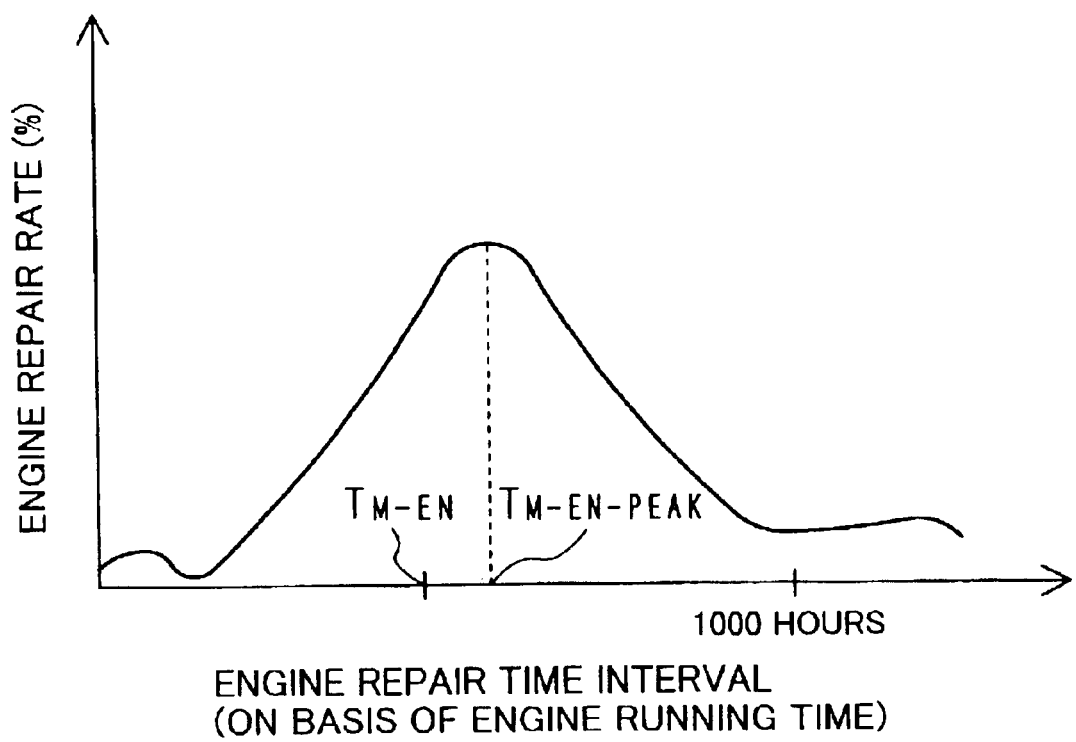
FIG. 40 is a graph showing one example of correlation between engine repair time intervals and replacement rates.

FIG. 40 shows one example of thus-obtained correlation between engine repair time intervals and engine repair rates.

After obtaining the correlation between engine repair time intervals and engine repair rates as described above, the time interval having a maximum repair rate (i.e., the largest number of repairs) is determined (step S306A). In the example in which the repair rate is calculated using a time width in units of 50 hours, a central value of the 50-hour time interval, in which the maximum repair rate is present, is set as the repair time interval of the engine. The thus-obtained repair time interval is indicated by $T_{M-EN-PEAK}$ in FIG. 40.

Then, after multiplying the repair time interval $T_{M-EN-PEAK}$ by a safety factor S, a resulted value is set as the engine target repair time interval $T_{M-EN}$ and stored in the target maintenance database per machine model (step S308A). The safety factor S is, for example, S=about 0.7. In this way, the target repair time interval of the engine is set.

While the above description is made of the case of setting the target repair time interval of the engine, the target repair time interval of any other part, e.g., the hydraulic pump, can also be calculated and set in a similar manner. Also, by collecting and adding the repair time intervals for each of repairs, the target value can be calculated and set for each number of times, such as a target value for the first repair, a target value for the second repair, and so on.

Figure 41:
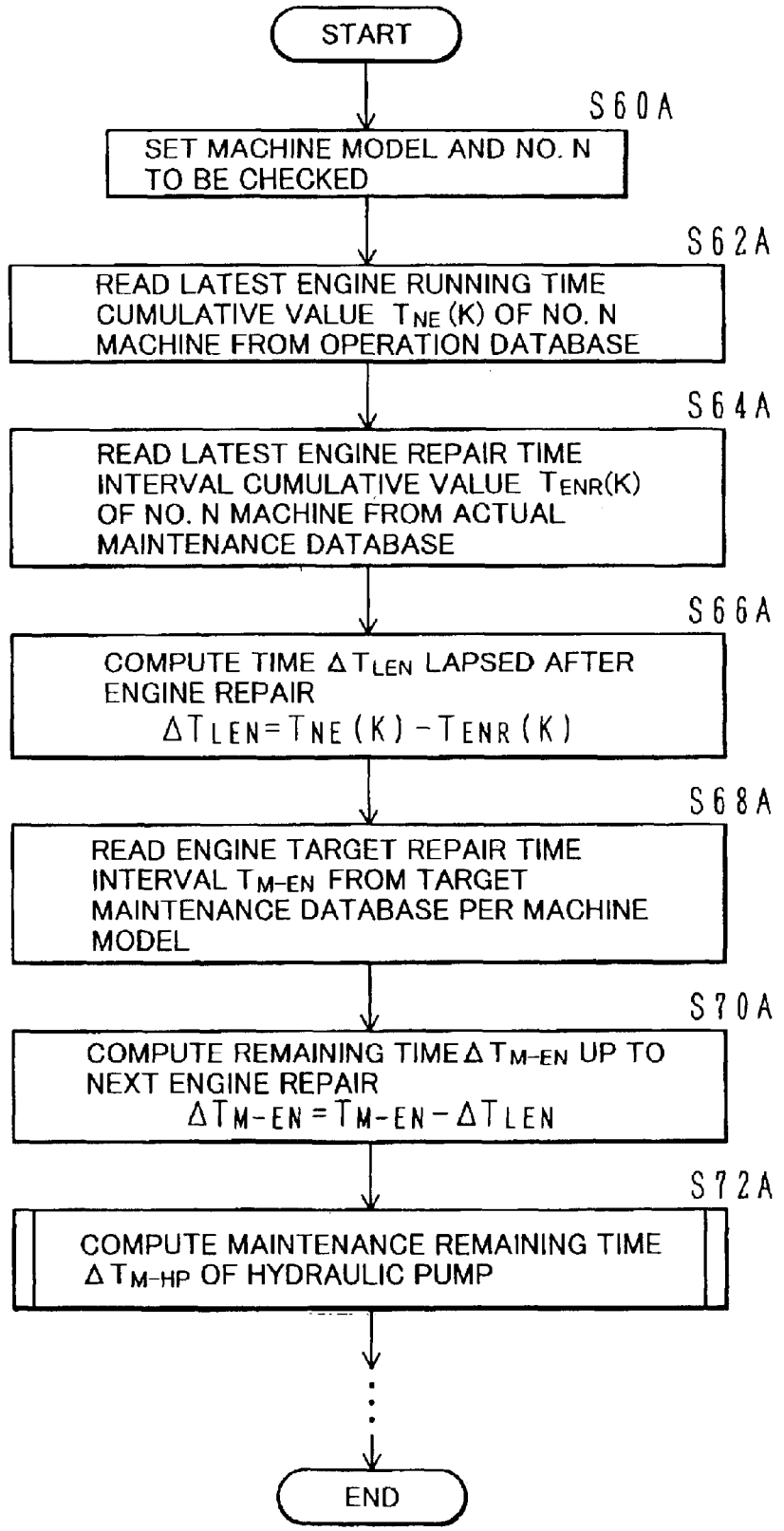
FIG. 41 is a flowchart showing a manner of calculating the maintenance remaining time.

Next, using the data stored in the operation database described above with reference to FIG. 9, and the data stored in the actual maintenance database and the target maintenance database shown respectively in FIGS. 37 and 39, the machine body/operation information processing section 50A computes, in the step S36A of FIG. 35, not only the maintenance (replacement) remaining time for each part as shown in the flowcharts of FIGS. 10 and 11, but also the repair remaining time of each part on the basis of the working time per section, to which the relevant part belongs, in accordance with procedures shown in a flowchart of FIG. 41.

Referring to FIG. 41, the machine body/operation information processing section 50A first sets the machine model and number (e.g., N) of the hydraulic excavator to be checked (step S60A). Then, the processing section 50A reads the latest engine-running-time cumulative value $T_{NE}(K)$ of the No. N machine of the set model from the operation database (step S62A). Also, it reads the latest engine repair time interval cumulative value $T_{ENR}(K)$ of the No. N machine of the set model from the actual maintenance database (step S64A). Thereafter, a time $\Delta T_{LEN}$ lapsed after the last repair of the engine is computed from the following formula (step S66A):

$$\Delta T_{LEN}=T_{NE}(K)-T_{ENR}(K)$$

Further, the processing section 50A reads the engine target repair time interval $T_{M-EN}$ from the target maintenance database per machine model (step S68A). Then, the remaining time $\Delta T_{M-EN}$ up to next repair of the engine is computed from the following formula (step S70A):

$$\Delta T_{M-EN}=T_{M-EN}-\Delta T_{LEN}$$

As a result, the remaining time up to next repair of the engine in the No. N machine of the set model is computed as $\Delta T_{M-EN}$.

The repair remaining time is similarly calculated for other parts, e.g., the hydraulic pump (step S72A).

When the target value is set for each number of times in the target maintenance database per machine model, such as a target value for the first repair, a target value for the second repair, and so on, the repair remaining time can be calculated for each number of times by determining how many times the engine has been repaired up to now and comparing the current working time with the corresponding repair target value.

With this embodiment, the target repair time interval can be set and the appropriate scheduled repair timing can be decided even for a part, such as the engine and the hydraulic pump, to be repaired in the event of a failure. Accordingly, the part can be avoided from being repaired in spite of being still usable, can be economically used at minimum waste, and can be surely repaired before the occurrence of a failure. Further, since the appropriate maintenance timing (scheduled repair timing) of the part can be determined, it is possible to predict the timing of ordering new parts and the timing of sending the serviceman with certainty, and to facilitate the maintenance management on the maker side.

Note that while this embodiment is intended to manage the part repair timing as well in the first embodiment, the second and third embodiments can also be modified so as to manage the part repair timing in a similar manner.

A fifth embodiment of the present invention will be described with reference to FIGS. 42 to 49. This embodiment represents still another example for deciding the scheduled repair/replacement timing in consideration of loads of parts as well.

The overall construction of a management system for a construction machine according to this embodiment is the same as that in the first embodiment, and the system configuration is similar to that in the first embodiment shown in FIGS. 1 to 3. Also, the machine side controller has the same processing functions as those in the first embodiment, and the base station center server has the same processing functions as those described above with reference to FIGS. 4, 7, 8, 14–16, and 23–26 (first embodiment) and FIG. 34 (fourth embodiment) except for the following point.

The different point in the processing functions of the base station center server in this embodiment from those in the first and fourth embodiments will be described below.

In this embodiment, the CPU 3c (see FIG. 1) in the base station center server 3A includes, as with the fourth embodiment shown in FIG. 34, the machine body/operation information processing section 50A and the part repair/replacement information processing section 51A. The machine body/operation information processing section 50A executes processing shown in FIG. 42 based on operation information inputted from the machine side controller 2. The part repair/replacement information processing section 51A executes processing shown in FIG. 43 based on part repair/replacement information inputted from the in-house computer 4. The other processing sections are the same as those described above in connection with the first embodiment shown in FIG. 4.

Figure 43:
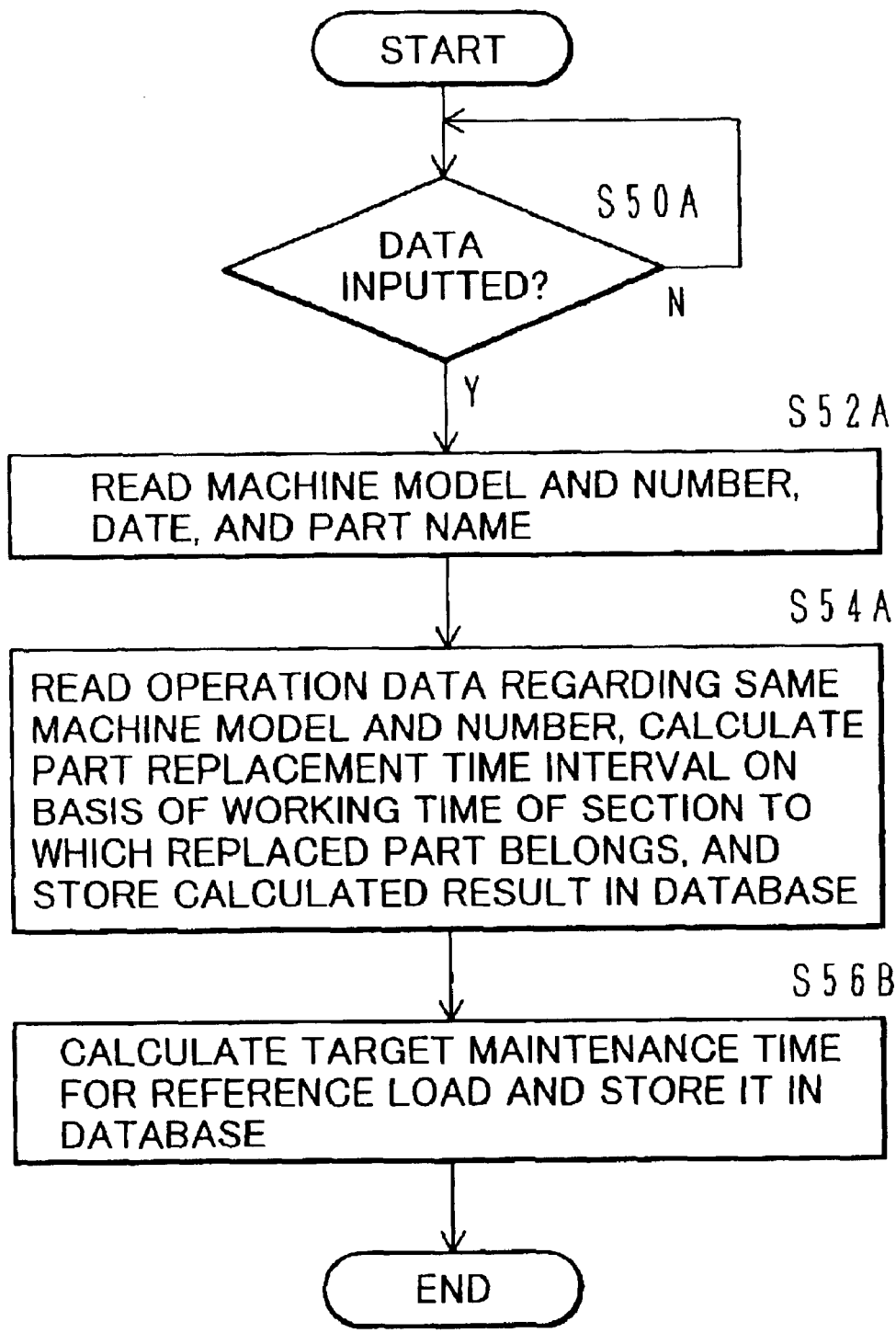
FIG. 43 is a flowchart showing the processing function of a part repair/replacement information executed in a part repair/replacement information processing section of the base station center server.
Figure 44:
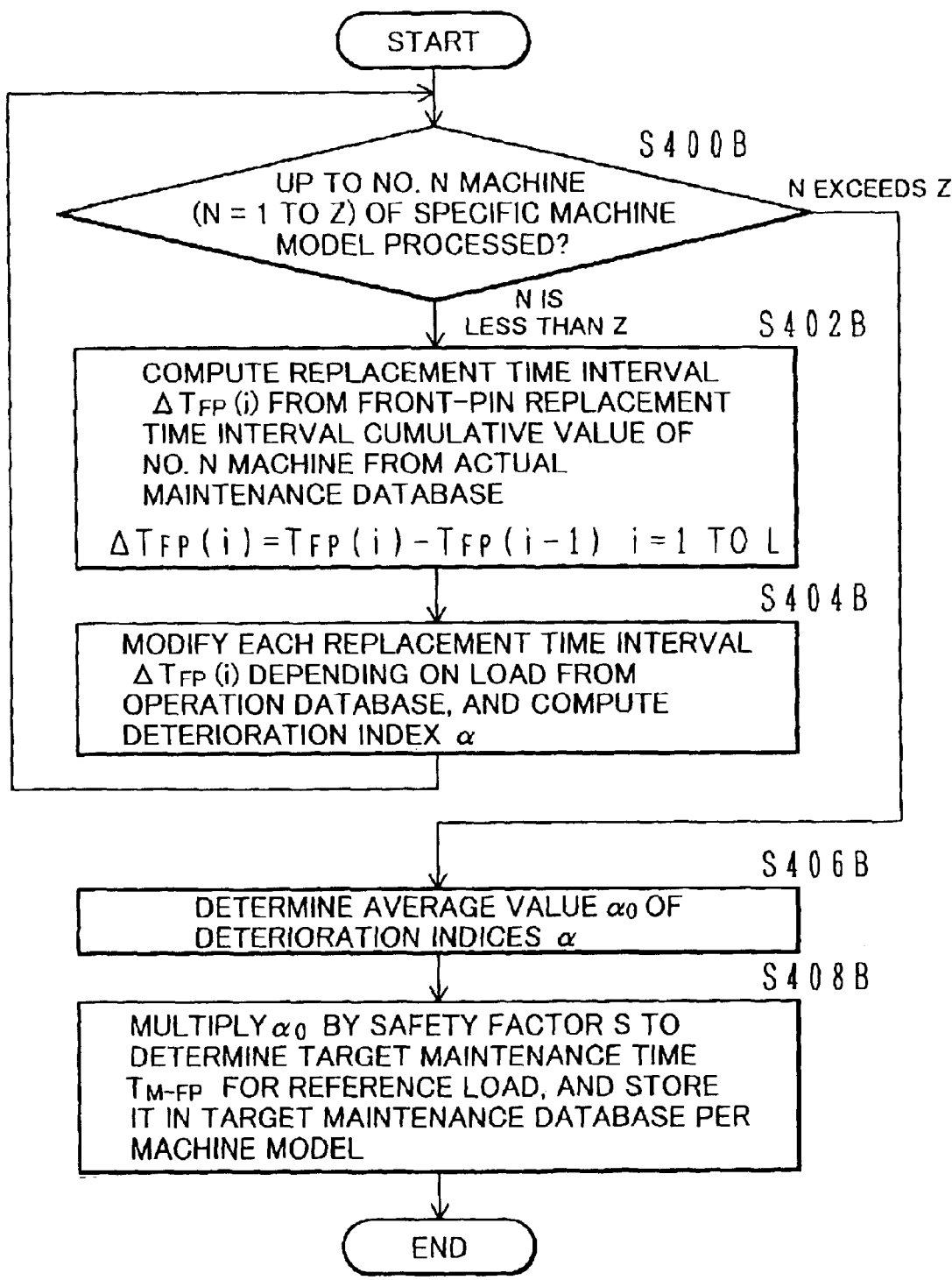
FIG. 44 is a flowchart showing details of the processing function of computing the target maintenance time for each part, which is executed in the part replacement information processing section.

In step S56B of FIG. 43, the processing section 51A calculates, as a load-dependent modification index value of the target repair/replacement time interval, a target repair/replacement time interval for a reference load as shown in FIG. 44. FIG. 44 represents, by way of example, the case of calculating the target replacement time interval for the reference load of the front pin in a particular machine model.

In FIG. 44, to process all data regarding the machine numbers 1 to Z of a particular machine model, the processing section 51A first determines whether the machine number N is equal to or smaller than Z (step S400B). If N is not larger than Z, the processing section 51A accesses a storage area storing the front-pin replacement time intervals of the No. N machine in the actual maintenance database shown in FIG. 37, and computes a replacement time interval $\Delta T_{FP}(i)$ from the front-pin replacement time interval cumulative values using the following formula (step S402B):

$$\Delta T_{FP}(i)=T_{FP}(i)-T_{FP}(i-1)$$

i=1 to L (L is the number of replacements of the front pin in the No. N machine)

Herein, the front-pin replacement time interval $\Delta T_{FP}(i)$ is given as a value on the basis of the operating time of the front (excavation time). By executing the above-described processing for all of the machine numbers 1 to Z, data of the front-pin replacement time interval $\Delta T_{FP}$ is collected for all hydraulic excavators of the particular model.

After completion of the process for collecting data of the front-pin replacement time interval $\Delta T_{FP}$ for all hydraulic excavators, the processing section 51A reads the frequency distribution data of excavation loads for each of the front-pin replacement time intervals $\Delta T_{FP}(i)$ out of the frequency distribution data regarding the particular machine model, which is stored in the operation database shown in FIG. 24, and then modifies each replacement time interval $\Delta T_{FP}(i)$ depending on loads, thereby computing a deterioration index $\alpha(i)$ (step S404B).

Figure 45:
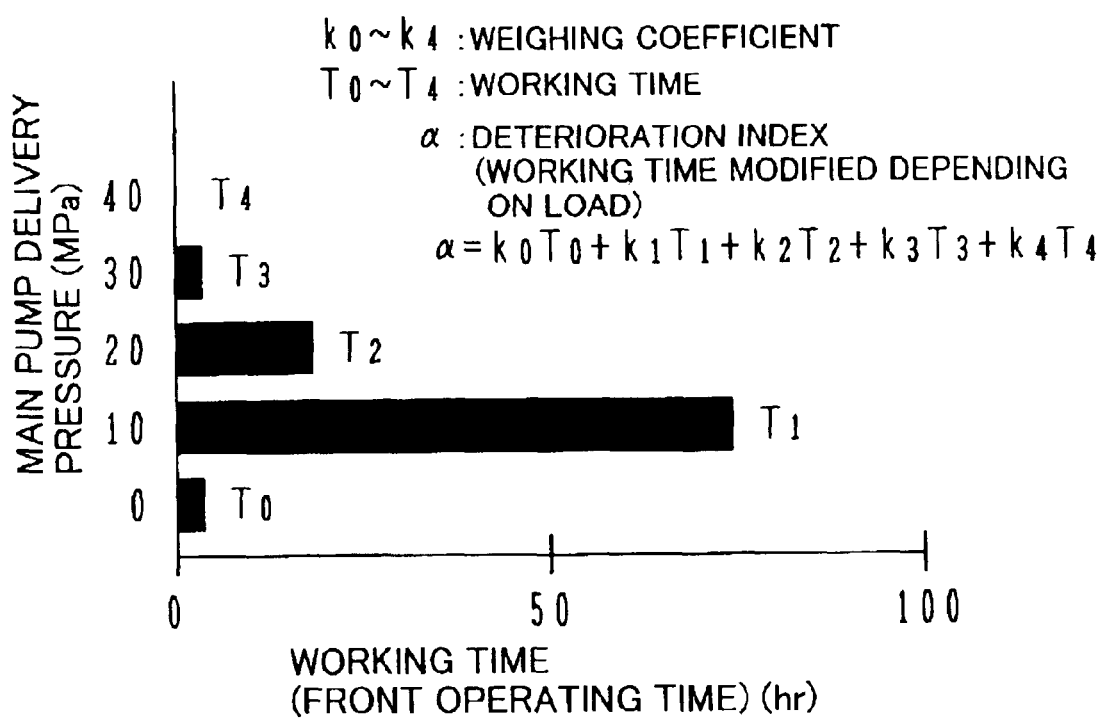
FIG. 45 is a graph showing a manner of calculating a deterioration index $\alpha$ of one front pin of a particular hydraulic excavator, which has been replaced in the past.

A manner of calculating the deterioration index $\alpha(i)$ is described with reference to FIG. 45. FIG. 45 is a graph showing a manner of calculating the deterioration index $\alpha$ of one front pin of a particular hydraulic excavator, which has been replaced in the past.

In the graph of FIG. 45, the horizontal axis represents working time of the front pin on the basis of the operating time of the front (excavation time), and the vertical axis represents a load distribution during the front-pin replacement time interval $\Delta T_{FP}$ (pump delivery pressure distribution during the front operation). Weighing coefficients $k_0$ to $k_4$ depending on the delivery pressure are set for respective unit ranges of the delivery pressure distribution, and values of the working time $T_0$ to $T_4$ in the respective delivery pressure unit ranges are multiplied by the corresponding weighing coefficients $k_0$ to $k_4$. A total value of the calculated products is set as the deterioration index $\alpha$ of the front pin. Thus, the deterioration index $\alpha$ is expressed by:

$$A=k_0T_0+k_1T_1+k_2T_2+k_3T_3+k_4T_4$$

Herein, the weighing coefficients $k_0$ to $k_4$ are each given as a value set, for example, by assuming the weighing coefficient for the delivery pressure in a reference delivery pressure unit range to be 1, and increasing or decreasing the value from 1 depending on an increase or decrease of the delivery pressure in each delivery pressure unit range. In other words, the deterioration index $\alpha$ of the front pin (replaced part) corresponds to a value that is obtained by modifying the replacement time interval $\Delta T_{FP}$ thereof depending on the load condition during that time interval (i.e., the working time of the front pin modified depending on loads).

After calculating the deterioration index $\alpha(i)$ of the front pin as described above, an average value (average deterioration index) $\alpha_0$ of the deterioration indices is determined for a particular machine body and all hydraulic excavators (step S406B).

Figure 46:
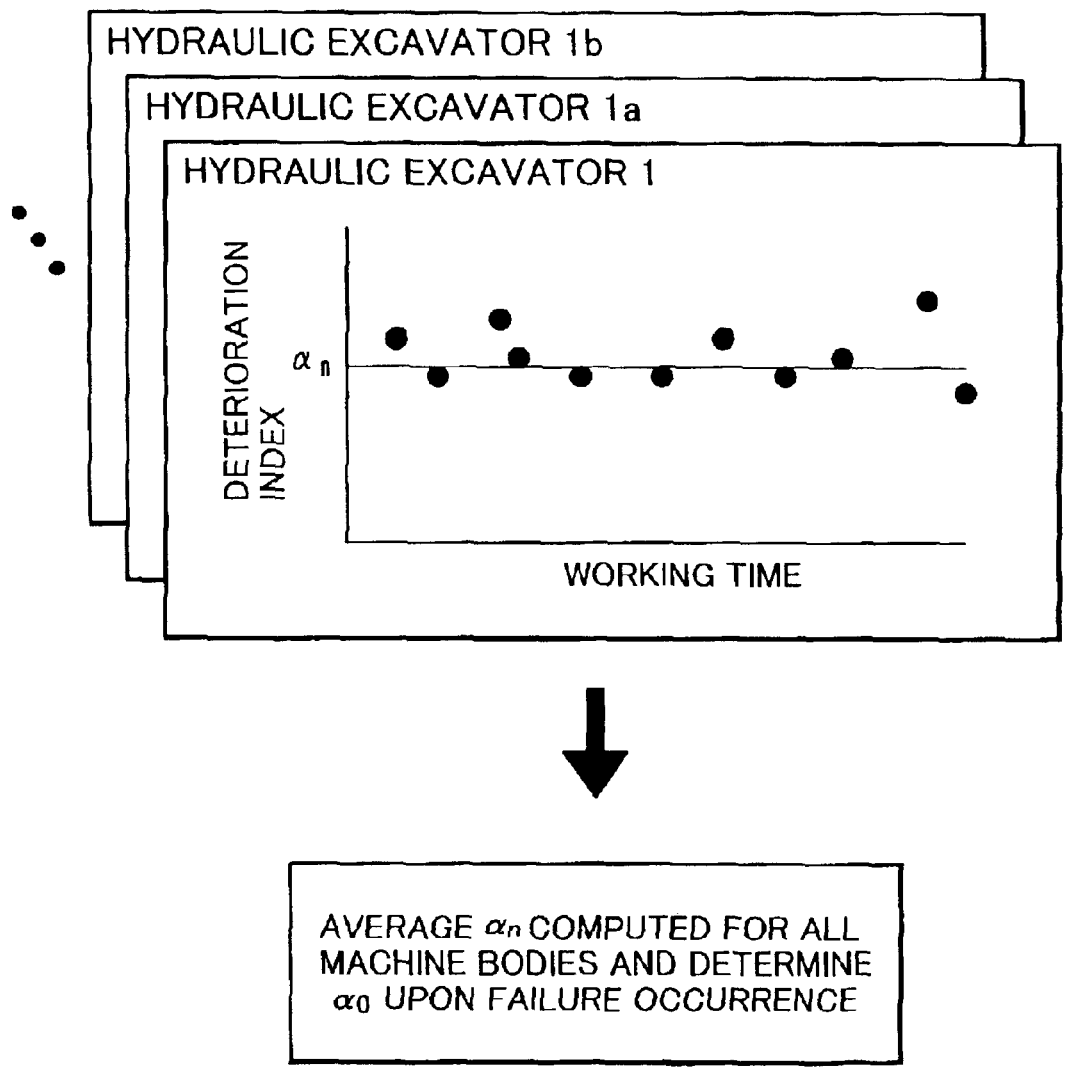
FIG. 46 shows one example of a manner of calculating an average value $\alpha_0$ of the deterioration indices.

FIG. 46 shows one example of a manner of calculating the average value $\alpha_0$ of the deterioration indices. The deterioration index α(i) of the front pin is determined for the working time of each hydraulic excavator, and an average value $α_n$ of the individual deterioration indices is determined for each hydraulic excavator. Then, the average deterioration index $α_0$ representing the time of occurrence of a failure is determined by obtaining an average value of the deterioration indices $α_n$ over all of the hydraulic excavators.

After obtaining the average deterioration index $α_0$ as described above, it is multiplied by a safety factor S. A resulted value is set as the target replacement time interval $T_{M-FP}$ for the reference load and stored in the target maintenance database per machine model shown in FIG. 38 (step S408B). Thus:

$$T_{M-FP} = α_0 \cdot S$$

The safety factor S is, for example, about 0.8.

While the above description is made of the case of calculating the front-pin target repair time interval for the reference load, the target repair or replacement time interval of any other part can also be calculated in a similar manner.

Figure 42:
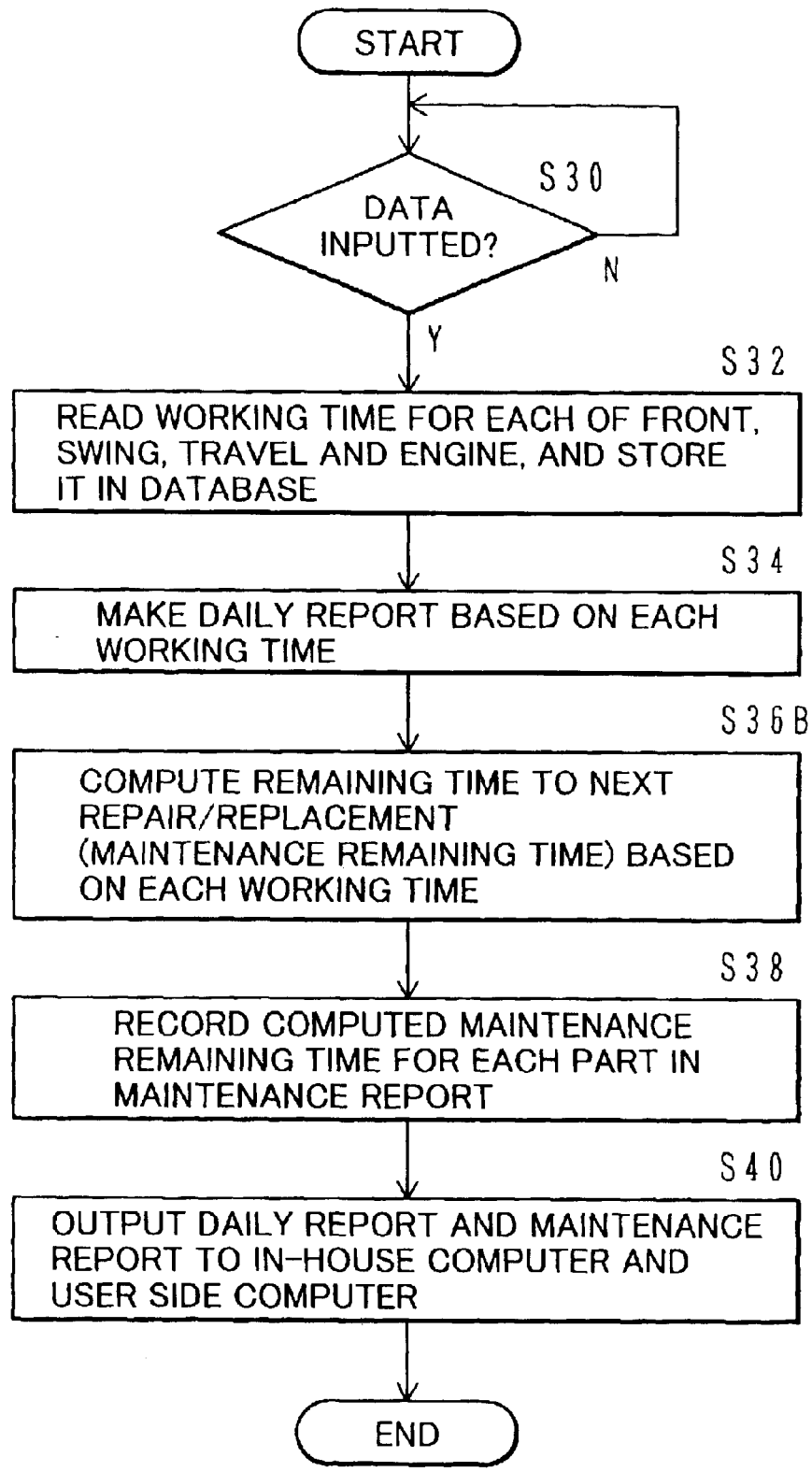
FIG. 42 is a flowchart showing the processing function of a machine body/operation information processing section in a base station center server executed when the working time data has been transmitted from the machine side controller in a management system for a construction machine according to a fifth embodiment of the present invention.
Figure 47:
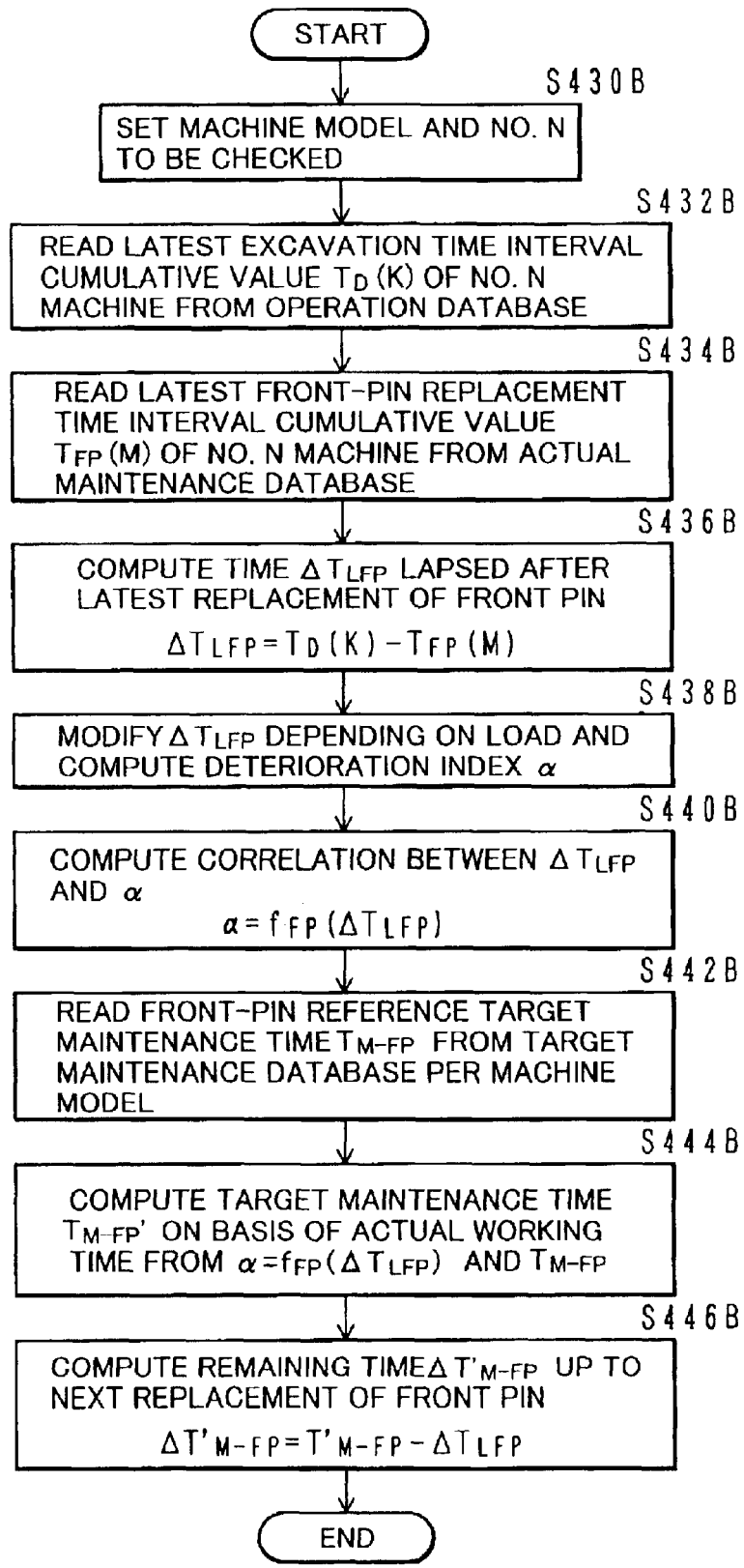
FIG. 47 is a flowchart showing details of the processing function of computing the maintenance remaining time for each part, which is executed in the machine body/operation information processing section of the base station center server.

Next, using, as the index value modified depending on loads, the target repair or replacement time interval determined as described above, the machine body/operation information processing section 50A computes, in step S36B of the flowchart of FIG. 42, the maintenance remaining time of each part as shown FIG. 47. FIG. 47 represents, by way of example, the case of calculating the maintenance remaining time of the front pin as with the flowchart of FIG. 44.

Referring to FIG. 47, the machine body/operation information processing section 50A first sets the machine model and number (e.g., N) of the hydraulic excavator to be checked (step S430B).

Then, the processing section 50A reads the latest excavation time cumulative value $T_D(K)$ of the No. N machine of the set model from the operation database shown in FIG. 24 (step S432B). Also, it reads the latest front-pin replacement time interval cumulative value $T_{FP}(M)$ of the No. N machine of the set model from the actual maintenance database shown in FIG. 37 (step S434B). Thereafter, a time $ΔT_{LFP}$ lapsed after the latest replacement of the front pin is computed from the following formula (step S436B):

$$ΔT_{LFP} = T_D(K) - T_{FP}(M)$$

The lapsed time $ΔT_{LFP}$ corresponds to the working time of the front pin up to now, which is currently in use.

Further, the processing section 50A reads the excavation load distribution after the latest replacement of the front pin from the operation frequency distribution data stored in the operation database, and modifies the lapsed time $ΔT_{LFP}$ depending on loads, thereby determining the deterioration index α (step S438B). This calculation is the same as that executed in the step S404B of the flowchart of FIG. 44 for determining the deterioration index α except that the time interval is given as the lapsed time $ΔT_{LFP}$ after the latest replacement of the front pin.

Then, the processing section 50A determines the correlation between the working time $ΔT_{LFP}$ (actual working time) of the front pin up to now, which is currently in use, and the deterioration index α (working time modified depending on loads) (step S440B):

$$α = f_{FP}(ΔT_{LFP})$$

Figure 48:
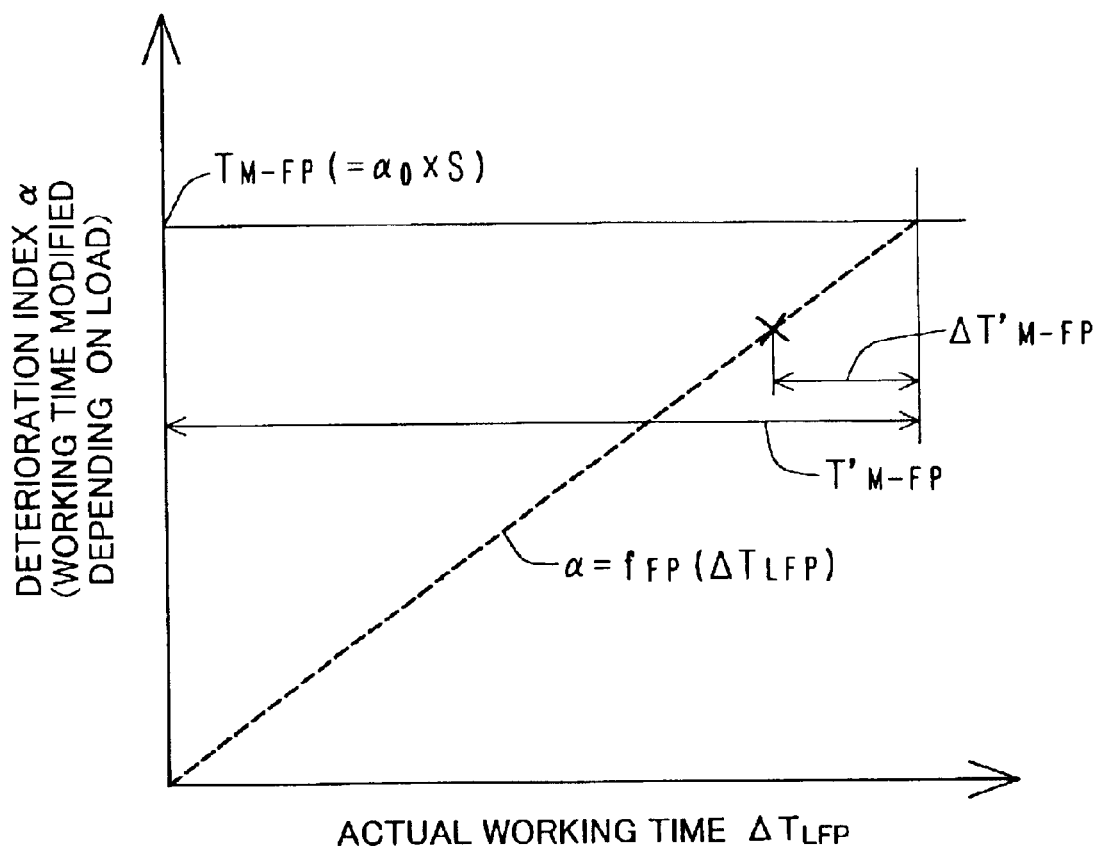
FIG. 48 is a graph showing one example of a manner of determining correlation between the actual working time and the deterioration index $\alpha$.
Figure 49:
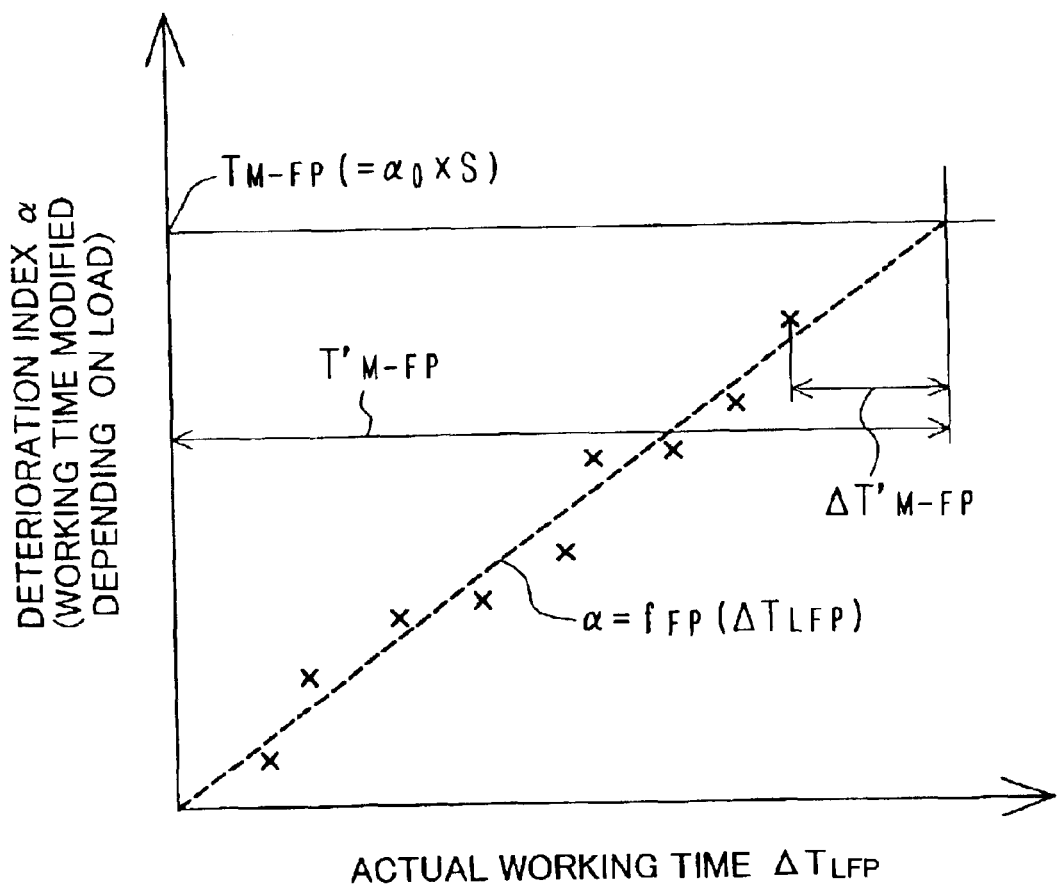
FIG. 49 is a graph showing another example of a manner of determining correlation between the actual working time and the deterioration index $\alpha$.

FIG. 48 is a graph showing one example of a manner of determining the correlation between the actual working time and the deterioration index α. In FIG. 48, a mark × represents a position decided depending on the actual working time $ΔT_{LFP}$ and the deterioration index α (working time modified depending on loads) of the front pin at the present time, which are determined respectively in the above steps S436B and S438B. Then, $α = f_{FP}(ΔT_{LFP})$ is represented as a straight line passing that position and the coordinate origin is determined. As another example, as shown in FIG. 49, the correlation may be determined by storing the actual working time $ΔT_{LFP}$ and the deterioration index α of the front pin, which have been obtained at the time of each check performed in the past, in the database 100, reading and plotting those stored data along with $ΔT_{LFP}$ and α at the present time (as indicated by marks × in FIG. 48), and determining $α = f_{FP}(ΔT_{LFP})$ as a straight line passing the coordinate origin and extending in closest relation to those plotted points.

Subsequently, the processing section 50A reads the front-pin target replacement time interval $T_{M-FP}$ (=$α_0 \cdot S$) for the reference load from the target maintenance database per machine model (step S442B). Then, it computes a target replacement time interval $T'_{M-FP}$ on the basis of the actual working time by referring to the correlation $α = f_{FP}(ΔT_{LFP})$ between the actual working time and the deterioration index α, which has been determined in the step S440B, using the target replacement time interval $T_{M-FP}$ (step S444B).

Finally, the remaining time $ΔT'_{M-FP}$ up to next replacement of the front pin is computed on the basis of the actual working time by subtracting the target replacement time interval $T'_{M-FP}$ on the basis of the actual working time from the actual working time $ΔT_{LFP}$ of the front pint at the present time (step S446B). Thus:

$$ΔT'_{M-FP} = T'_{M-FP} - ΔT_{LFP}$$

As a result, the remaining time $ΔT'_{M-FP}$ up to next replacement of the front pin in the No. N machine of the set model is computed on the basis of the actual working time.

The maintenance remaining time is also calculated for other parts than the front pin through similar setting and a similar manner.

With this embodiment thus constructed, since the obtained target replacement time interval reflects both the working time up to the actual replacement of the part and the load factor, the more appropriate target replacement time interval can be set. As a result, it is possible to decide the more appropriate scheduled replacement timing.

In the above-described embodiments, the center server 3 not only calculates the maintenance remaining time, but also prepares and transmits the maintenance report everyday, in addition to preparation and transmission of the daily report. However, those processes are not necessarily performed everyday, and may be performed at different frequency, for example, such that only the maintenance remaining time is calculated everyday and the maintenance report is prepared and transmitted once a week. Alternatively, the maintenance remaining time may be automatically calculated in the center server 3, and the maintenance report may be prepared and transmitted using the in-house computer in response to an instruction from the serviceman. Further, the calculation of the maintenance remaining time and the preparation and transmission of the maintenance report may be both performed in response to an instruction from the serviceman. In addition, the maintenance report may be mailed to the user in the form of prints, such as postcards. Alternatively, the maintenance report may be put on the maker's homepage, and the user may access the maintenance report on the Internet.

In the first, second, fourth and fifth embodiments, the target maintenance data (i.e., the target repair/replacement time interval, or the correlation between load factors and part replacement time intervals, or the target repair/replacement time interval for the reference load) is calculated whenever the part repair/replacement data is inputted. However, the target maintenance data may be calculated at the other timing, such as calculating some amount of data together at proper timing.

Also, in the above-described embodiments, the frequency distribution data of excavation loads, swing loads, travel loads, pump loads, etc. are collected on the side of the machine body controller on the basis of the engine running time in units of 100 hours. However, the time interval for collecting the frequency distribution data is set to 100 hours merely by way of example, and may be set to any other suitable time interval, e.g., 120 hours.

Moreover, while the engine running time is measured using the engine revolution speed sensor 46, it may be measured by a combination of a timer and a signal that is resulted from detecting turning-on/off of the engine key switch by the sensor 43. As an alternative, the engine running time may be measured by a combination of a timer and turning-on/off of a power generation signal from an alternator associated with the engine, or by rotating an hour meter with power generated by the alternator.

Additionally, while the information created by the center server 3 is transmitted to the user-side and in-house computers, it may also be returned to the side of the hydraulic excavator 1.

While the diagnostic report of maintenance/check and the warning report are also transmitted to the user side as well along with the daily report and the maintenance report, the former reports may be transmitted to only the in-house computer depending on the contents thereof. Alternatively, those reports may be put on the homepage so that the user may access the maintenance report on the Internet.

While, in the above-described embodiments, the present invention is applied to a crawler type hydraulic excavator, the present invention is similarly applicable to other types of construction machines, such as wheel type hydraulic excavators, wheel loaders, hydraulic cranes, and bulldozers.

Industrial Applicability

According to the present invention, the appropriate target repair/replacement time interval can be set.

Also, according to the present invention, the appropriate scheduled repair/replacement timing of parts can be decided even in a construction machine having a plurality of sections that differ in working time from each other.

Further, according to the present invention, the scheduled repair/replacement timing of respective parts in a plurality of hydraulic excavators can be managed together in a base station.

What is claimed is:

1. A method for managing a construction machine, the method comprising:
   a first step of measuring a working time for each section in each of a plurality of construction machines, and storing and accumulating the measured working time as operation data for each construction machine in a database;
   a second step of determining, based on repair/replacement data for each part of the construction machine and said operation data, an actual repair/replacement time interval of each part on the basis of the working time per section to which the relevant part belongs; and
   a third step of statistically processing the actual repair/replacement time interval and setting a target repair/replacement time interval of the relevant part to be used for deciding a scheduled repair/replacement timing of a corresponding part of the particular construction machine using the statistically processed data and wherein:
   said third step further includes steps of determining a relationship between the actual repair/replacement time interval of a part determined in said second step and the number of times of actual repair/replacement of said part, determining a repair/replacement time interval corresponding to a maximum number of times of repair/replacement from said relationship, and deciding the target repair/replacement time interval of said part based on the determined repair/replacement time interval.

2. A method for managing a construction machine according to claim 1, further comprising:
   a fourth step of determining, based on the operation data accumulated in said first step, a working time of a corresponding part on the basis of the working time per section of the particular construction machine, and comparing the determined working time with said target repair/replacement time interval, thereby calculating a remaining time up to a next repair/replacement of the relevant part.

3. A method for managing a construction machine, the method comprising:
   a first step of measuring a working time for each section in each of a plurality of construction machines, and storing and accumulating the measured working time as operation data for each construction machine in a database;
   a second step of determining, based on repair/replacement data for each part of the construction machine and said operation data, an actual repair/replacement time interval of each part on the basis of the working time per section to which the relevant part belongs; and
   a third step of statistically processing the actual repair/replacement time interval and setting a target repair/replacement time interval of the relevant part to be used for deciding a scheduled repair/replacement timing of a corresponding part of the particular construction machine using the statistically processed data and wherein:
   said first step further includes steps of measuring and collecting a load for each section in addition to the working time for each section, and storing and accumulating the measured working time and load for each section as the operation data for each construction machine in said database; and
   said method further includes a fourth step of statistically processing the actual repair/replacement time interval of the part and the load both determined in said second step, and a fifth step of determining said target repair/replacement time interval, as a value modified depending on loads, based on the operation data of the particular construction machine and the statistically processed data.

4. A method for managing a construction machine according to claim 3, wherein:
   said fourth step further includes steps of calculating, for each actual repair/replacement time interval of the part, a load factor of the relevant part and determining a correlation between the load factor and the repair/replacement time interval; and
   said fifth step further includes steps of determining a working time of a corresponding part on the basis of the working time per section of the particular construction machine, calculating a load factor during the determined working time, and referring the calculated load factor to said correlation to determine a corresponding repair/replacement time interval as said target repair/replacement time interval.

5. A method for managing a construction machine according to claim 4, further comprising:

a sixth step of determining, based on the operation data accumulated in said first step, a working time of a corresponding part on the basis of the working time per section of the particular construction machine, and comparing the determined working time with said target repair/replacement time interval, thereby calculating a remaining time up to a next repair/replacement of the relevant part.

6. A method for managing a construction machine according to claim 3, wherein:

said fourth step further includes steps of modifying the actual repair/replacement time interval of the part depending on loads, collecting the repair/replacement time interval modified depending on loads, and setting a load-dependent modification index value for the target repair/replacement time interval; and said fifth step further includes steps of calculating a working time of a corresponding part on the basis of the working time per section of the particular construction machine, modifying the calculated working time depending on loads, and comparing the working time modified depending on loads with said load-dependent modification index value, thereby determining said target repair/replacement time interval.

7. A method for managing a construction machine according to claim 6, wherein:

said fourth step further includes steps of determining an average value of the collected data of the repair/replacement time interval modified depending on loads, and setting the average value as said load-dependent modification index value.

8. A method for managing a construction machine according to claim 6, further comprising:

a sixth step of comparing the working time of the corresponding part of the particular construction machine determined in said fifth step with the target repair/replacement time interval modified depending on loads, thereby calculating a remaining time up to a next repair/replacement of the relevant part.

9. A method for managing a construction machine, the method comprising:

a first step of measuring a working time for each section in each of a plurality of construction machines, and storing and accumulating the measured working time as operation data for each construction machine in a database;

a second step of determining, based on repair/replacement data for each part of the construction machine and said operation data, an actual repair/replacement time interval of each part on the basis of the working time per section to which the relevant part belongs; and a third step of statistically processing the actual repair/replacement time interval and setting a target repair/replacement time interval of the relevant part to be used for deciding a scheduled repair/replacement timing of a corresponding part of the particular construction machine using the statistically processed data and wherein:

said first step further includes steps of measuring and collecting a load for each section in addition to the working time for each section, and storing and accumulating the measured working time and load for each section as the operation data for each construction machine in said database; and the method further comprises a fourth step of determining, based on the operation data accumulated in said first step, a working time of a corresponding part on the basis of the working time per section of a particular construction machine, determining a load factor during the determined working time, modifying the determined working time in accordance with the load factor, and comparing the modified working time with a preset target repair/replacement time interval, thereby calculating a remaining time up to a next repair/replacement of the relevant part.

10. A system for managing a construction machine, the system comprising:

operation data measuring and collecting means for measuring and collecting a working time for each section in each of a plurality of construction machines; and a base station computer installed in a base station and having a database for storing and accumulating, as operation data, the working time measured and collected for each section, said base station computer comprising first means for determining, based on repair/replacement data for each part of the construction machine and said operation data, an actual repair/replacement time interval of each part on the basis of the working time per section to which the relevant part belongs; and second means for statistically processing the actual repair/replacement time interval and setting a target repair/replacement time interval of the relevant part to be used for deciding a scheduled repair/replacement timing of a corresponding part of the particular construction machine using the statistically processed data and wherein:

said second means further includes means for determining a relationship between the actual repair/replacement time interval of a part determined by said first means and the number of times of repairs/replacements of said part, means for determining a repair/replacement time interval corresponding to a maximum number of times of repairs/replacements from said relationship, and means for deciding the target repair/replacement time interval of said part based on the determined repair/replacement time interval.

11. A system for managing a construction machine according to claim 10, wherein:

said base station computer further comprises third means for determining, based on said accumulated operation data, a working time of a corresponding part on the basis of the working time per section of the particular construction machine, and comparing the calculated working time with said target repair/replacement time interval, thereby calculating a remaining time up to a next repair/replacement of the relevant part.

12. A system for managing a construction machine, the system comprising:

operation data measuring and collecting means for measuring and collecting a working time for each section in each of a plurality of construction machines; and a base station computer installed in a base station and having a database for storing and accumulating, as operation data, the working time measured and collected for each section, said base station computer comprising first means for determining, based on repair/replacement data for each part of the construction machine and said operation data, an actual repair/replacement time interval of each part on the basis of the working time per section to which the relevant part belongs; and second means for statistically processing the actual repair/replacement time interval and setting a target repair/replacement time interval of the relevant part to be used for deciding a scheduled repair/replacement timing of a corresponding part of the particular construction machine using the statistically processed data and wherein:

said operation data measuring and collecting means further includes means for measuring and collecting a load for each section in addition to the working time for each section;

said base station computer includes means for storing and accumulating the measured working time and load for each section as the operation data in said database; and said system further includes third means for statistically processing the actual repair/replacement time interval of the part and the load both determined by said first means, and fourth means for determining said target repair/replacement time interval, as a value modified depending on loads, based on the operation data of the particular construction machine and the statistically processed data.

13. A system for managing a construction machine according to claim 12, wherein:

said third means includes means for calculating, for each actual repair/replacement time interval of the part, a load factor of the relevant part and means for determining a correlation between the load factor and the repair/replacement time interval; and said fourth means includes means for determining a working time of a corresponding part on the basis of the working time per section of the particular construction machine, means for calculating a load factor during the determined working time, and means for referring to said correlation using the calculated load factor to determine a corresponding repair/replacement time interval which is set as said target repair/replacement time interval.

14. A system for managing a construction machine according to claim 13, wherein:

said base station computer further comprises fifth means for determining, based on said accumulated operation data, a working time of a corresponding part on the basis of the working time per section of the particular construction machine, and comparing the determined working time with said target repair/replacement time interval, thereby calculating a remaining time up to a next repair/replacement of the relevant part.

15. A system for managing a construction machine according to claim 12, wherein:

said third means further includes means for modifying the actual repair/replacement time interval of the part depending on loads, means for collecting the repair/replacement time interval modified depending on loads, and means for setting a load-dependent modification index value for the target repair/replacement time interval; and said fourth means includes means for calculating a working time of a corresponding part on the basis of the working time per section of the particular construction machine, means for modifying the calculated working time depending on loads, and means for comparing the working time modified depending on loads with said load-dependent modification index value, thereby determining said target repair/replacement time interval.

16. A system for managing a construction machine according to claim 15, wherein:

said third means includes means for determining an average value of the collected data of the repair/replacement time interval modified depending on loads, and means for setting the average value as said load-dependent modification index value for the target repair/replacement time interval.

17. A system for managing a construction machine according to claim 15, wherein:

said base station computer further comprises fifth means for comparing the working time of the corresponding part of the particular construction machine determined by said fourth means with the target repair/replacement time interval modified depending on loads, thereby calculating a remaining time up to a next repair/replacement of the relevant part.

18. A system for managing a construction machine, the system comprising:

operation data measuring and collecting means for measuring and collecting a working time for each section in each of a plurality of construction machines; and a base station computer installed in a base station and having a database for storing and accumulating, as operation data, the working time measured and collected for each section, said base station computer comprising first means for determining, based on repair/replacement data for each part of the construction machine and said operation data, an actual repair/replacement time interval of each part on the basis of the working time per section to which the relevant part belongs; and second means for statistically processing the actual repair/replacement time interval and setting a target repair/replacement time interval of the relevant part to be used for deciding a scheduled repair/replacement timing of a corresponding part of the particular construction machine using the statistically processed data and wherein:

said operation data measuring and collecting means includes means for collecting and measuring a load for each section in addition to the working time for each section;

said base station computer includes means for storing and accumulating the measured working time and load for each section as the operation data in said database; and said base station computer further comprises third means for determining, based on said accumulated operation data, a working time of a corresponding part on the basis of the working time per section of a particular construction machine, for determining a load factor during the determined working time, for modifying the determined working time in accordance with the load factor, and for comparing the modified working time with a preset target repair/replacement time interval, thereby calculating a remaining time up to next repair/replacement of the relevant part.

19. A processing apparatus, comprising means for storing and accumulating, as operation data, a working time for each section in each of a plurality of construction machines means for determining, based on repair/replacement data for each part of the construction machine and said operation data, an actual repair/replacement time interval of each part on the basis of the working time per section to which the relevant part belongs, means for statistically processing the actual repair/replacement time interval, and means for setting a target repair/replacement time interval of the relevant part to be used for deciding a scheduled repair/replacement timing of a corresponding part of the particular construction machine using the statistically processed data and which further includes means for storing and accumulating, as the operation data, a load for each section in addition to the working time for each section, means for statistically processing the actual repair/replacement time interval of the part and the load, and means for determining said target repair/replacement time interval, as a value modified depending on loads, based on the operation data of the particular construction machine and the statistically processed data.

* * * * *